US011507703B2

(12) United States Patent
Das et al.

(10) Patent No.: US 11,507,703 B2
(45) Date of Patent: Nov. 22, 2022

(54) PHYSICALLY UNCLONABLE FUNCTION USING MATERIALS AND DEVICES

(71) Applicant: The Penn State Research Foundation, University Park, PA (US)

(72) Inventors: Saptarshi Das, State College, PA (US); Akhil Dodda, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 17/028,132

(22) Filed: Sep. 22, 2020

(65) Prior Publication Data

US 2021/0103681 A1 Apr. 8, 2021

Related U.S. Application Data

(60) Provisional application No. 62/911,616, filed on Oct. 7, 2019.

(51) Int. Cl.
*G06F 21/75* (2013.01)
*H03K 17/687* (2006.01)
*H03K 19/003* (2006.01)

(52) U.S. Cl.
CPC ............ *G06F 21/75* (2013.01); *H03K 17/687* (2013.01); *H03K 19/003* (2013.01)

(58) Field of Classification Search
CPC ....... G06F 21/75; G06F 21/73; H03K 17/687; H03K 19/003
See application file for complete search history.

(56) References Cited

U.S. PATENT DOCUMENTS 10,764,069 B1 * 9/2020 Hurwitz ................ H04L 9/0866
2017/0263575 A1 * 9/2017 Cao ........................ H01L 23/544

OTHER PUBLICATIONS

Drew Buzzell, "Graphene Field Effect Transistors for Physically Unclonable Cryptographic Primitives", The Pennsylvania State University The Graduate School, May 2019, 38 pages. (Year: 2019).*
Giubileo et al., "The role of contact resistance in graphene field-effect devices", Progress in Surface Science vol. 92, Issue 3, 2017, pp. 143-175 (Year: 2017).*
"Towards Hardware-Intrinsic Security, Foundations and Practice" by Ahmad-Reza Sadeghi, David Naccache; Springer-Verlag Berlin Heidelberg 2010.

(Continued)

*Primary Examiner* — Daniel D Chang
(74) *Attorney, Agent, or Firm* — Buchanan Ingersoll & Rooney PC

(57) ABSTRACT

A reconfigurable and machine learning resilient on-chip cryptography for graphene-based devices can be configured to utilize inherent disorders associated with the carrier transport in grain boundary dominated graphene field effect transistors (GFETs). For instance, a method can be configured to model a GFET as one or more physically unclonable functions (PUFs). A GFET PUF can also be reconfigured in a way that does not involve any physical intervention and/or integration of additional hardware components. A GFET PUF can be designed to operate with ultra-low power and can be configured to be robust and reliable against variation in temperature and supply voltage in some embodiments.

17 Claims, 56 Drawing Sheets

(56) References Cited

OTHER PUBLICATIONS

"Physical Unclonable Functions for Device Authentication and Secret Key Generation" by G. Edward Suh and Srinivas Devadas; DAC 2007, Jun. 4-8, 2007, San Diego, California, USA Copyright 2007 ACM 978-1-59593-627-1/07/0006; Downloaded on Sep. 11, 2020 at 16:58:31 UTC from IEEE Xplore.

"Silicon Physical Random Functions" by Blaise Gassend, Dwaine Clarke, Marten van Dijk and Srinivas Devadas, Massachusetts Institute of Technology, CCS'02 Nov. 18-22, 2002, Washington, DC, USA. Copyright 2002 ACM 1581136129/02/0011.

"Comparative analysis of SRAM memories used as PUF primitives" by Geert-Jan Schrijen, Vincent van der Leest, Intrinsic-ID, Eindhoven, The Netherlands; http://www.intrinsic-id.com; 978-3-9810801-8-6/DATE12/©2012 EDAA' Downloaded on Sep. 11, 2020 at 16:59:46 UTC from IEEE Xplore.

"Cryptographic Hardware and Embedded Systems CHES 2012" by Emmanuel Prouff and Patrick Schaumont (Eds.), 14th International Workshop, Leuven, Belgium, Sep. 2012 Proceedings; International Association for Cryptologic Research 2012.

"Secure and Robust Error Correction for Physical Unclonable Functions" by Meng-Day (Mandel) Yu, Verayo, and Srinivas Devadas, Massachusetts Institute of Technology; 2010 IEEE Co-published by the IEEE CS and the IEEE CASS IEEE Design & Test of Computers; Downloaded on Sep. 11, 2020 at 17:01:24 UTC from IEEE Xplore.

"Silicon CMOS devices beyond scaling" Haensch, W; Nowak, E J; Dennard, R H; Solomon, P M; et al.; IBM Journal of Research and Development; Jul.-Sep. 2006; 50, 4/5; ProQuest p. 339-361.

"High-perormance green flexible electronics based on biodegradable cellulose nanofibril paper" Yei Hwan Jung, Tzu-Hsuan Chang, Huilong Zhang, Chunhua Yao, Qifeng Zheng, Vina W. Yang, Hongyi Mi, Munho Kim, Sang June Cho, Dong-Wook Park, Hao Jiang, Juhwan Lee, Yijie Qiu, Weidong Zhou5, Zhiyong Cai, Shaoqin Gong & Zhenqiang Ma; Nature Communications, Accepted Apr. 13, 2015, Published May 26, 2015; 2015 Macmillan Publishers Limited.

"Two-dimensional flexible nanoelectronics" by Deji Akinwande, Nicholas Petrone & James Hone, Nature Communications, Accepted Oct. 28, 2014, Published Dec. 17, 2014; 2014 Macmillan Publishers Limited.

"Highly Conductive Ink Jet Printed Films of Nanosilver Particles for Printable Electronics" by Dongjo Kim and Jooho Moonz, School of Advanced Materials Engineering, Yonsei University, Seoul 120-749, Korea; Electrochemical and Solid-State Letters, 8 (11) J30-J33 (2005); 2005 The Electrochemical Society.

"Physically unclonable cryptographic primitives using self-assembled carbon nanotubes" by Zhaoying Hu, Jose Miguel M. Lobez Comeras, Hongsik Park, Jianshi Tang, Ali Afzali, George S. Tulevski, James B. Hannon, Michael Liehr and Shu-Jen Han; Nature Nanotechnology | vol. 11 | Jun. 2016 | www.nature.com/naturenanotechnology 559-566 2016 Macmillan Publishers Limited; Published online Feb. 22, 2016.

"Utilizing the Variability of Resistive Random Access Memory to Implement Reconfigurable Physical Unclonable Functions" by An Chen; IEEE Electron Device Letters, vol. 36, No. 2, Feb. 2015; Downloaded on Sep. 11, 2020 at 18:29:01 UTC from IEEE Xplore.

"Physical Unclonable Function Exploiting Sneak Paths in Resistive Cross-point Array" Ligang Gao, Pai-Yu Chen, Rui Liu, and Shimeng Yu; IEEE Transactions on Electron Devices, vol. 63, No. 8, Aug. 2016; Downloaded on Sep. 11, 2020 at 18:30:12 UTC from IEEE Xplore.

"Experimental Characterization of Physical Unclonable Function Based on 1 kb Resistive Random Access Memory Arrays" byRui Liu, Huaqiang Wu, Yachuan Pang, He Qian, and Shimeng Yu; IEEE Electron Device Letters, vol. 36, No. 12, Dec. 2015; Downloaded on Sep. 11, 2020 at 18:30:48 UTC from IEEE Xplore.

"Physical Unbiased Generation of Random Numbers With Coupled Resistive Switching Devices" by Simone Balatti, Stefano Ambrogio, Roberto Carboni, Valerio Milo, Zhongqiang Wang, Alessandro Calderoni, Nirmal Ramaswamy, and Daniele Ielmini; IEEE Transactions on Electron Devices, vol. 63, No. 5, May 2016.

"True Random Number Generation by Variability of Resistive Switching in Oxide-Based Devices" by Simone Balatti, Stefano Ambrogio, Zhongqiang Wang, and Daniele Ielmini; IEEE Journal on Emerging and Selected Topics in Circuits and Systems, vol. 5, No. 2, Jun. 2015; Downloaded on Sep. 11, 2020 at 18:32:07 UTC from IEEE Xplore.

"Techniques for Improved Reliability in Memristive Crossbar PUF Circuits" by Mesbah Uddin, Md. Badruddoja Majumder, Garrett S. Rose, Karsten Beckmann, Harika Manem, Zahiruddin Alamgir, and Nathaniel C. Cady; 2016 IEEE Computer Society Annual Symposium on VLSI; Downloaded on Sep. 11, 2020 at 18:32:44 UTC from IEEE Xplore.

* cited by examiner

HOUR 0

HOUR 4

PHYSICALLY UNCLONABLE FUNCTION USING MATERIALS AND DEVICES

CROSS-REFERENCE TO RELATED APPLICATION

The present application claims priority to U.S. Provisional Patent Application No. 62/911,616, filed on Oct. 7, 2019. The entirety of this patent application (U.S. Provisional Patent Application No. 62/911,616) is incorporated by reference herein.

FIELD

This innovation relates to hardware security based on novel materials and devices.

BACKGROUND

Information security can be achieved at the software level using mathematical algorithms called one-way functions, such as prime factorization, discrete logarithm, hashing, etc., that allow seamless data encryption in polynomial time and require resource extensive computation in nondeterministic exponential time for data decryption by brute force trials (BFTs). One-way functions are often considered to be robust security measures.

Physically unclonable functions (PUFs) have also been used for hardware security. PUFs exploit natural variations in the physical microstructures of the actual hardware component and their complex interactions with various physical stimuli such as voltage, magnetic field, light, etc. These stimuli, when applied to a given microstructure, produce a unique and unpredictable result, one which repeats every time the same stimulus is applied to the same microstructure but differs drastically among the different microstructures. The applied stimulus is referred to as the challenge, the microstructure is referred to as the PUF, and the result is called the response. A specific challenge and its corresponding response together consist a challenge response pair, or CRP, which can efficiently be exploited for authentication of hardware devices. PUFs are a frugal hardware investment and can also be used as secure keys and on-chip source of random numbers.

PUFs are currently implemented by the semiconductor industry where stochastic fluctuations in the physical microstructures of the individual devices originating from manufacturing process variations are used as PUFs. Various incarnations of silicon (Si) PUFs exist, including static random-access memory (SRAM) and dynamic random-access memory (DRAM) based PUFs, arbiter PUFs, butterfly PUFs, flip-flop PUFs, ring oscillator PUFs, metal resistance PUFs, digital PUFs, etc. Si PUFs, however, suffer from small capacity, low entropy, high power consumption, and expensive area overhead and also often need to accommodate additional error-correcting pre- and/or post-processing units, such as majority voting, fuzzy logic, etc., in order to compensate for rather small device to device mismatches, which can make them vulnerable to noise and environmental fluctuations leading to false authentication.

SUMMARY

We have determined that known types of PUFs (e.g. Si PUFs) lack reconfigurability and show vulnerability against various machine learning (ML) attacks. Furthermore, we have determined that the Si-based technologies that may utilize Si PUFs can be incompatible with flexible and/or printable technologies. We have also determined that a new approach to PUFs can be utilized to better address noise and environmental fluctuations so that false authentication can be better avoided, if not eliminated.

Some embodiments can include a reliable, stable, high entropy, low cost, low power, scalable, area efficient, reconfigurable, and ML resilient PUF based on two dimensional (2D) materials such as graphene, $MoS_2$, $WS_2$, $WSe_2$, black phosphorus, etc. Some embodiments can include field effect transistors (FETs) based on 2D materials that can be configured for harnessing the device to device variation. Embodiments utilizing our approach can embrace natural randomness, easing out typically stringent growth requirements, which can provide cost benefits. Some example embodiments include at least one graphene field effect transistor (GFET) based PUF. Utilization of an embodiment of our GFET-based generation of cryptographic primitives can be relatively effortless, self-supporting, and can be seamlessly integrated with any substrate—rigid or flexible. For instance, we found that the transfer characteristics (i.e. source-to-drain current ($I_{DS}$) versus gate voltage ($V_{BG}$)) of a large population of GFETs could demonstrate significant device to device variation that can be exploited as a near ideal and non-volatile physical entropy source for on-chip secure key generation, as well as challenge response pairs (CRPs) for physically unclonable functions (PUFs) for device authentication. Some embodiments of our GFET population (e.g. an array of GFETs, etc.) can allow low power reconfiguration that does not involve physical replacement of the devices and/or integration of additional hardware components. We believe this is a unique feature which is unprecedented when compared to any conventional state-of-the-art and emerging hardware PUFs. Some embodiments of graphene-based PUFs are stable over time and the utilized reconfiguration procedure has little-to-no impact on the PUF reliability. Some embodiments of graphene-based PUFs are resilient to ML attacks based on predictive regression models as well as generative adversarial networks (GANs). Note that Si and other nanomaterial-based PUFs face difficulty in resisting ML attacks. In contrast, some embodiments of our graphene-based PUFs can meet all of the requirements for state-of-the-art PUFs, including entropy, uniqueness, and correlation, as well as demonstrate reliable operation over a wide temperature range and against supply voltage variations.

In some embodiments, a physically unclonable function (PUF) includes at least one field effect transistor (FET). Each FET can include a first layer connected to a source and a drain and a gate oxide layer positioned between the first layer and a back-gate electrode.

The at least one FET can be a single FET or can include a plurality of FETs. When multiple FETs are provided, the FETs can be positioned in an array.

The first layer can include graphene or can consist of graphene or can consist essentially of graphene. In other embodiments, the first layer can include a different suitable 2D material such as molybdenum disulfide ($MoS_2$), tungsten disulfide ($WS_2$), tungsten diselenide ($WSe_2$), or black phosphorus (BP). In other embodiments, the first layer can consist of or can consist essentially of $MoS_2$, $WS_2$, $WSe_2$, or BP.

The PUF can also include circuitry. For instance, the PUF can include circuitry connected to the FETs. The circuitry can include resistors, transistors, switches, and other circuit components. In some embodiments, the circuitry can be positioned so that the analog output current (km) from each individual FET is convertible to an analog output voltage ($V_{OUT}$). For instance, the circuitry can include at least one operational amplifier (Op-Amp) to convert the $I_{OUT}$ from each individual FET to $V_{OUT}$. The circuitry can also includes at least one analog-to-digital converter (ADC) to convert the $V_{OUT}$ to a binary output or a voltage comparator to convert $V_{OUT}$ from each GFET into a binary output.

There can be any suitable number of FETs in the PUF to meet a particular set of design criteria. For instance, there can be 8 FETs, 64 FETs, 128 FETs, or 256 FETs.

Embodiments of the PUF can be incorporated into a sensor device, a detector device, a nanoelectronic device, an optoelectronic device, a plasmonic device, or a biomedical device. In yet other embodiments, the PUF can be incorporated into a chip used in such devices or some other device. The PUF can be configured to provide an on-chip security feature for the chip.

The circuitry of the PUF can be configured to detect analog current responses from the FETs to digitize the analog current responses to binary numbers appendable to generate challenge response pairs (CRPs). For example, the analog current response for each of the FETs can be measured at a gate voltage and digitized to an 8-bit binary number to be appended to the CRPs. For instance, for an embodiment that includes 8 FETs, the analog current responses for each and every one of the e8 FETs can be digitized to form the CRPs, where the CRPs are 64-bit.

Methods of fabricating a physically unclonable function (PUF) is also provided. Embodiments of the method can include forming a plurality of field effect transistors (FETs). Each FET can include a first layer connected to a source and a drain. The first layer can comprise graphene, molybdenum disulphide ($MoS_2$), tungsten disulfide ($WS_2$), tungsten diselenide ($WSe_2$), or black phosphorus (BP). Each FET can also include a gate oxide layer positioned between the first layer and a back-gate electrode. The method can also include positioning an array of the FETs on a chip.

Embodiments of the method can also include other steps. For instance, the method can also include connecting circuitry to the FETs. The circuitry can be configured so that analog output current ($I_{OUT}$) from each individual FET is convertible to analog output voltage ($V_{OUT}$). For instance, the circuitry can include at least one operational amplifier (Op-Amp) to convert the $I_{OUT}$ from each individual FET to the $V_{OUT}$. The circuitry can also include at least one analog-to-digital converter (ADC) to convert the $V_{OUT}$ to a binary output or a voltage comparator to convert the $V_{OUT}$ from each FET into a binary output.

Embodiments of the method can also include steps for forming the first layer. For instance, in some embodiments that utilize graphene in the first layer, the method can include growing graphene for the first layer on a foil so that a film of graphene is formed on the foil, transferring the graphene onto a substrate to introduce wrinkles into the graphene film, removing material of the foil from the film of graphene; and reducing a size of the wrinkles. Of course, other methods of growing and forming a graphene layer can also be used in other embodiments. Further, for embodiments in which the first layer is a different type of material, another type of formatting process can be used to form the first layer.

The forming of the FETs can include other steps. For instance, the forming of the FETs can include defining channels in the first layer (e.g. a graphene film, or a film of another suitable material) and writing a source contact for the source and a drain contact for the drain.

Embodiments of the method can also include reconfiguring the FETs. The reconfiguration of the FETs can occur a number of different times or just a single time. For instance, embodiments of the method can include reconfiguring the FETs. In some embodiments, the reconfiguring can include performing a first reconfiguration of the FETs by application of a first preselected voltage to the FETs for a first preselected period of time, and performing a second reconfiguration of the FETs after the first reconfiguration of the FETs is performed by application of a second pre-selected voltage to the FETs for a second preselected period of time. In yet other embodiments, there can be multiple other reconfigurations (e.g. third, fourth, fifth, etc. reconfigurations). Each reconfiguration can be performed after it is determined a reconfiguration is needed or may be performed as a preselected time period to provide updated security.

Embodiments of the method can also include preventing machine learning attacks from affecting the chip via the FETs. Of course, other security features can also be provided by the FETs as well in addition to preventing machine learning attacks from affecting a chip or other element that the PUF is protecting via at least one security feature of the PUF.

Other details, objects, and advantages of 2D material PUFs, graphene-based PUFs having one or more GFETs, 2D material PUFs having one or more FETs, devices utilizing at least one graphene-based PUF, sensor devices, nanoelectronic devices, optoelectronic devices, plasmonic devices, biomedical devices, and methods of making and using the same will become apparent as the following description of certain exemplary embodiments thereof proceeds.

BRIEF DESCRIPTION OF THE DRAWINGS

Exemplary embodiments of graphene-based PUFs, devices utilizing at least one 2D material based PUF, at least one graphene-based PUF, and methods of making and using the same are shown in the drawings included herewith. It should be understood that like reference characters used in the drawings may identify like components.

FIG. 36 helps show that it is possible to reconfigure the GFET PUF multiple times by cycling between positive and negative drain voltage pulses.

DETAILED DESCRIPTION

Figure 1:
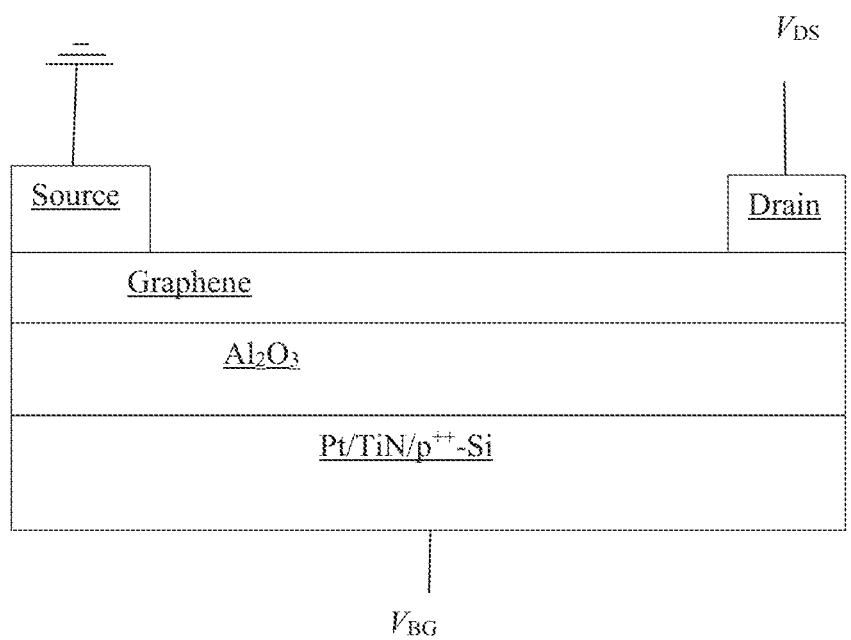
FIG. 1 is a schematic block diagram of an exemplary embodiment of a Graphene Field Effect Transistor (GFETs).

Referring to the drawings (FIGS. 1-68), FIG. 1 shows a schematic of an exemplary embodiment of a GFET. The GFET is back-gated with atomic layer deposition (ALD) grown 50 nm alumina ($Al_2O_3$) as the gate oxide and a stack of Pt/TiN/p$^{++}$-Si as the back-gate electrode. The gate oxide layer can be positioned between the graphene layer and the back-gate electrode. A drain and a source can each be connected to the graphene layer. The use of 50 nm $Al_2O_3$ for the gate oxide layer differs from a conventional 300 nm $SiO_2$ layer as the back-gate oxide. We utilized the 50 nm $Al_2O_3$ layer to provide a high relative dielectric constant (~10) that can allow for better electrostatic control of the GFET. Other embodiments of the GFET can utilize different types of gate oxides or back-gate electrode configurations (e.g. a gate oxide layer of $SiO_2$ or other types of gate oxide, a back-gate electrode having a different configuration, combinations of these differences, etc.).

The graphene for the graphene layer can be obtained from an external commercial manufacturer on copper (Cu) foil and subsequently transferred to the gate dielectric substrate for device fabrication. For instance, to fabricate graphene-based cryptography primitives, chemical vapor deposition (CVD) graphene can be obtained (e.g. purchased from Graphenea, or another supplier) already grown on a Cu foil, with a protective PMMA layer spun on. To transfer to a substrate (e.g. a 1 cm$^2$ substrate), a square of the Cu/graphene/PMMA stack can be cut from the larger foil, a process that introduces wrinkles to the graphene film. The square of material can then be placed in a copper etchant (e.g. iron (III) chloride) until the Cu is no longer visible to the eye. Once the copper is no longer visible, the graphene/PMMA film can be transferred to three consecutive deionized (DI) water baths (e.g. a first bath followed by a second bath, which is then followed by a third bath) for 10 minutes each to wash away excess metal ions. The film can then be transferred from the third bath onto the substrate and baked for 10 hours at 150° C. to reduce the size of wrinkles introduced during the transfer process by relaxing the PMMA, which can allow us to fabricate embodiments of devices on level graphene film. Immediately after baking, the PMMA can be removed via consecutive acetone and IPA baths for 10 minutes each.

The GFETs can be fabricated using electron-beam lithography in a two-step process. The channels can be defined and then separated from the film with an $O_2$ etch step, followed by writing the source and drain contacts. A Ni (40 nm) and Au (30 nm) stack can be used to form the contacts. Of course, other suitable contact materials can also be used for the contacts.

Electrical characterization of the fabricated GFET devices can be performed using a Lake Shore CRX-VF probe station under high vacuum condition using a Keysight B1500A parameter analyzer or other similar type of tool.

Of course, other methods and variations to the above-mentioned method can also be employed to make GFETs.

Graphene produced using large scale methods, such as CVD, are primarily polycrystalline. During a CVD process, the nucleation of the grains is random and they appear in uncontrolled locations on a substrate. As growth continues, the graphene film coalesces, forming a patchwork of randomly oriented grains and grain boundaries. Grain boundaries are defects that alter the transport of carriers through the graphene film by intervalley scattering. Furthermore, defects in the graphene film can be introduced during the transfer of the film from the substrate it was grown on to the gate oxide of choice (e.g. the $Al_2O_3$ layer). Typically, CVD graphene is grown on a metal foil, for example Cu. The transfer step requires a sacrificial thin film to act as the transfer layer and a metal etchant to remove the metal from the graphene/sacrificial stack. During the transfer, dopants, metal contaminants, and wrinkles can be introduced at random locations in the graphene film, which can further alter the electronic properties. All of these factors compound to add variability to the transfer characteristics of the GFETs.

A Raman spectrum of a graphene channel, taken at a wavelength of 532 nm for an embodiment of FIG. 1 showed graphene at ~1600 $cm^{-1}$ which is known as the G-band and is found in all $sp^2$ carbon materials as a result of C—C bond stretching. A 2D-band was also found at a strong peak at a Raman shift value of 2500-2800 $cm^{-1}$ indicating the presence of single-layer graphene.

In other embodiments of our PUF, the monolayer graphene can be replaced with any other suitable material. For instance, other embodiments of our PUF, the graphene monolayer can be replaced with a suitable substitute material. For instance, molybdenum disulfide ($MoS_2$), tungsten disulfide ($WS_2$), tungsten diselenide ($WSe_2$), or black phosphorus (BP) can be used as a substitute for graphene in the PUF.

Figure 6:
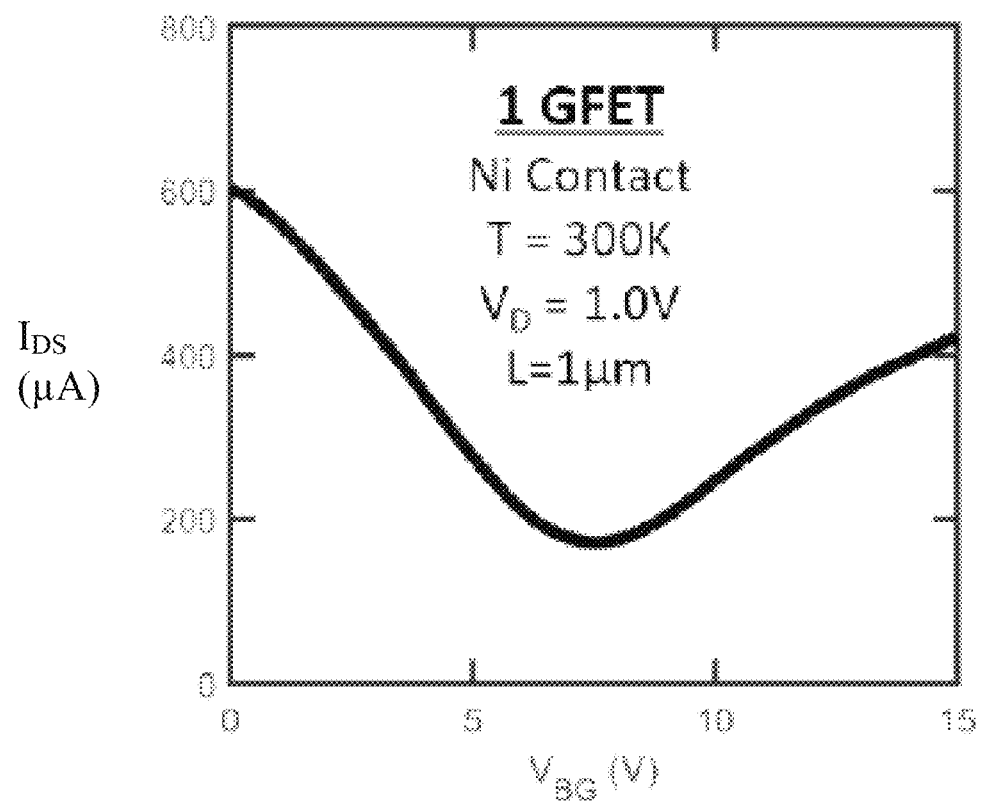
FIG. 6 is a graph illustrating experimentally measured transfer characteristics i.e. source-to-drain current ($I_{DS}$) versus back-gate voltage ($V_{BG}$) characteristics of a representative GFET with a channel length, L=1 μm, and width, W=0.5 μm, measured at a drain voltage, $V_{DS}$=1 V at room temperature (T).
Figure 12:
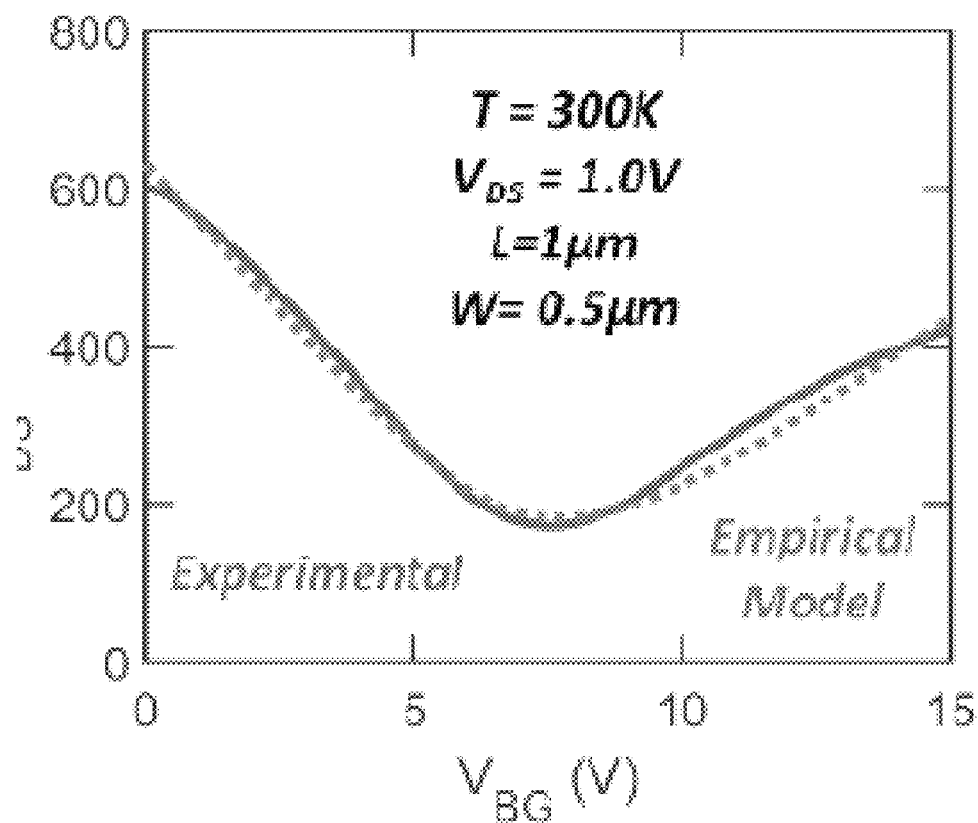
FIG. 12 is a graph illustrating experimentally measured and simulated (empirical model) transfer characteristics i.e. the source-to-drain current ($I_{DS}$) versus back-gate voltage ($V_{BG}$) characteristics of a representative GFET with a channel length, L=1 and width, W=0.5 measured at a drain voltage, $V_{DS}$=1 V. Temperature (T) was at 300 Kelvin (K). The simulation was done using an empirical model with parameters extracted from the experimental data.

FIGS. 6 and 12 illustrate the transfer characteristics of embodiments of GFET PUFs and also show a empirical model following Eq. 2 that closely matches the experimental device characteristics. The GFET transfer characteristics of the GFET embodiment of FIG. 6 that can be used in embodiments of our GFET PUF can be described using the following phenomenological expression:

$$I_{DS} = q\mu \frac{W}{L} \sqrt{(qn_0)^2 + [C_{ox}(V_{BG} - V_{Dirac})]^2} \, V_{DS} \quad [\text{Eq. 1}]$$

In Eq. 1, q is the charge of an electron, $\mu$ is the carrier mobility, $n_0$ is the residual number of carriers in graphene due to the presence of charge puddles in the oxide, $C_{ox}$ is the oxide capacitance, and $V_{Dirac}$ is the Dirac voltage, which corresponds to the gate voltage ($V_{BG}$) where the current is minimum and equally contributed to by the conduction of holes in the valence band and electrons in the conduction band. Ideally, $V_{Dirac}$ should occur at $V_{BG}$=0, however substrate induced doping and charge transfer at metal/graphene contact interfaces can often shift $V_{Dirac}$. In our case, for the embodiment of FIG. 1, p-type doping was observed since $V_{Dirac}$ is ~6 V. The hole and electron mobility values extracted using the corresponding peak transconductances were found to be 450 $cm^2$/V-s and 200 $cm^2$/V-s, respectively, which are orders of magnitude smaller than the best reported room temperature field effect mobility values on similar dielectric—a clear reflection of grain boundary and defect-dominated transport in our GFETs.

Equations 2 and 3 below provide calculations for $V_{Dirac}$ and carrier mobility ($\mu$):

$$\mu = \frac{\mu_n \exp\left[-\frac{q(V_{BG} - V_{Dirac})}{mk_BT}\right] + \mu_p \exp\left[\frac{q(V_{BG} - V_{Dirac})}{mk_BT}\right]}{\exp\left[-\frac{q(V_{BG} - V_{Dirac})}{mk_BT}\right] + \exp\left[\frac{q(V_{BG} - V_{Dirac})}{mk_BT}\right]} = \quad [\text{Eq. 2}]$$

$$\begin{cases} \mu_n & V_{BG} > V_{Dirac} \\ \mu_p & V_{BG} < V_{Dirac} \end{cases}$$

$$V_{Dirac} = -qn_{imp}/C_{ox} \quad [\text{Eq. 3}]$$

The expression for $\mu$ is defined empirically to capture the asymmetry in the device characteristics, originating from the fact that the effective electron mobility ($\mu_n$) and effective hole mobility ($\mu_p$) in our GFET are different. Furthermore, $k_B$ is the Boltzmann constant, T is the temperature, and m is a fitting parameter. Unlike in ballistic graphene, where the linear energy-momentum (dispersion) relationship leads to symmetric transport due to identical electron and hole mobility values, the symmetry is broken in the embodiment of our GFET due to the presence of impurity scattering, transfer related strain, wrinkles, and interaction with the substrate. The fact that $V_{Dirac}$, which should ideally occur at $V_{BG}$=0, is shifted to 6 V is clear evidence for negatively charged intrinsic impurities ($n_{imp}$=-5.68×$10^{12}$/$cm^2$) present in graphene, leading to p-type doping of the GFET. These impurity dopants can originate from one or more sources, including metal contaminants introduced by the copper etchant chemistry, polymer residues and defects introduced by the transfer process, and post-fabrication charge transfer at the metal/graphene contact interfaces.

In the empirical model we have ignored the contact resistance and the resistance due to the p-n junction formed at the interface of graphene channel and graphene underneath the metal contact since the channel resistance was found to dominate the transport in GFETs. Nevertheless, the intrinsic impurity fluctuations originating from the fabrication process add variability to the transfer characteristics of the GFETs.

We found that fluctuations in these device parameters can transform the source-to-drain current of the GFET into a Gaussian random variable following Eq. 1, irrespective of the applied gate and drain biases.

Figure 68:
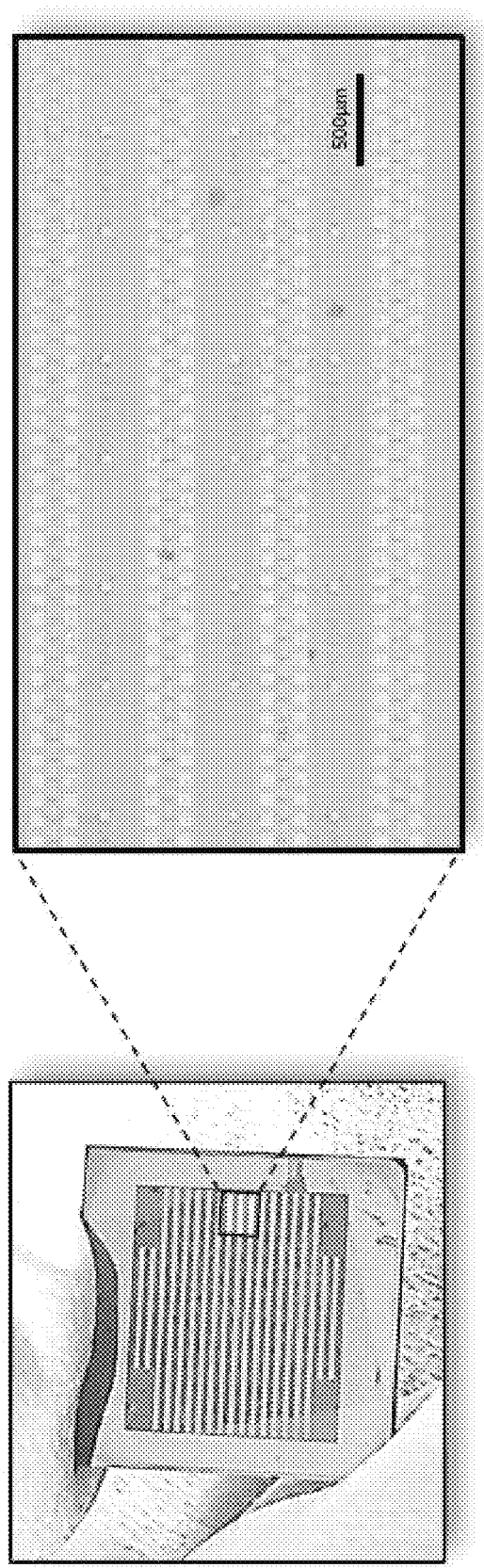
FIG. 68 is an optical image of an exemplary embodiment of a chip having an exemplary embodiment of our GFET PUFs.

Since the size, orientation, and locations of grain boundaries and defects are random in nature, the GFET characteristics can exhibit significant device to device variation. This is demonstrated in FIG. 13, for example, which show the transfer characteristics of 192 GFETs with the same geometry and dimensions that are located on the same chip to provide a GFET-based PUF for the chip. FIG. 68 illustrates an embodiment of our GFET PUFs on a chip.

Figure 13:
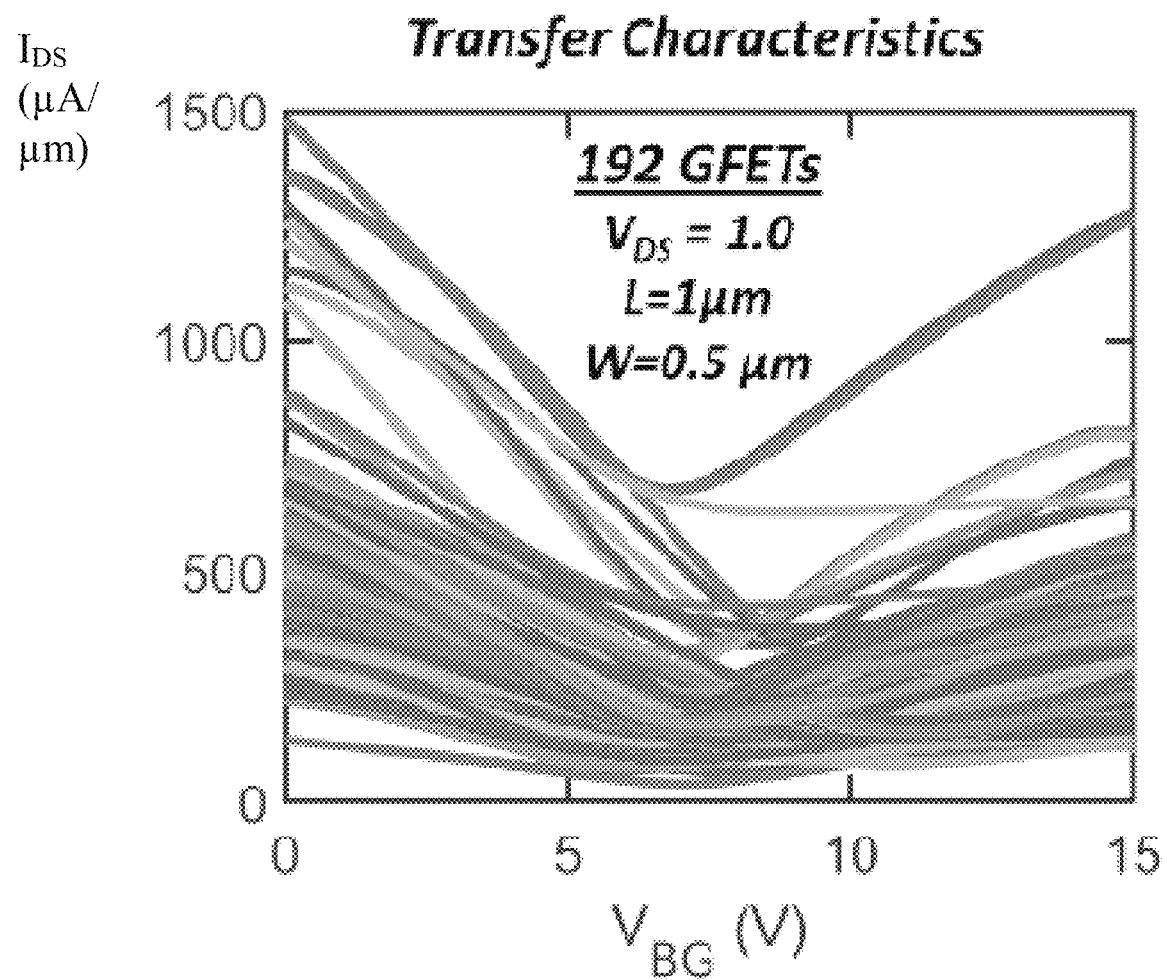
FIG. 13 is a graph illustrating the transfer characteristics of another exemplary population of GFETs comprising 192 GFET. Each GFET for this population has a 1 μm channel length L and 0.5 μm channel width W, measured with a drain bias ($V_{DS}$) of 1 V.
Figure 14:
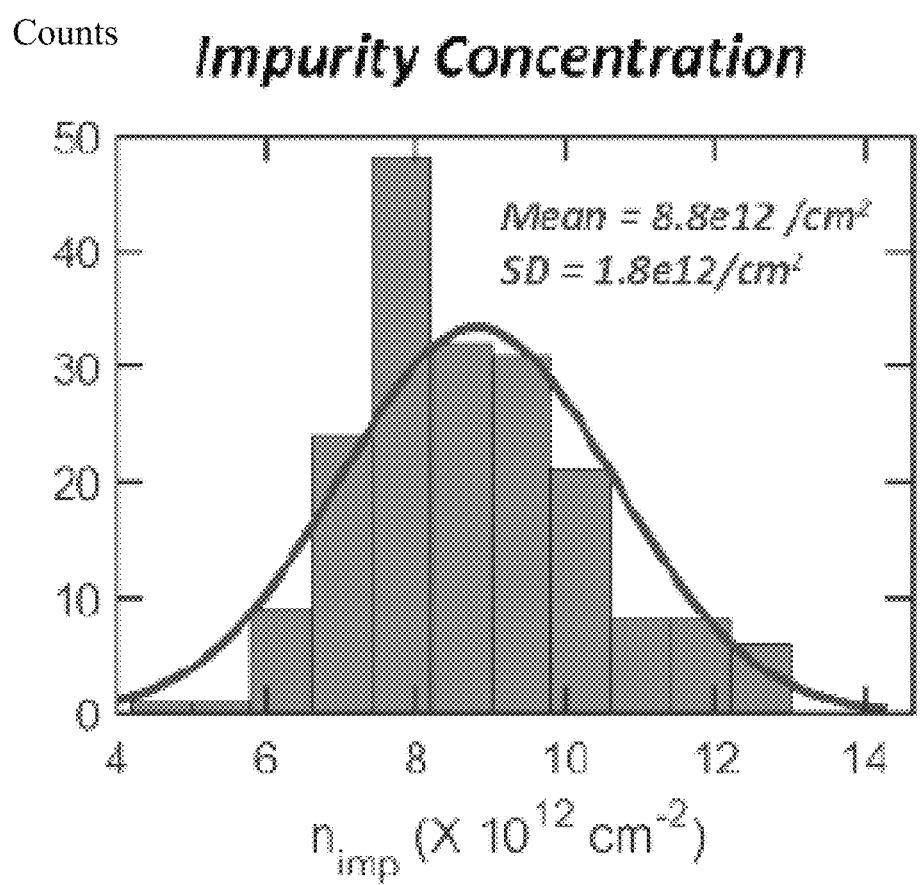
FIG. 14 is a histogram illustrating the intrinsic impurity concentration ($n_{imp}$) for the exemplary population of GFETs having the transfer characteristics of FIG. 13 that was extracted from their corresponding device characteristics. This graph also identifies the mean and standard deviation (SD) values for the impurity concentration as well.
Figure 15:
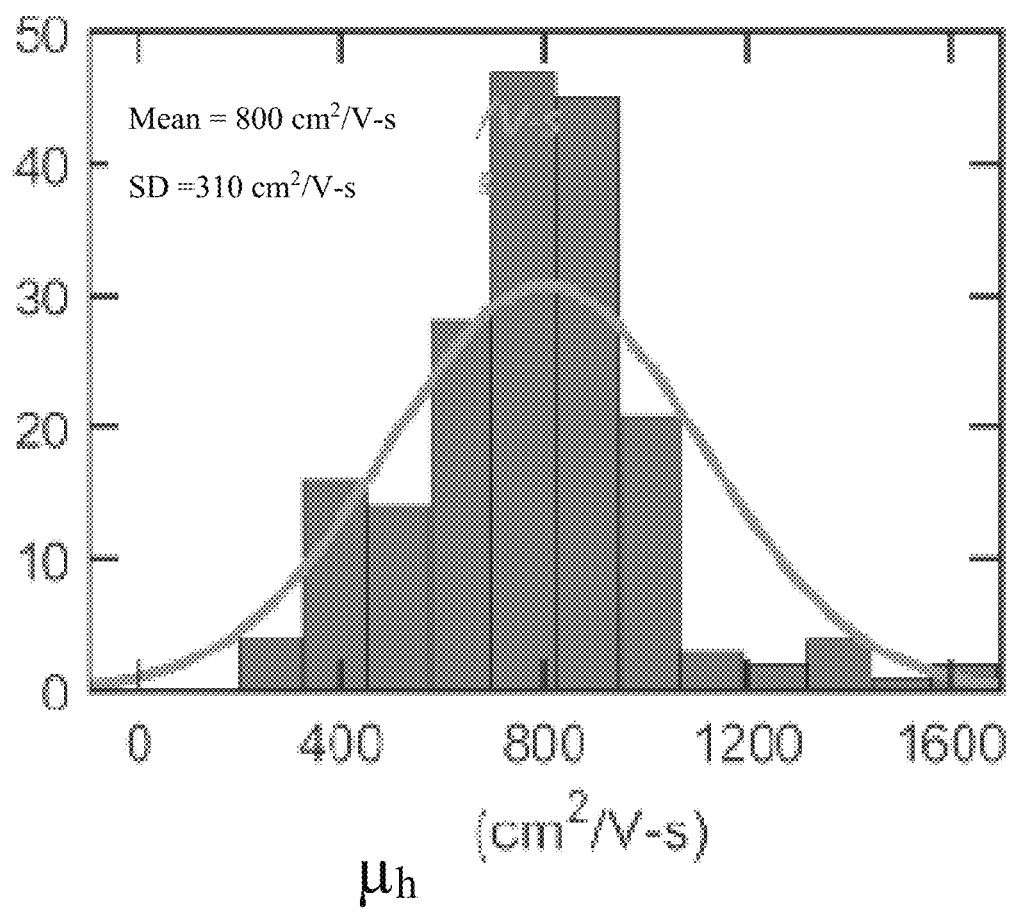
FIG. 15 is a histogram illustrating the hole mobility ($\mu_h$) distribution for the exemplary population of GFETs having the transfer characteristics of FIG. 13 that was extracted from their corresponding device characteristics. This graph also identifies the mean and standard deviation (SD) values for $\mu_h$ as well.
Figure 16:
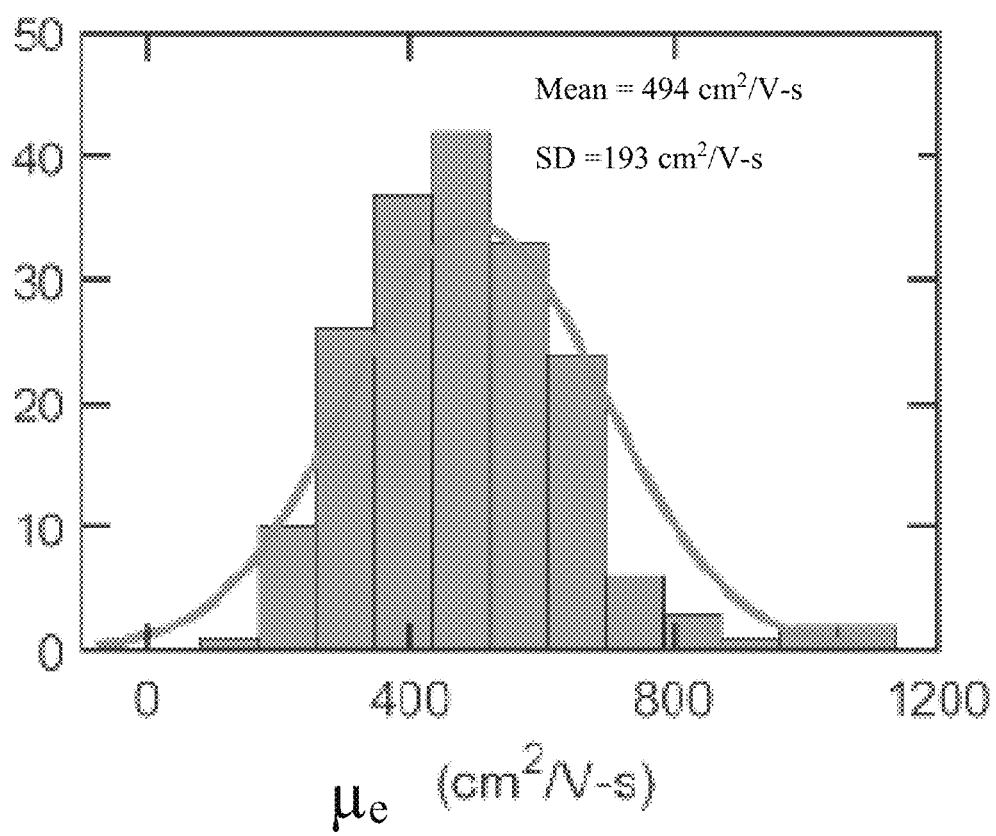
FIG. 16 is a histogram illustrating the electron mobility ($\mu_e$) distribution for the exemplary population of GFETs having the transfer characteristics of FIG. 13 that was extracted from their corresponding device characteristics. This graph also identifies the mean and standard deviation (SD) value for $\mu_e$ as well.

FIGS. 13-20 show different characteristics for the array of GFETs of FIG. 12. FIG. 13 shows the transfer characteristics of the 192 GFETs with the same device geometry and dimensions that are located on the same chip. While device to device variability is considered detrimental for most electronic applications, we determined that this opens up opportunities for security applications, provided that GFETs can demonstrate high entropy randomness and satisfy benchmarking metrics for such applications. FIG. 14 shows the histogram of the intrinsic impurity concentration ($n_{imp}$) extracted from the $V_{Dirac}$ using Eq. 3 for the 192 GFETs of FIG. 12. Clearly, $n_{imp}$ follows a random Gaussian distribution with Mean=$8.8\times10^{12}$/cm$^2$ and Standard Deviation (SD), SD=$1.8\times10^{12}$/cm$^2$. FIGS. 15-16 show the histograms of electron and hole mobility extracted at $V_{BG}$=15 V and $V_{BG}$=0 V, respectively, which also follow random Gaussian distributions since the carrier mobility is directly impacted by the impurity scattering. The mean and SD were found to be 800 cm$^2$/V-s and 310 cm$^2$/V-s, respectively, for holes and 494 cm$^2$/V-s and 193 cm$^2$/V-s, respectively, for electrons.

Figure 17:
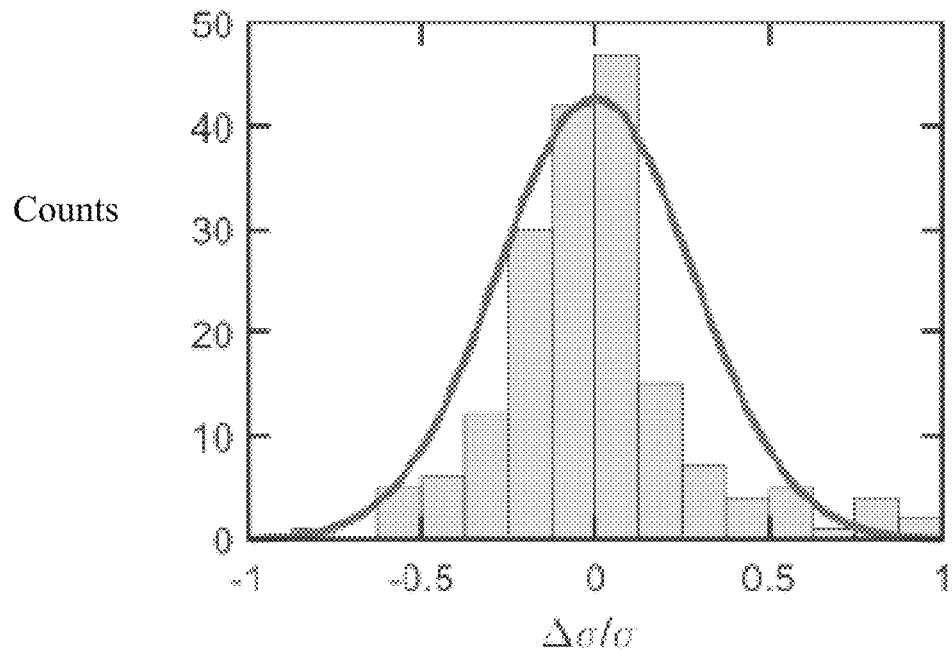
FIG. 17 is a histogram illustrating the Dirac conductivity fluctuation ($\Delta_\sigma$) about its mean value ($\sigma_\epsilon$) for the exemplary population of GFETs having the transfer characteristics of FIG. 13 that was extracted from their corresponding device characteristics.
Figure 18:
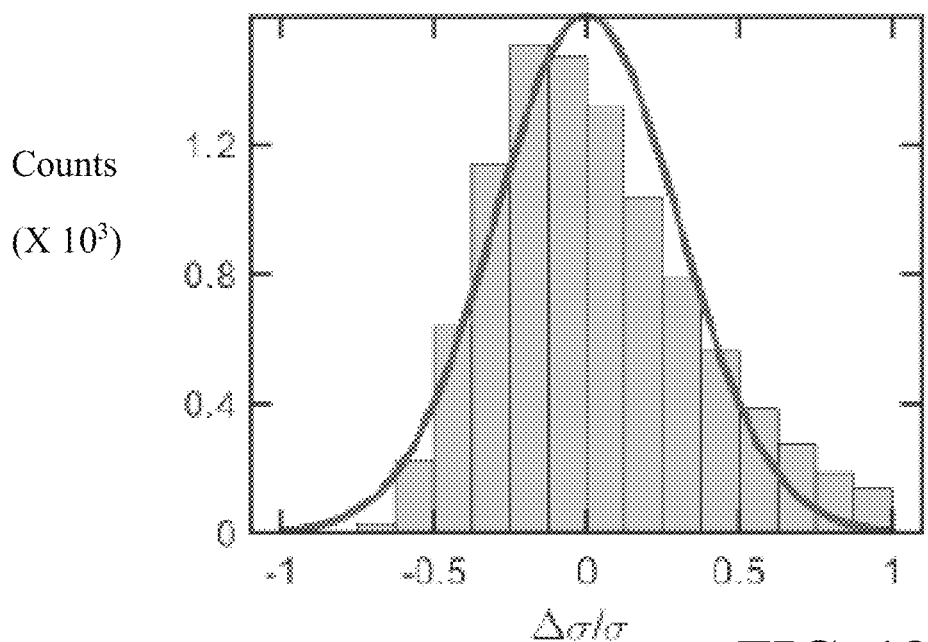
FIG. 18 is a histogram illustrating the Dirac conductivity fluctuation ($\Delta_\sigma$) about a mean value ($\sigma_\epsilon$) for a simulated population of 64 million GFETs using a physics-based model.
Figures 19, 20:
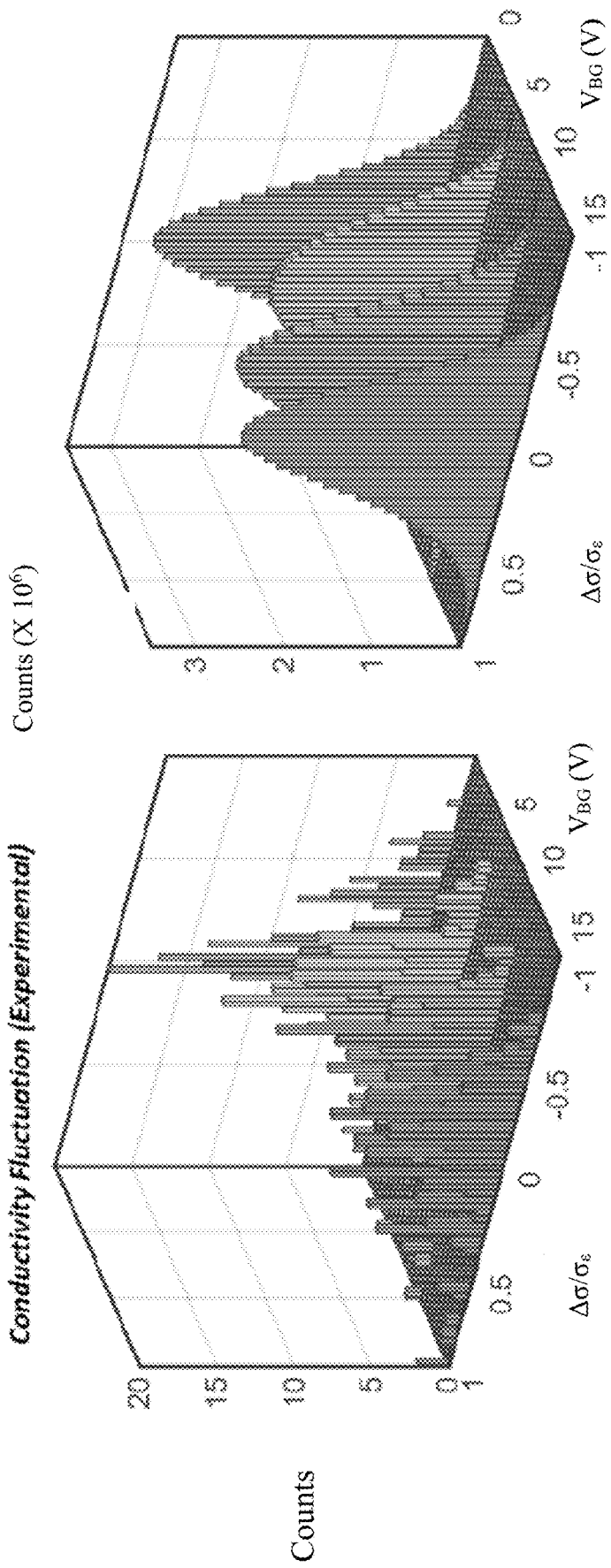
FIG. 19 is a histogram of the conductivity fluctuation ($\Delta_\sigma$) about its mean value ($\sigma_\epsilon$) at different gate biases ($V_{BG}$) that was experimentally determined for the exemplary population of GFETs having the transfer characteristics of FIG. 13.
FIG. 20 is a histogram illustrating theoretically obtained results from the simulated population of 64 million GFETs through an empirical model.

FIG. 19 is a histogram of the fluctuation of conductivity ($\Delta\sigma$) about its mean value ($\sigma_e$) measured at different gate biases for the 192 GFETs of FIG. 13. FIG. 20 shows the same results for 64 million GFETs simulated using the empirical model described in Eq. 1 with parameters extracted from experimental device characteristics emulating the randomness. While empirical models are powerful, they do not provide fundamental insights. A more rigorous theoretical analysis based on the self-consistent Born approximation was also used to estimate the quasi-particle relaxation time and broadening of states for disordered graphene. We used this calculation to estimate the conductivity when considering the spatially varying random fluctuations. The fluctuations in impurity concentration, impurity potential, and anisotropic hopping parameters are modeled as random Gaussian variables to capture the experimental device to device variation in the Dirac conductivity ($\sigma_{Dirac}$), as shown in FIGS. 17-18. We found that both models were capable of capturing the randomness observed in our experimental GFET characteristics, which we determined can facilitate graphene-based cryptography for different GFET PUF embodiments, as discussed herein.

Figure 2:
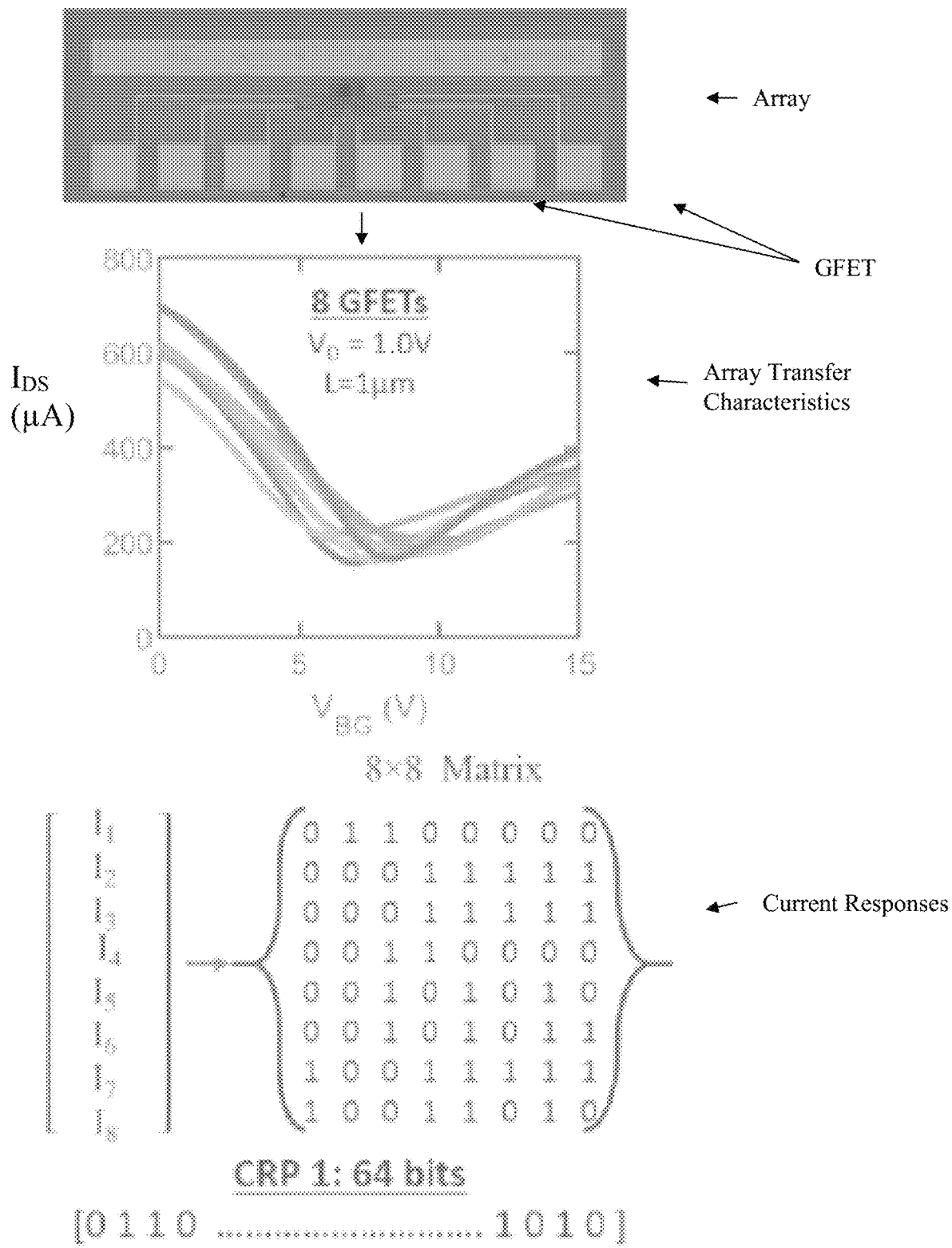
FIG. 2 is a flow chart illustrating a first exemplary embodiment of a GFET physically unclonable function (PUF) with a plurality of GFETs, along with a graph and matrix illustrating the transfer characteristics and current responses for this GFET PUF at $V_{BG}$=0 V. This first exemplary embodiment of a GFET PUF includes 8 GFETs with a channel length (L) of 1 micrometer (μm) that share common back-gate and source, whereas the drain terminals are kept independent to measure the corresponding GFET output current values in response to drain bias. The transfer characteristics of the 8 GFETs are shown in the accompanying graph. The GFETs can be configured as a unique PUF with the drain bias ($V_{DS}$) as the challenge and the source-to-drain current ($I_{DS}$) as the response. The matrix illustrates the analog current responses, measured at a specific gate voltage, for each of the GFETs, which were then digitized to 8-bit binary numbers and subsequently appended to generate 8×8=64-bit long challenge response pairs (CRPs). As discussed herein, this 64-bit digitized current response can be used as PUF, or secure key, or random bit string for on-chip data encryption.
Figure 3:
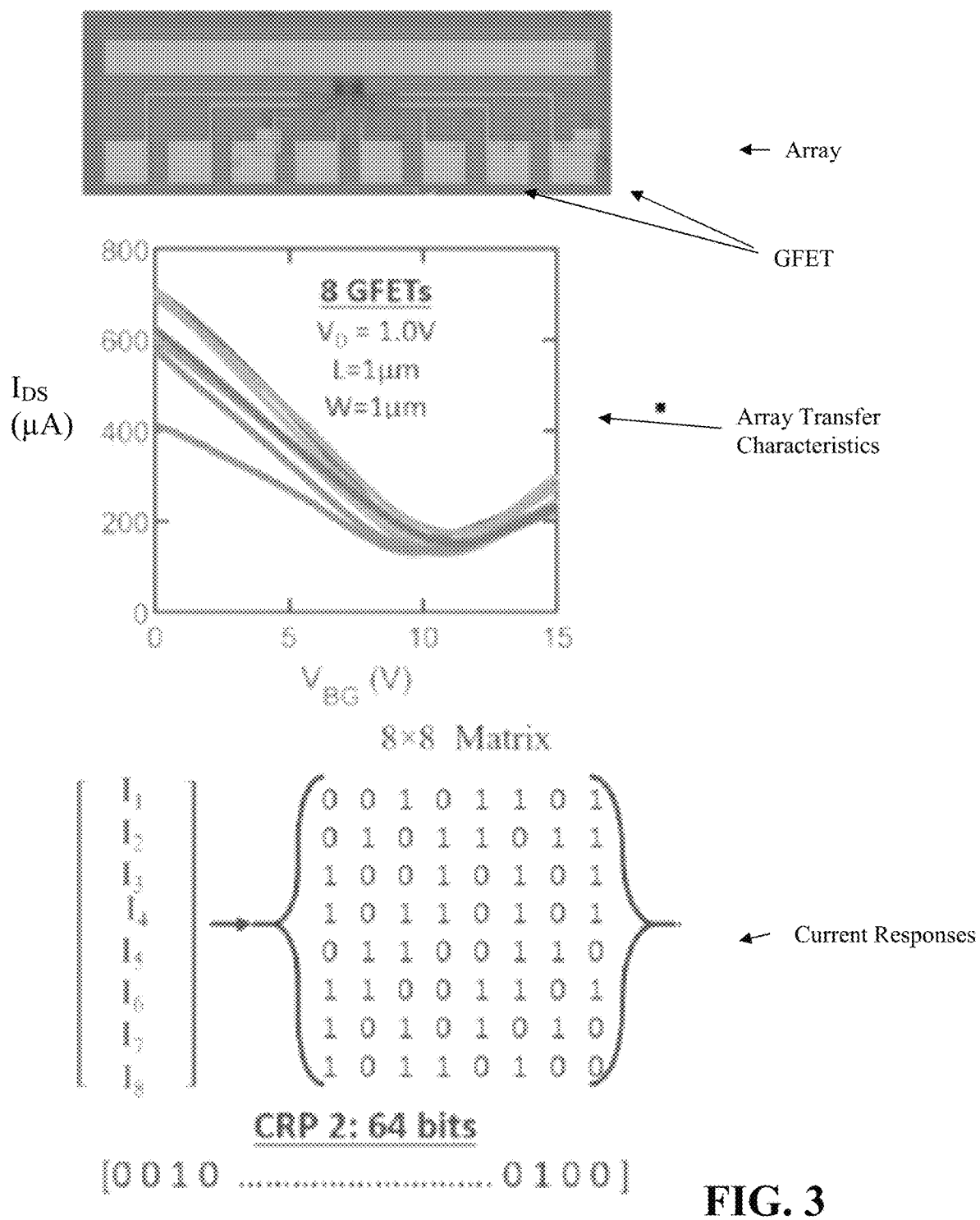
FIG. 3 is a flow chart illustrating a second exemplary embodiment of a GFET PUF with 8 GFETs, along with a graph and matrix illustrating array transfer characteristics and the current responses for this GFET PUF at a $V_{BG}$=0 V. This second exemplary embodiment of a GFET PUF includes 8 GFETs with a channel length (L) of 1 μm that share a common source, which is kept grounded. The transfer characteristics of the 8 individual GFETs is shown in the accompanying graph. The GFETs can be configured as a unique PUF with the drain bias ($V_{DS}$) as the challenge and the source-to-drain current ($I_{DS}$) as the response. The matrix illustrates the analog current responses, measured at a specific gate voltage, for each of the GFETs, which were then digitized to 8-bit binary numbers, and subsequently appended to generate 8×8=64-bit long CRPs. As discussed herein, this 64-bit digitized current response can be used as a secure key for on-chip data encryption
Figure 4:
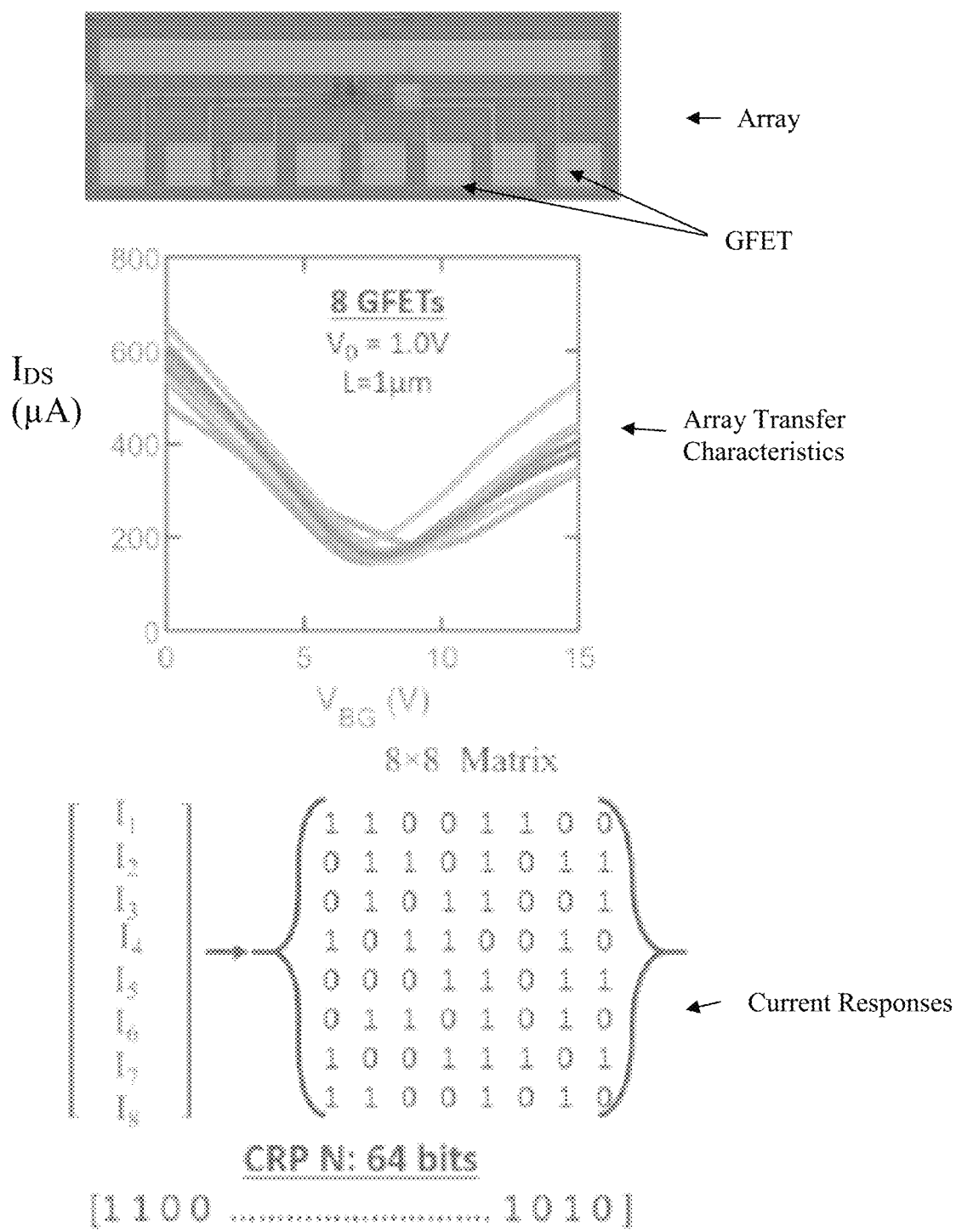
FIG. 4 is a flow chart illustrating a third exemplary embodiment of a GFET PUF with 8 GFETs, along with a graph and matrix illustrating array transfer characteristics and current responses for this array. This third exemplary embodiment of the GFET PUF includes 8 GFETs with a channel length (L) of 1 μm that share a common source, which is kept grounded. The transfer characteristics of the 8 individual GFETs is shown in the accompanying graph. The GFETs can be configured as a unique PUF with the drain bias ($V_{DS}$) as the challenge and the source-to-drain current ($I_{DS}$) as the response. The matrix illustrates the analog current responses, measured at a specific gate voltage, for each of the GFETs, which were then digitized to 8-bit binary numbers, and subsequently appended to generate 8×8=64-bit long CRPs. As discussed herein, this 64-bit digitized current response can be used as a secure key for on-chip data encryption.
Figure 5:
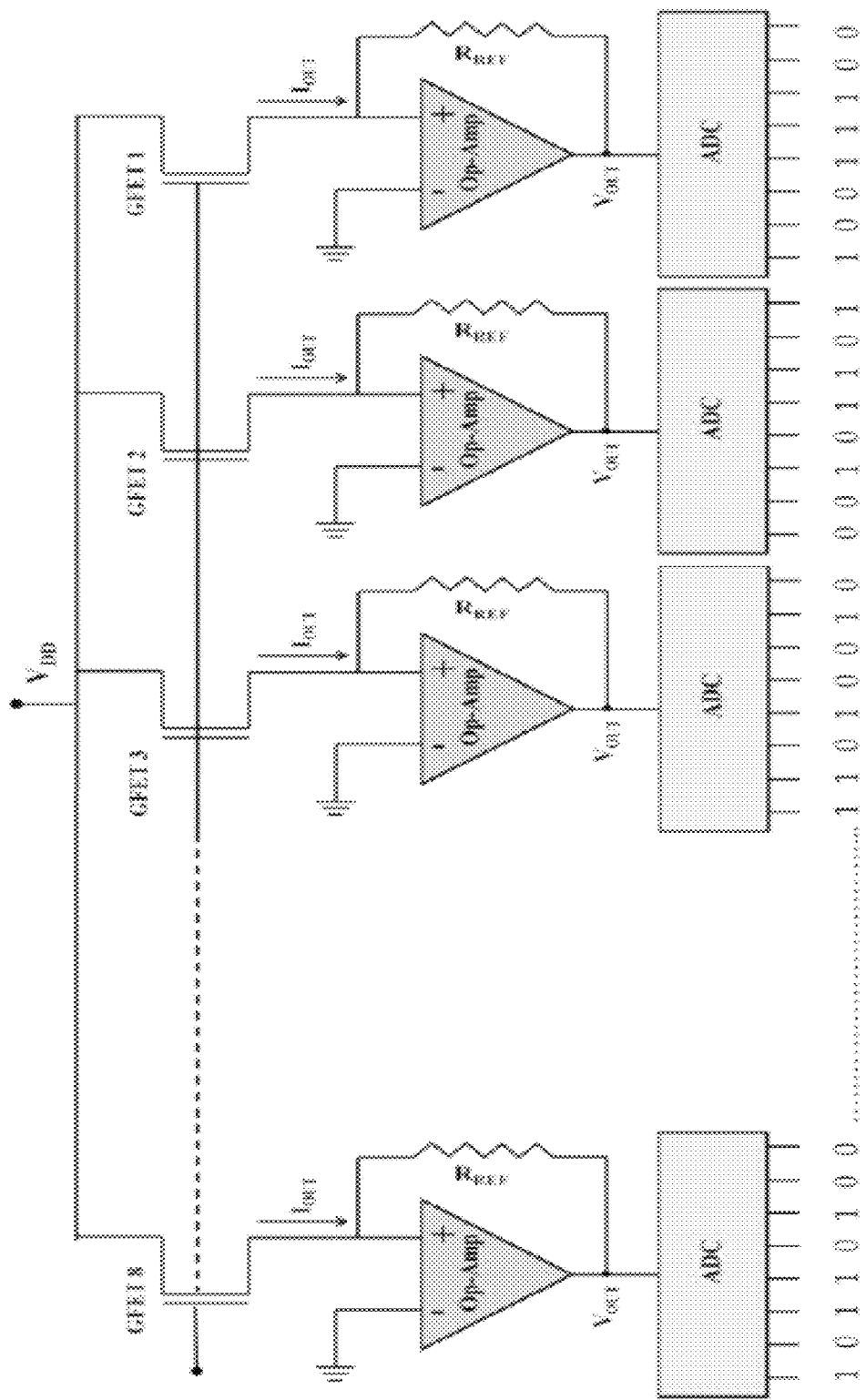
FIG. 5 is a schematic diagram of an exemplary circuit configuration for the exemplary embodiments of the GFET PUFs shown in FIGS. 2-4.
Figure 56:
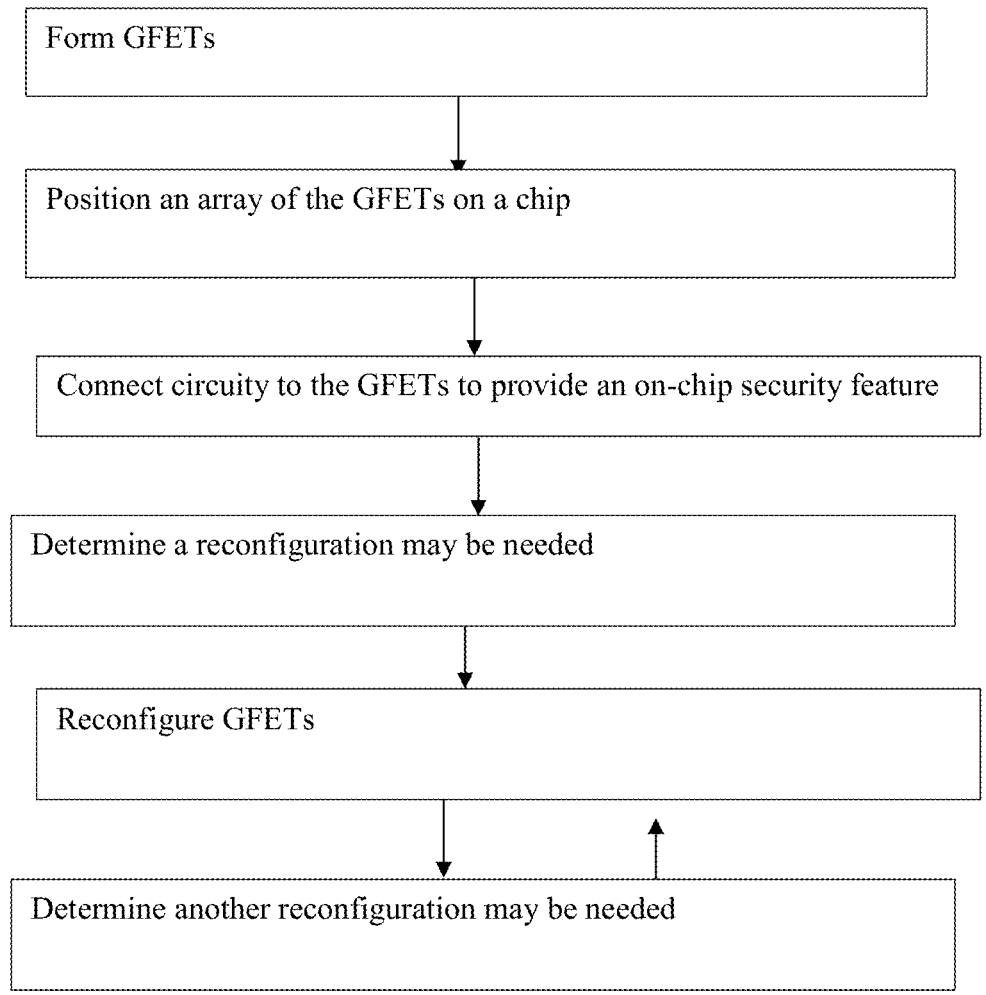
FIG. 56 is a flow chart illustrating an exemplary method of forming a graphene-based PUF that includes GFETs on a chip to provide a GFET PUF that can provide on-chip security.

FIGS. 2-4 illustrate exemplary GFET PUFs and FIG. 5 illustrates exemplary circuitry that can be used in the exemplary embodiments of the GFET PUFs. FIG. 56 illustrates one exemplary process for forming a GFET-based PUF that can utilize an embodiment of the GFETs and circuitry.

Each GFET PUF embodiment shown in FIGS. 2-4 include 8 GFETs separated by 1 μm that share a common source, which is kept grounded. Transfer characteristics of the 8 individual GFETs corresponding to each GFET PUF is also provided in these Figures. As may be appreciated from FIGS. 2-4, each of the 8 analog current responses, measured at a specific gate voltage, can be digitized to 8-bit binary numbers and subsequently appended to generate 8×8=64-bit long challenge response pairs (CRPs). This 64-bit digitized current response can also be used as a secure key for on-chip data encryption. As can be seen from FIG. 5, which illustrates an exemplary circuit configuration, the analog output current ($I_{OUT}$) from each individual GFET can be converted to an analog output voltage ($V_{OUT}$) by using an operational amplifier (Op-Amp) and a reference resistor ($R_{REF}$). The $V_{OUT}$ can be subsequently converted to an 8-bit binary output using an analog-to-digital converter (ADC). In the case of larger GFET PUF embodiments, such as one with 128 GFETs, the ADC can be replaced with a voltage comparator to convert $V_{OUT}$ from each GFET into a 1-bit binary output. The digitized current response can also be used as a secure key for on-chip data encryption.

The timing delay ($\tau_{PUF}$) for obtaining a CRP from the GFET PUF using the exemplary circuitry shown in FIG. 5 is given by the following Equation 4 (Eq. 4):

$$\tau_{PUF}=\tau_{GFET}\tau_{Op-Amp}\tau_{ADC} \qquad [\text{Eq. 4}]$$

Here, $\tau_{GFET}$ is the intrinsic delay of the GFET, $\tau_{Op-Amp}$ is the delay associated with the Op-Amp for current-to-voltage conversion, and $\tau_{ADC}$ is the delay associated with the ADC. If we assume Fermi velocity for carriers in graphene to be ~10$^6$ m/s, then $\tau_{GFET}$=1 ps for our 1 μm long channel GFET.[64] The other delays are governed by the relations $\tau_{Op-Amp}$~1-2$\tau_{CLC}$ and $\tau_{ADC}$~4-6$\tau_{CLC}$, where $\tau_{CLC}$ is the clock cycle, which is determined by the speed of the processor and is typically in the range of ns. Therefore, the timing delay can be estimated to be in the range of ~10 ns.

The probability of finding a 1 or 0 was calculated for each CRP. Ideally, it should be equally probable to find either a 1 or a 0, i.e. p=0.5, ensuring maximum uncertainty or randomness, which also corresponds to unity entropy (E) in accordance with the following definition defined in Equation 5 (Eq. 5):

$$E=-[p \log_2 p+(1-p)\log_2(1-p)] \qquad [\text{Eq. 5}]$$

Figure 21:
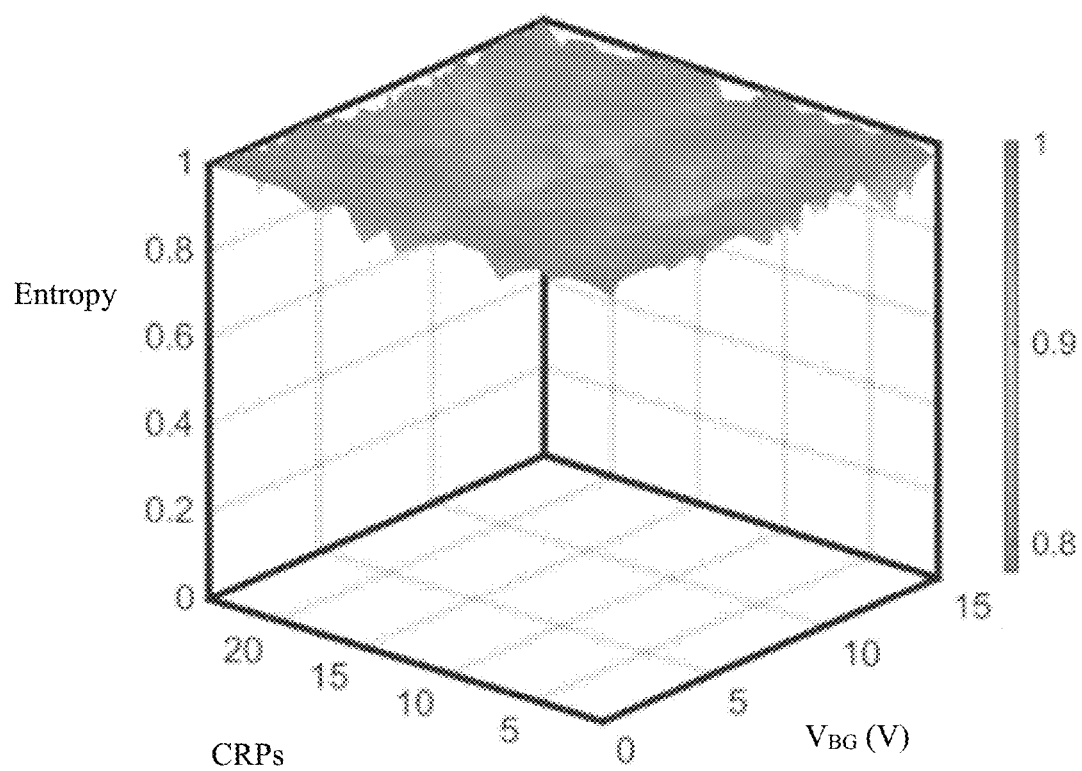
FIG. 21 is a graph illustrating randomness test results for an exemplary set of 24 GFET PUFs, illustrating individual entropy for the CRPs at different gate voltages ($V_{BG}$).
Figure 22:
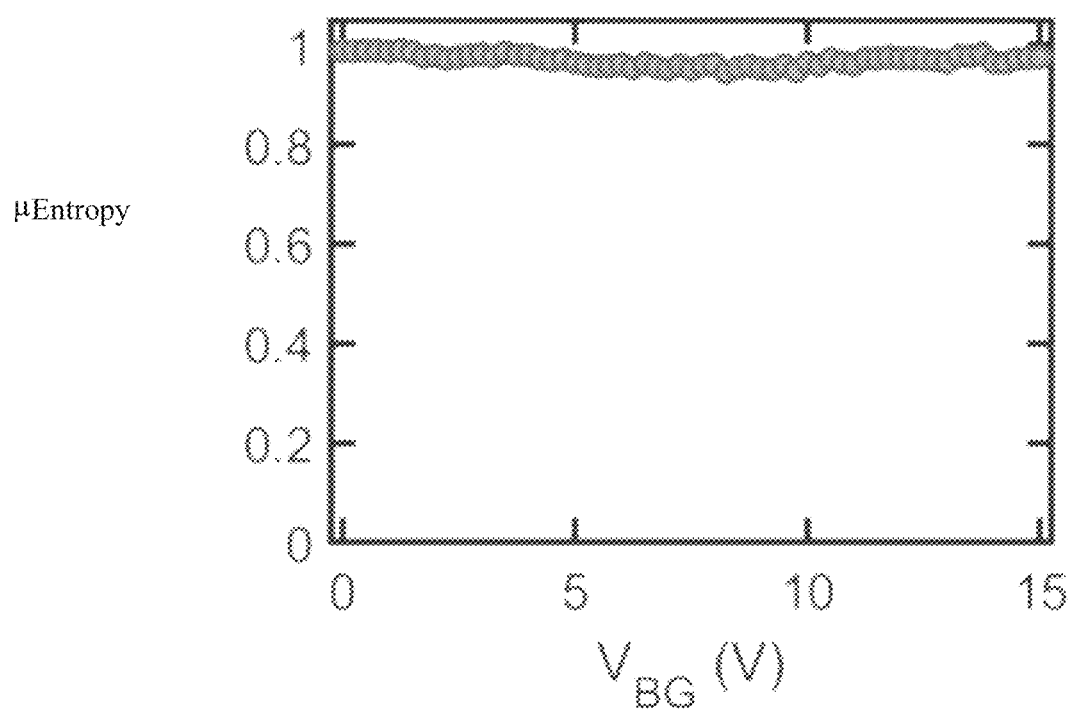
FIG. 22 is a graph illustrating randomness test results for the exemplary set of 24 GFET PUFs, illustrating mean entropy of the CRPs at different gate voltages ($V_{BG}$).

FIGS. 21 and 22, respectively, show the distribution of entropy (E) among 24 different CRPs and the corresponding mean, which was found to be very close to the ideal value of unity, irrespective of the applied gate voltage. This helps confirm that embodiments of our GFET PUFs can provide perfectly random information sources capable of delivering non-volatile on-chip cryptography.

Figure 23:
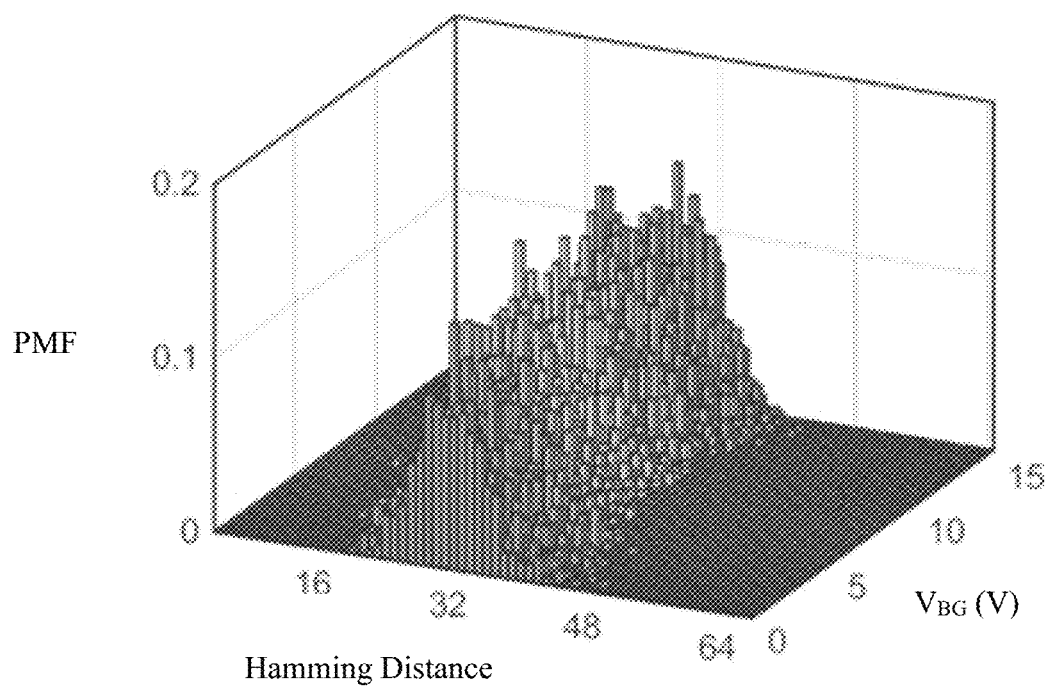
FIG. 23 is a graph illustrating a normalized distribution, or probability mass function (PMF), of the Hamming distance among the pairs of CRPs obtained from the 24 different GFET PUFs of FIGS. 21-22 as a function of the gate voltage.
Figure 24:
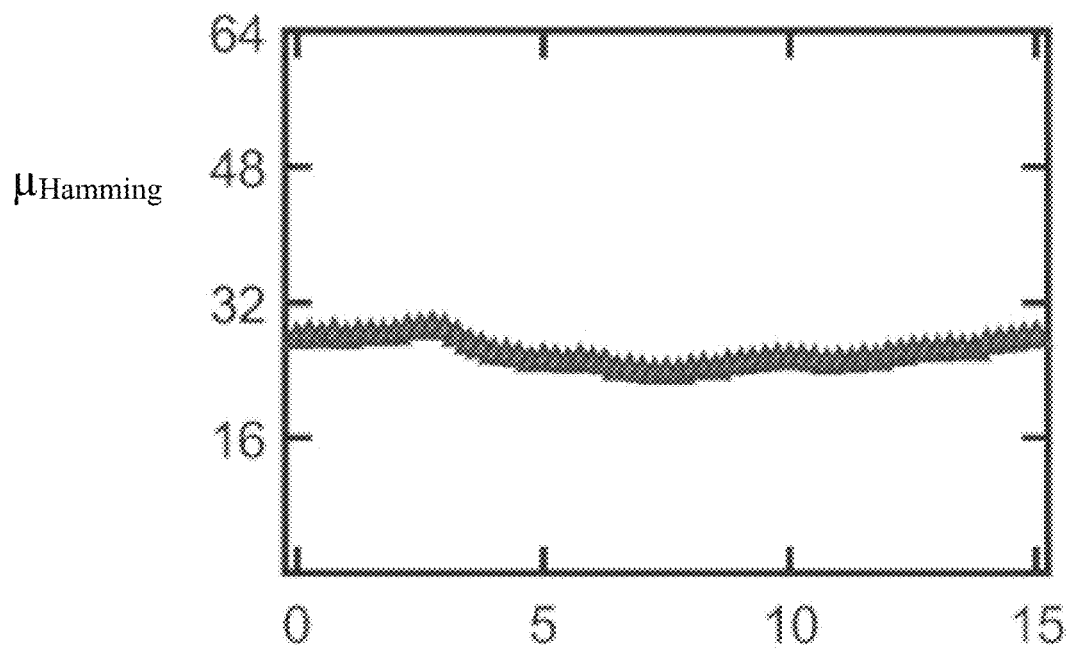
FIG. 24 is a graph illustrating the extracted mean Hamming distance between the CRPs obtained by fitting binomial distributions. The mean Hamming distance ranges from 24 to 30, which is close to the ideal Hamming distance of 32, confirming the uniqueness of the CRPs.

FIG. 23 shows the normalized distribution, or probability mass function (PMF), of the Hamming distance between the 276 ($^{24}C_2$) pairs of CRPs as a function of the gate voltage. The Hamming distance between two CRPs is defined as the number of non-identical bits. Note that if the Hamming distance between a pair of CRPs is too short or too long, one CRP from the knowledge of the other CRP. Preferably, a Hamming distance is equal to half of the bit length as this can help ensure a uniqueness of 50%. FIG. 24 shows that the extracted mean Hamming distance between the CRPs can range from 24 to 30 as a function of the applied gate voltage for embodiments of our array of GFETs, which makes these CRPs reasonably unique with corresponding BFTs ranging from ~2.5×10$^{17}$ to ~1.62×10$^{18}$, which are, in our view, relatively astronomical numbers. The corresponding normalized Hamming distance range from 0.37 to 0.47 for such embodiments.

Figure 25:
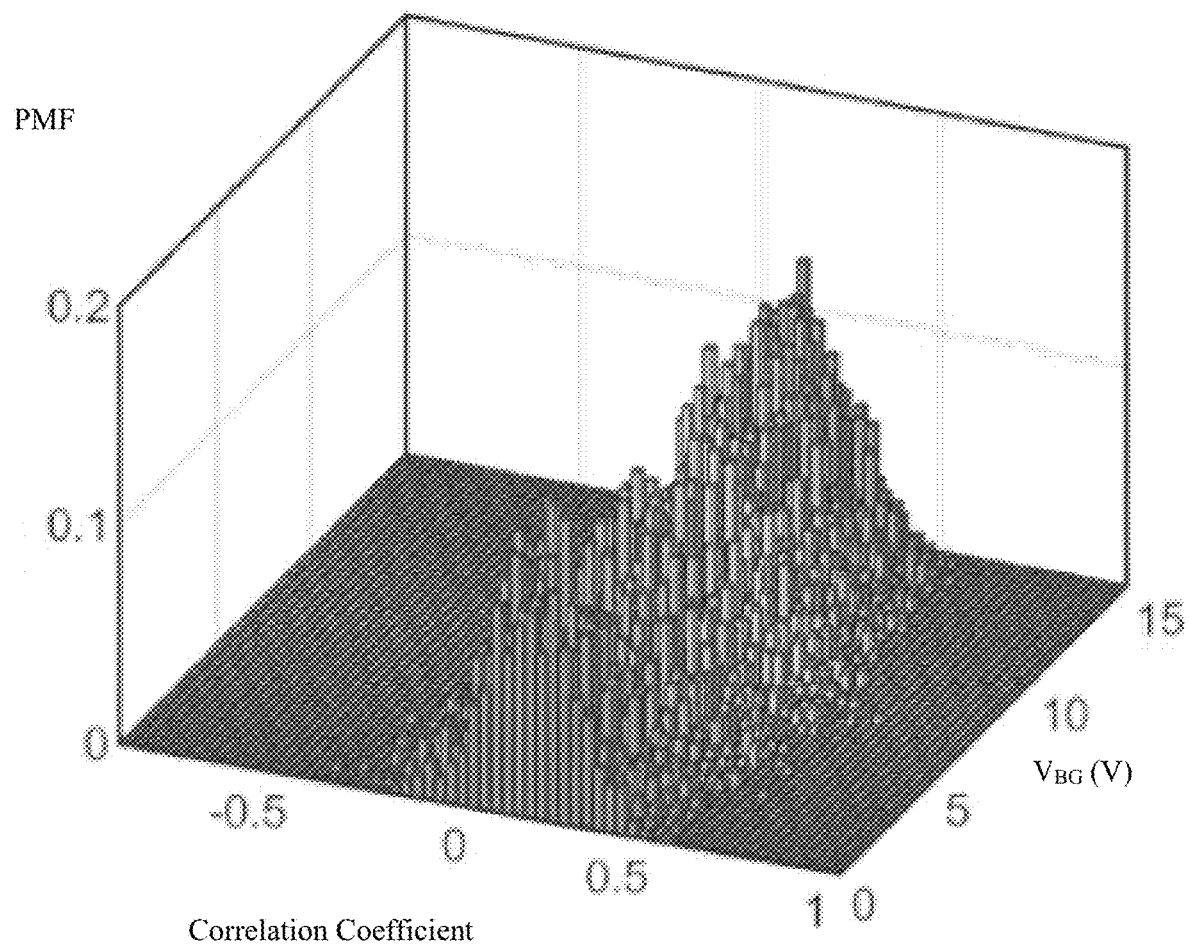
FIG. 25 is a graph illustrating a normalized distribution, or PMF, of the correlation coefficient (CC) among the 276 pairs of CRPs as a function of the gate voltage obtained from the 24 different GFET PUFs of FIGS. 21-22.
Figure 26:
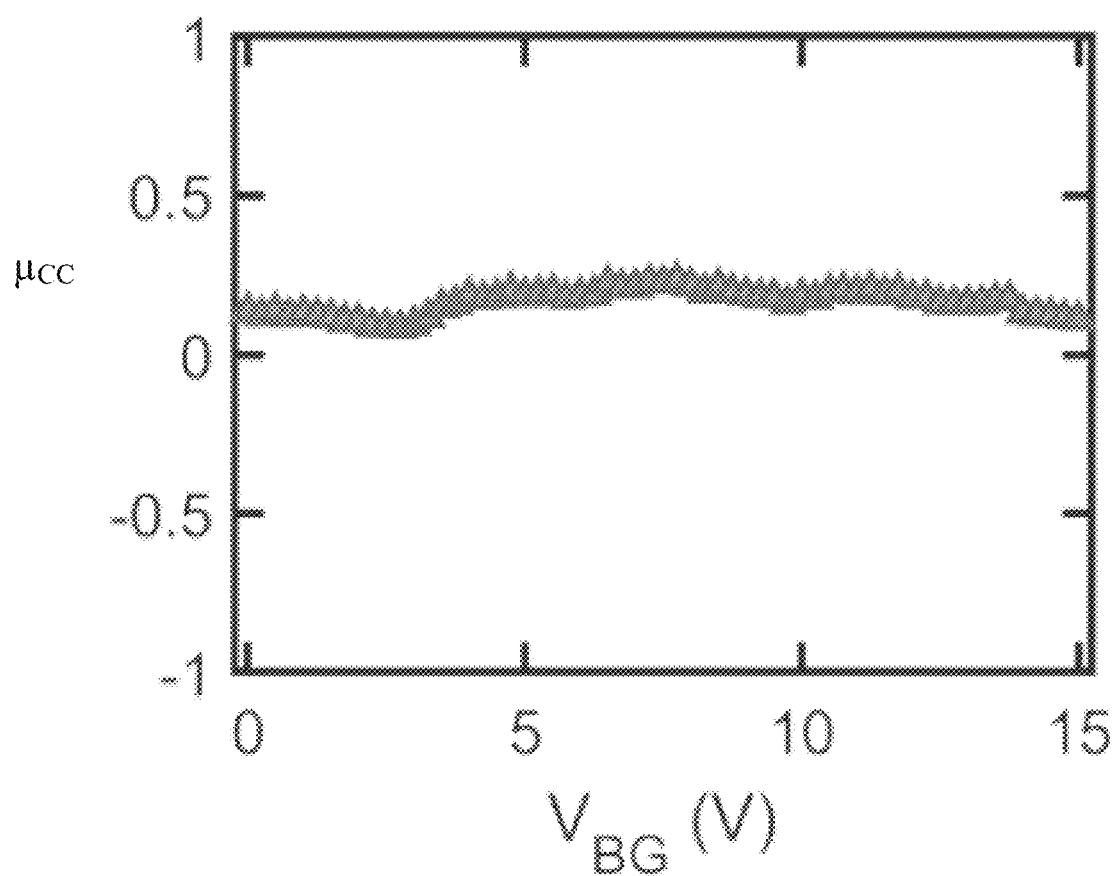
FIG. 26 is a graph illustrating the extracted mean correlation coefficient between the CRPs by fitting binomial distributions obtained for the 24 different GFET PUFs of FIGS. 21-22. The mean correlation coefficient is very close to the ideal value of zero, suggesting that the CRPs are uncorrelated. We believe that the total number of unique CRPs that can be generated using a graphene PUF is $2^{64}$, or $1.8 \times 10^{19}$.

FIG. 25 shows the correlation coefficient among the 276 pairs of CRPs of the embodiment of GFET PUFs as a function of the gate voltage. It should be appreciated that the CC is a measure of linear correlation between two statistical quantities and must be zero for independently and identically distributed random variables. FIG. 26 shows that the mean correlation coefficient can be very close to zero for embodiments of our GFET PUFs, irrespective of the applied gate bias, reasserting our claim that the CRPs generated using graphene-based PUFs are uncorrelated and truly random in nature. The total number of unique CRPs that can be generated from such GFET PUFs is 2$^{64}$ or 1.8×10$^{19}$.

Reproducibility can be an important design consideration for PUFs. It can help ensure that the same response is generated every time the system is subjected to the same challenge, or, in other words, that the response does not change over time or due to variations in temperature or supply voltage. For example, in the case of SRAM-based PUFs, the SRAM cells produce reproducible bit sequences every time the chip is turned ON.

Figure 27:
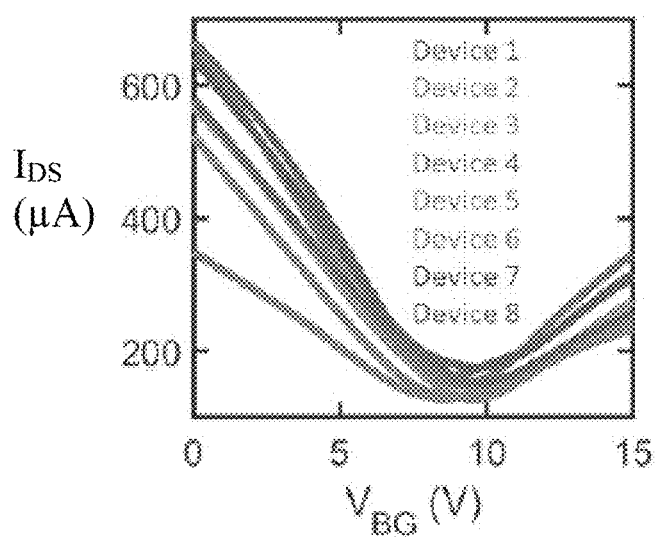
FIG. 27 is a graph illustrating the transfer characteristics of 8 individual GFETs measured at a time (t) of 0 hours (hrs).
Figure 30:
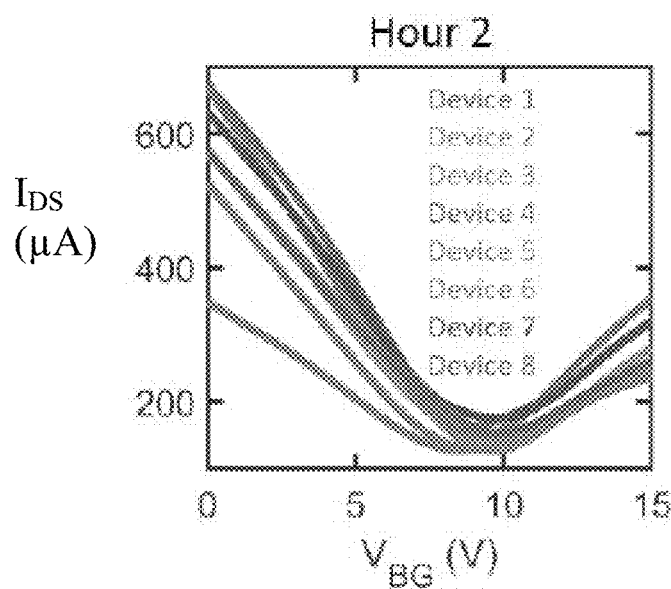
FIG. 30 is a graph illustrating the transfer characteristics of the 8 individual GFETs from FIG. 27 measured after a time (t) of 2 hours (hrs).
Figure 33:
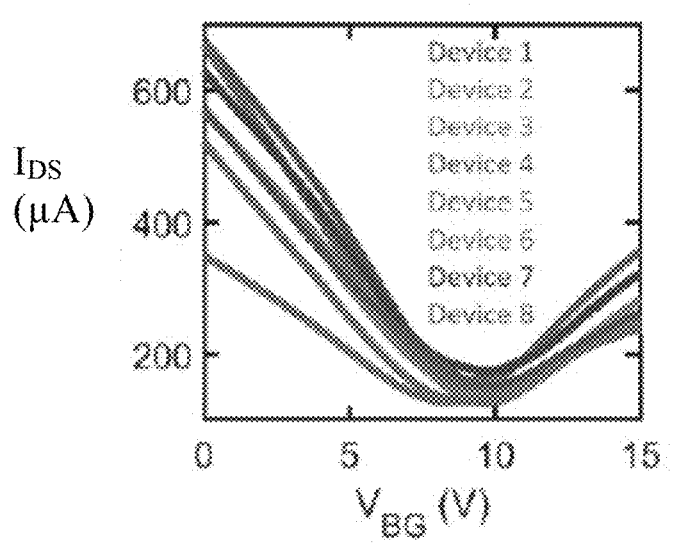
FIG. 33 is a graph illustrating the transfer characteristics of the 8 individual GFETs from FIG. 27 measured after a time (t) of 4 hours (hrs).

We evaluated the reproducibility of embodiments of our GFET PUFs. For instance, we measured one embodiment of the GFET PUFs over a period of 7 hours and generated the responses every 60 mins. FIGS. 27, 30, and 33 show the corresponding transfer characteristics of the individual GFETs measured at t=0, 2, and 4 hours. Clearly, the GFETs demonstrate high stability and reproducibility over time with little-to-no variation. In fact, GFET devices were found to be stable even when measured over 6 days.

Figure 28:
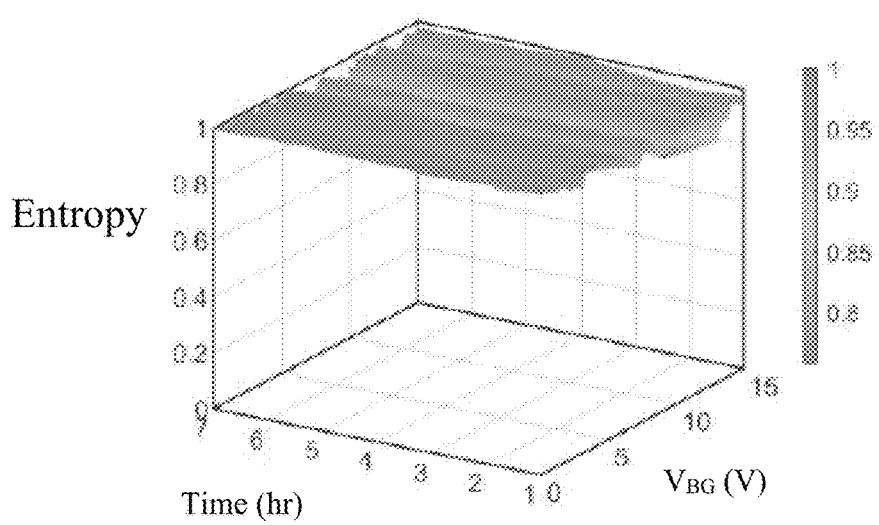
FIG. 28 is a graph illustrating the entropy of a specific CRP measured over time.
Figure 29:
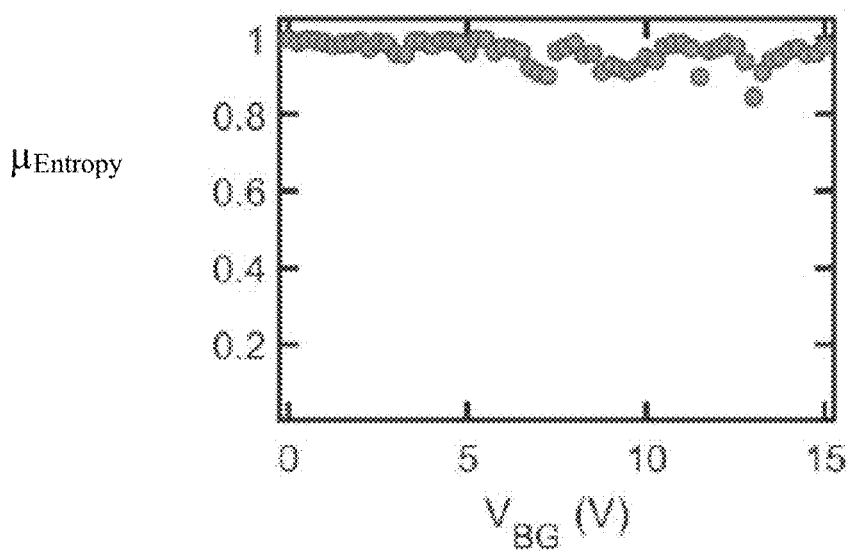
FIG. 29 is a graph illustrating the temporal mean of the entropy for the GFETs, which was found to remain close to unity for any given gate voltage, confirming persistent randomness.
Figure 31:
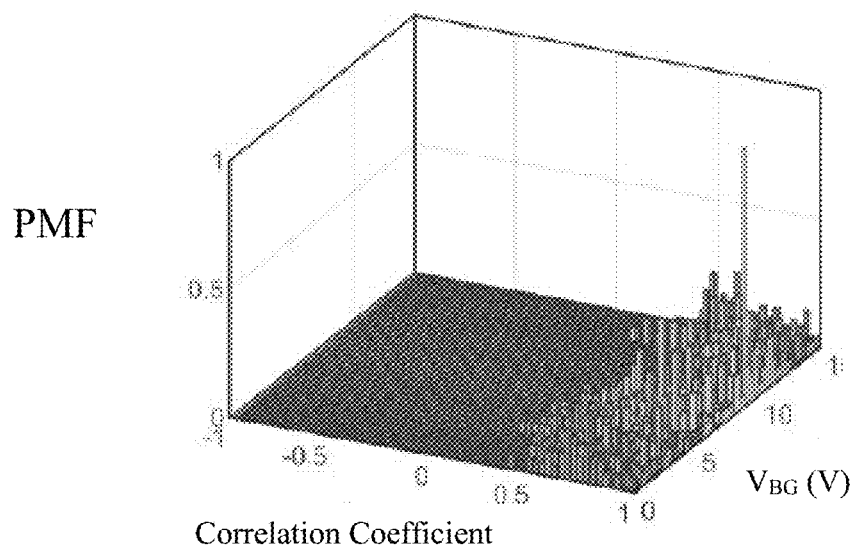
FIG. 31 is a graph illustrating the PMF of the correlation coefficient (CC) between the CRPs obtained over time.
Figure 32:
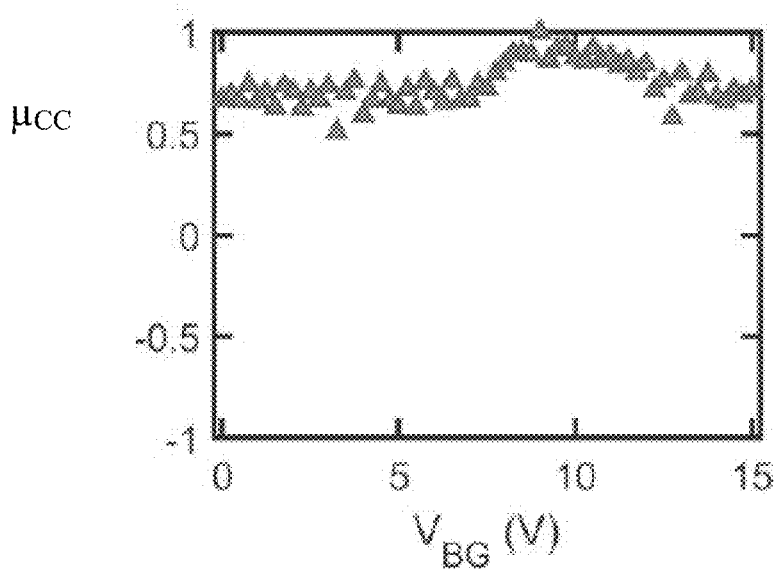
FIG. 32 is a graph illustrating the temporal mean of the correlation coefficient (CC) for different gate voltages ($V_{BG}$). As can be appreciated from FIGS. 31-32, the correlation coefficient values indicate that the correlation is almost perfect for a gate voltage range that corresponds to the Dirac voltages of the individual GFETs.
Figure 34:
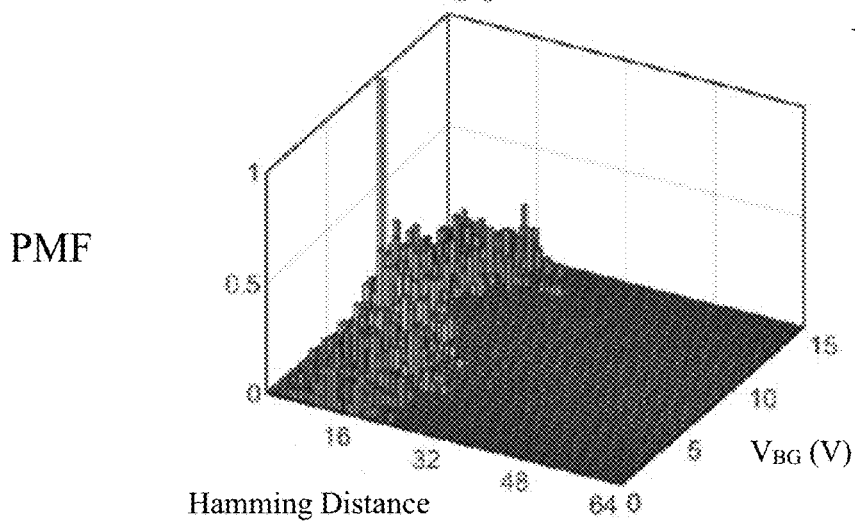
FIG. 34 is a graph illustrating the PMF of the Hamming distance between the CRPs obtained over time.

FIG. 28 shows that the entropy of the response does not change over time and FIG. 29 shows that the temporal mean of entropy remains close to unity for any given gate voltage. The distribution of the CC shown in FIG. 31 and the corresponding mean shown in FIG. 32 confirm that the responses remain highly correlated. Interestingly, the correlation is almost perfect for a gate voltage range that corresponds to the Dirac voltages of the individual GFETs. Finally, FIGS. 34 and 35, respectively, shows the distribution of the Hamming distance between the responses generated at different time instances and the corresponding mean. The Hamming distance was found to be very close to the ideal value of 0 for the same gate voltage range that yielded perfect temporal correlation. We believe that the deviation of the CC and the Hamming distance from their ideal values for other gate voltages is primarily due to the analog to digital quantization introduced by the ADC. We believe this can be mitigated by eliminating the ADC from the peripheral circuit for some embodiments by using a larger GFET PUF of 64 devices, where each GFET represents 1-bit in the CRP.

Ideal reproducibility is almost never achieved for conventional Si PUFs, owing to various factors such as the temporal noise. Therefore, a revised protocol known as fuzzy authentication often has to be followed to allow a certain degree of bit-error in the response to the same challenge. In contrast, embodiments of our GFET PUFs (and systems utilizing such PUFs) can accept the device authentication as long as the Hamming distance between the responses to the identical challenge falls within a predefined Hamming distance threshold. As can be appreciated from FIGS. 27-35, embodiments of our GFET PUFs can be designed to have the advantage of avoiding fuzzy authentication logic and provide maximum reproducibility without any loss of entropy or randomness, so long as the CRPs are obtained at gate voltages close to the Dirac point. Alternatively, large GFET PUFs having over 64 GFETs can be utilized in other embodiments to avoid use of ADC and peripheral circuits (see e.g. FIG. 5).

A PUF is referred to as being reconfigurable if there exists a physical mechanism that can be used to update the system, such that the CRPs corresponding to the reconfigured PUF are completely unpredictable and uncorrelated to the CRPs generated from the original PUF. Reconfigurability can be a desirable feature for a PUF, particularly in reference to the increasing vulnerability of conventional Si PUFs to various model building attacks, side channel attacks, and hardware Trojans. Most conventional Si PUFs either lack reconfigurability or are too resource limited in terms of cost, energy, and complexity for reconfiguration. In contrast, embodiments of our GFET PUFs can be designed to be seamlessly reconfigured without involving any additional hardware and by spending significantly less energy than conventional Si PUFs (e.g. in some embodiments the energy expenditure for our GFET-based PUFs can be frugal as ~100 mJ).

Figure 35:
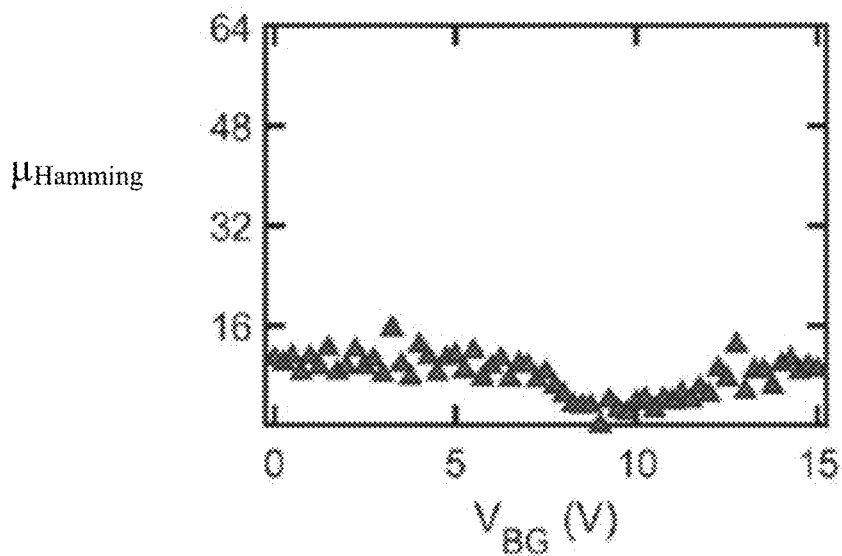
FIG. 35 is a graph illustrating the temporal Hamming distance mean, which ranges from 0 to 16 depending on the applied gate voltage. As can be appreciated from FIGS. 34-35, the Hamming distance is very close to the ideal value of 0 for the same gate voltage range that yielded near-perfect temporal correlation. Therefore, CRPs from GFET PUFs can be generated at these gate voltages without any loss of entropy or randomness in order to ensure maximum reproducibility for some embodiments when such a design criteria is found to be warranted for a particular application.
Figure 36:
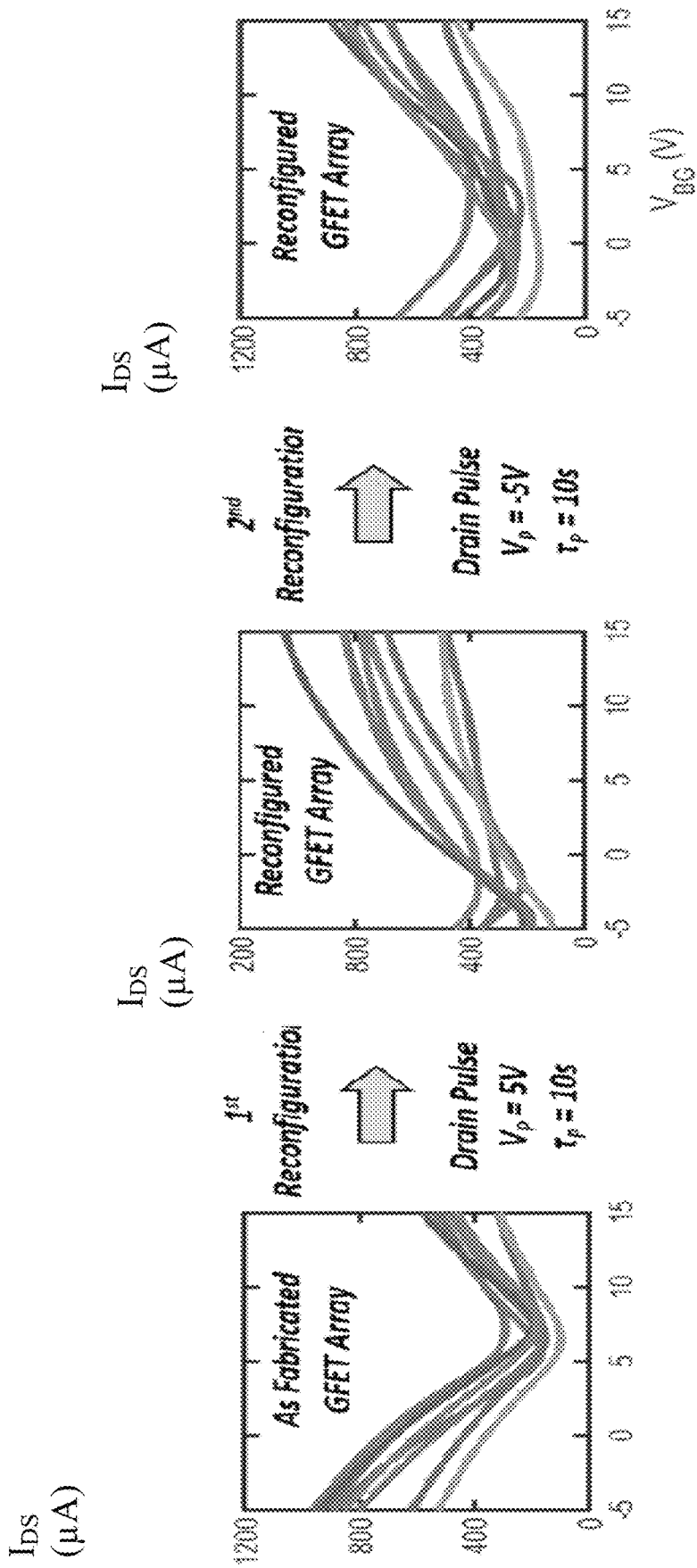
FIG. 36 is a flow chart illustrating the reconfigurability of an embodiment of our GFET PUF. The transfer characteristics of the as-fabricated GFET PUF, where the individual devices exhibit dominant hole transport, is illustrated as the initial configuration in FIG. 36. The intermediate image illustrates the transfer characteristics of the same GFET PUF after a first reconfiguration using a positive drain voltage pulse of magnitude 5 V, which was applied for 10 s. The device characteristics change dramatically and randomly, and show dominant electron transport that is stable and does not revert back to the original characteristics over time, ensuring permanent reconfiguration, which is desired for a PUF. The last graph of the flow chart of FIG. 36 illustrates the transfer characteristics of the same GFET PUF after a second reconfiguration that occurs after the first reconfiguration. The second reconfiguration used similar magnitude, i.e. 5 V, but reverse polarity, i.e. negative, drain bias applied for 10 s. In this instance, the devices recovered partial p-type conduction and became more ambipolar.

FIG. 36 shows the transfer characteristics of 8 GFETs constructing a representative GFET PUF. The individual devices exhibit dominant hole transport due to p-type doping introduced by the substrate and/or charge transfer at the metal/graphene interface. However, when a positive drain voltage pulse of magnitude 5 V is applied to each GFET for 10 s, the device characteristics can be changed dramatically and randomly, as shown in FIG. 36 (middle image illustrating GFET characteristics after a first reconfiguration). The revised GFET characteristics of the first reconfiguration show dominant electron transport that is stable and does not revert back to the original characteristics over time, ensuring permanent reconfiguration, which is desired for a strong PUF. Furthermore, as shown in FIG. 35, a second reconfiguration was performed and the resultant transfer characteristics of the GFETs after the second reconfiguration is shown. This second reconfiguration utilized a similar magnitude, i.e. 5 V, but a reverse polarity, i.e. negative, drain bias applied for 10 s, as compared to the first reconfiguration. In this second reconfiguration, the GFETs recover partial p-type conduction and become more ambipolar. In fact, it is possible to reconfigure the GFET PUF multiple times by cycling between positive and negative drain voltage pulses.

Figure 37:
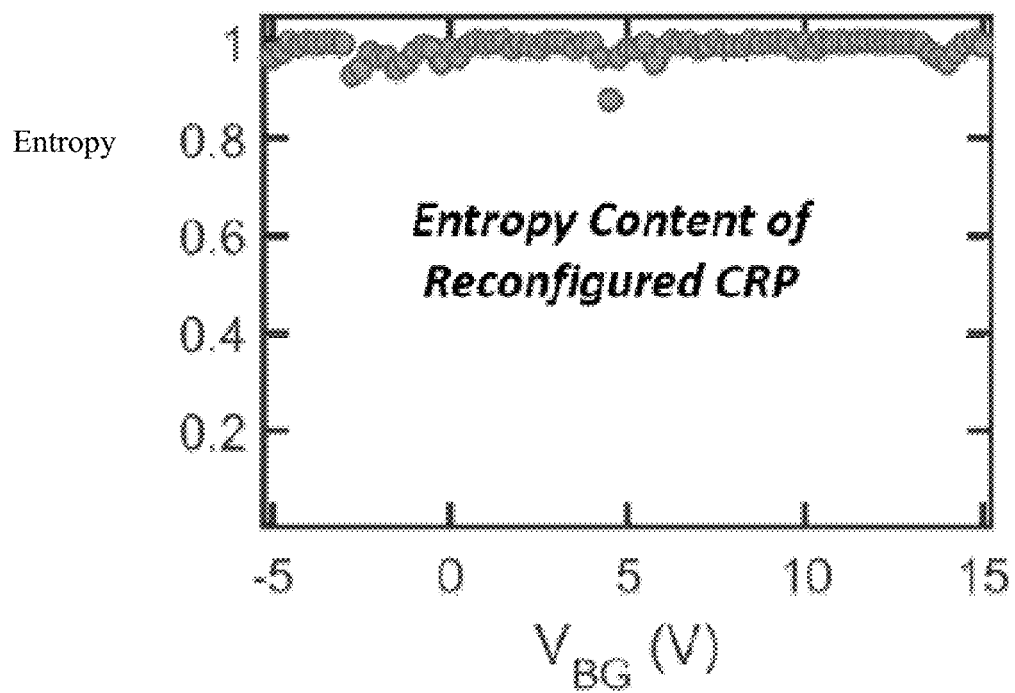
FIG. 37 is a graph illustrating the entropy of the reconfigured CRPs of FIG. 36, which shows that the entropy remains close to unity.
Figure 39:
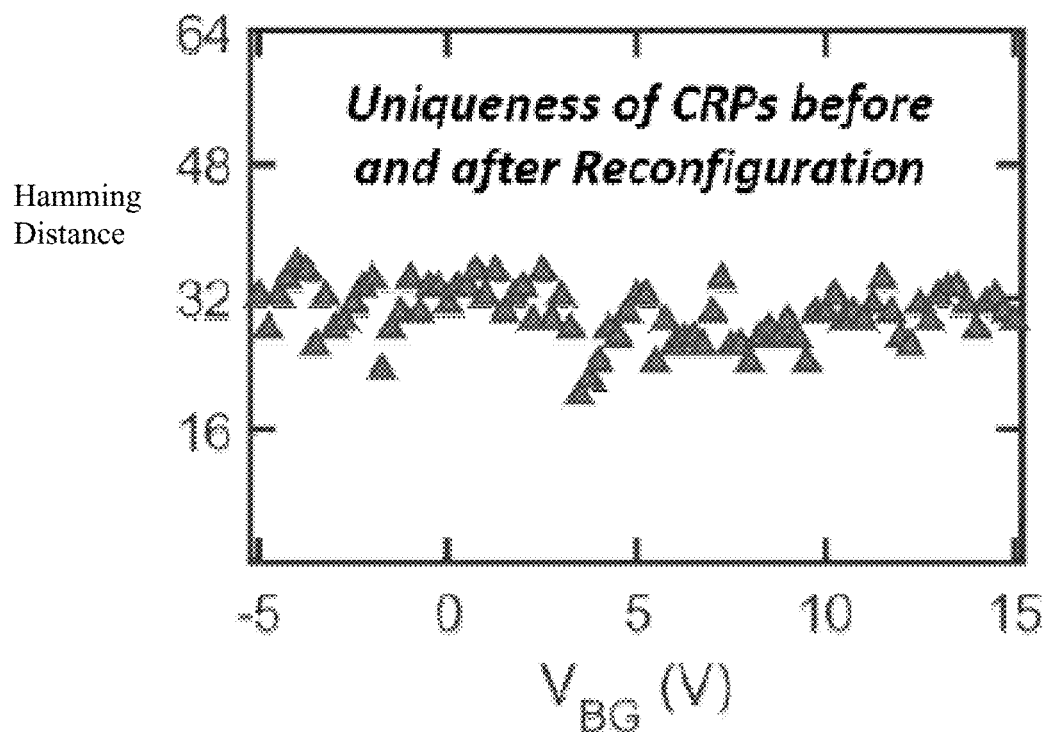
FIG. 39 is a graph illustrating the Hamming distance between the pre- and post-reconfigured CRPs, which are also close their ideal value of 32, irrespective of the gate voltage, which (along with FIG. 41), helps show that embodiments of the GFET PUFs can be seamlessly reconfigured without any loss of randomness.
Figure 41:
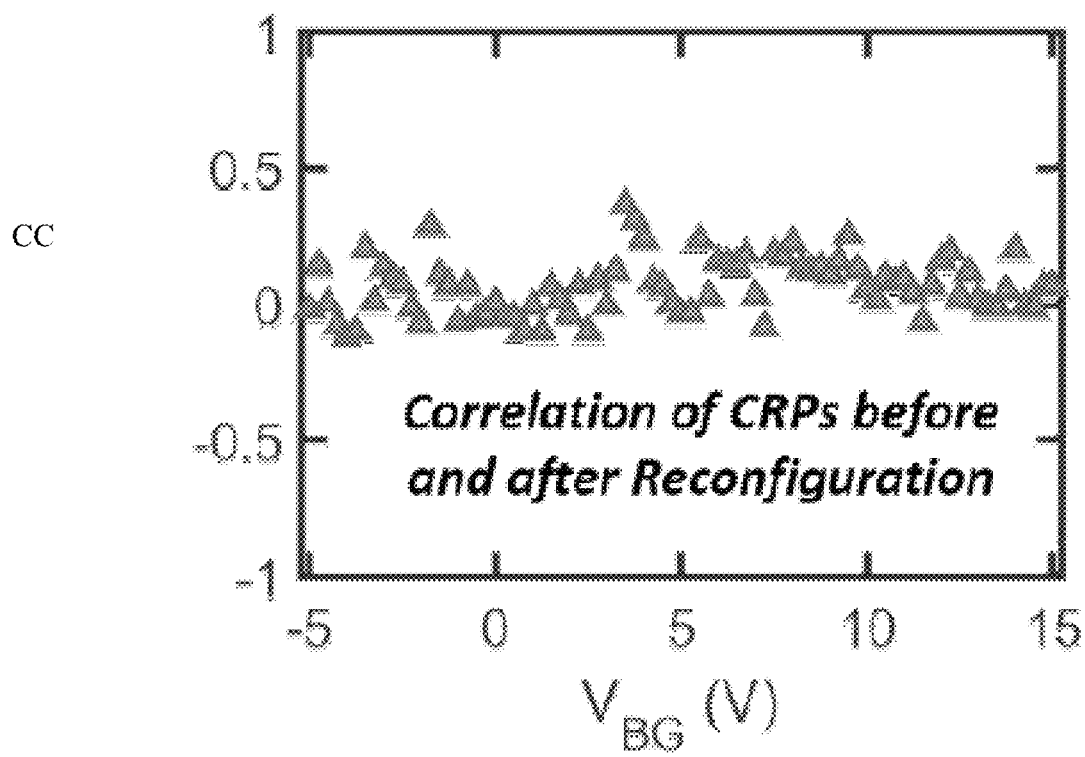
FIG. 41 is a graph illustrating the correlation coefficient between the pre- and post-reconfigured CRPs, which are also close their ideal value of 0, irrespective of the gate voltage, which (along with FIG. 39) helps show that embodiments of the GFET PUFs can be seamlessly reconfigured without any loss of randomness. It is possible to reconfigure the GFET PUF multiple times by cycling between positive and negative drain voltage pulses.

FIG. 37 shows that the entropy of the CRP generated using the reconfigured GFET PUF remained close to unity, irrespective of the gate voltage used for extracting the CRP. FIG. 39 shows that the Hamming distance between the CRPs obtained from the pre- and post-reconfigured GFET PUF is close to the ideal value of 32. FIG. 41 shows that the CRPs are uncorrelated, reinforcing our claim that GFET PUFs can be seamlessly reconfigured without any loss of randomness. The amount of energy ($U_R$) spent to reconfigure a GFET PUF is given by Equation 6 (Eq. 6):

$$U_R = \sum_{i=1}^{N} I_{DS}(i) V_P \tau_P \qquad [\text{Eq. 6}]$$

Here, N is the number of GFETs in a given PUF, $V_P$ is the pulse magnitude, $\tau_P$ is the duration of the drain voltage pulse, and $I_{DS}$ (i) is the current in the $i^{th}$ GFET during reconfiguration. We calculated $U_R$ to be ~100 mJ/PUF, which can be further scaled down in other embodiments by reducing the GFET width (leading to lesser absolute current) and channel length (leading to smaller reconfiguration voltage). As demonstrated above, the GFET PUFs can be reconfigured multiple times.

Figure 38:
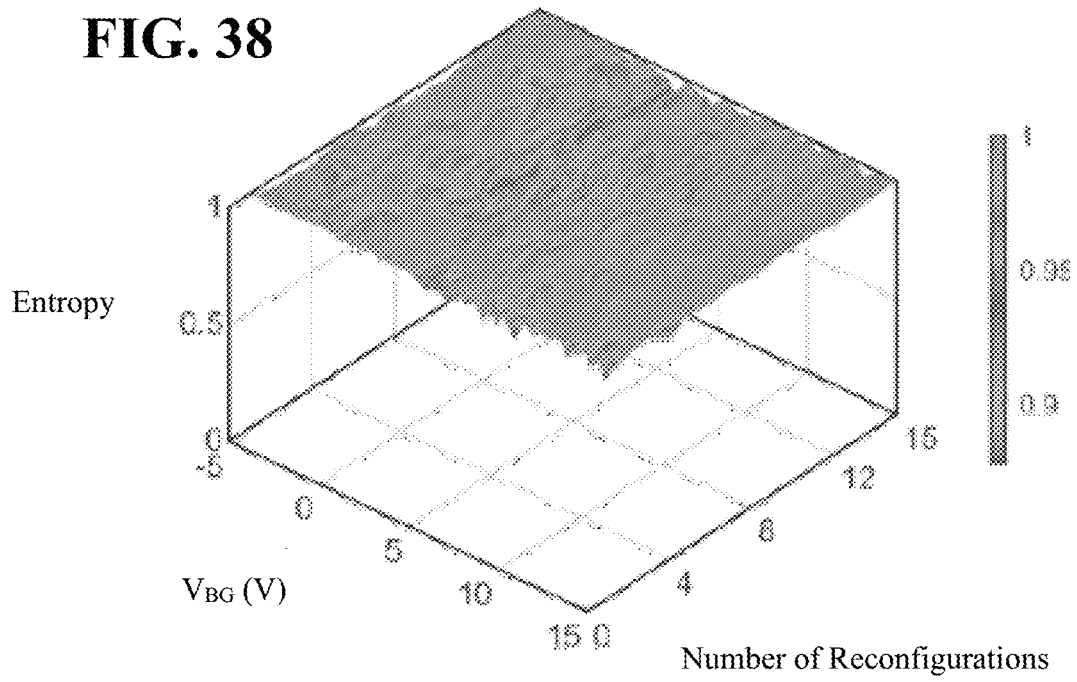
FIG. 38 is a graph illustrating entropy of the CRPs obtained from multiple (14) reconfigurations of the same GFET PUF.
Figure 40:
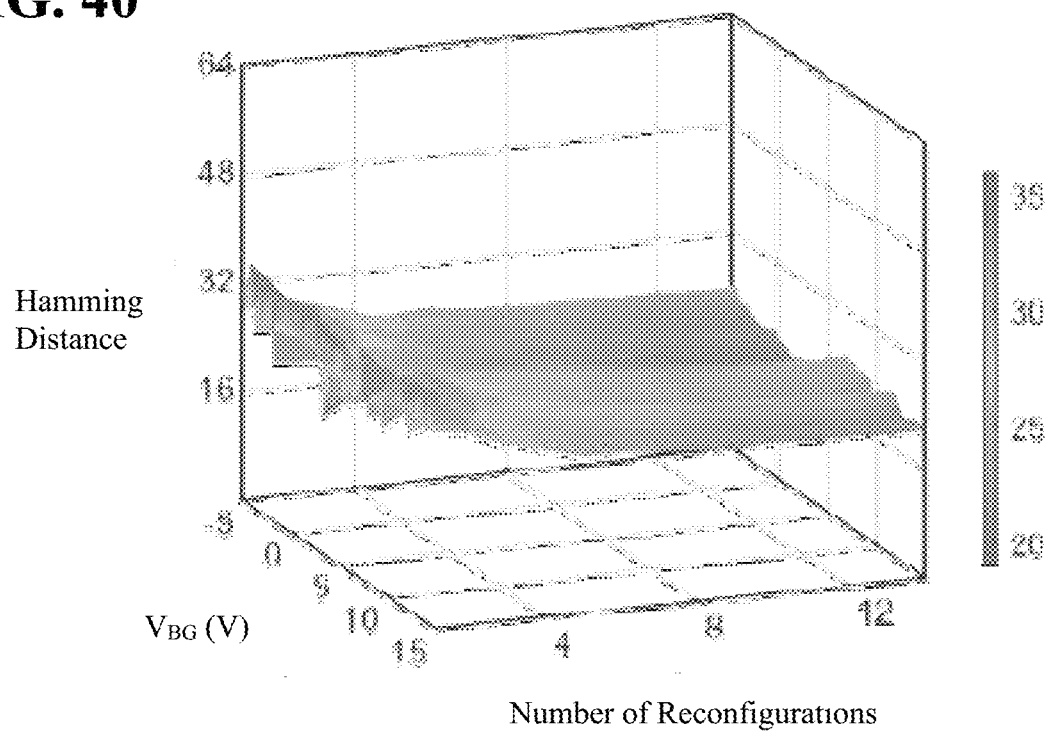
FIG. 40 is a graph illustrating that the average Hamming distance between the reconfigured CRPs can decrease.
Figure 42:
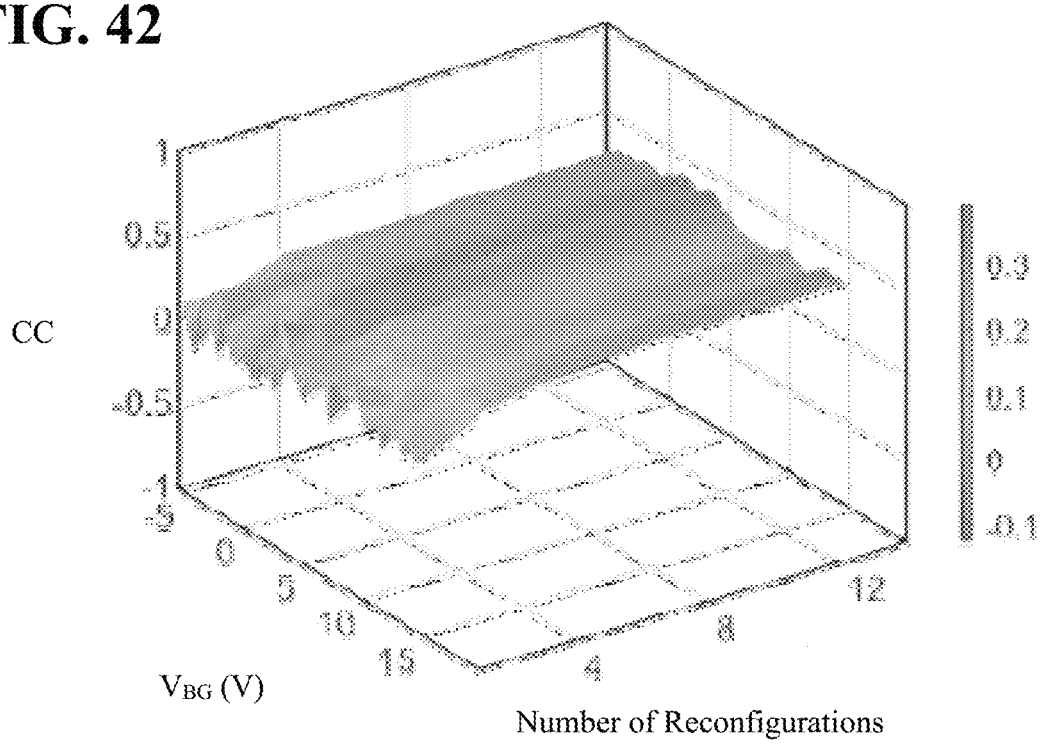
FIG. 42 is a graph illustrating that the correlation coefficient (CC) between the reconfigured CRPs increases as the system is continually reconfigured. This shows that some embodiments can experience some loss in uniqueness with successive reconfiguration.

However, there is typically a slight penalty to pay every time the system is compromised (e.g. reconfigured). In order to investigate the extent of recyclability of embodiments of the GFET PUFs, we reconfigured the system of 14 times. As shown in FIG. 38, the CRPs obtained after each reconfiguration is found to possess near ideal entropy, irrespective of the gate voltage, which confirms their randomness. However, as seen in FIG. 40, the average Hamming distance between the CRPs decreases to 22 (0.34 in case of normalized Hamming distance) as the system is continually reconfigured. This indicates a gradual loss in the uniqueness of the reconfigured CRPs. The same interpretation can be made from FIG. 42, which shows a continuous increase in the average correlation between the reconfigured CRPs. While the number of brute force trials (BFTs) necessary for the decryption of the CRPs still remains reasonably high, $8 \times 10^{16}$ ($^{64}C_{22}$) \ for a Hamming distance of 22, compared to $180 \times 10^{16}$ ($^{64}C_{32}$) for the ideal Hamming distance of 32, the system can be argued to have become less resilient to attack after multiple reconfigurations.

The robustness of the evaluated embodiment of our GFET PUF system can be improved by increasing the size of the GFET PUF. For example, we fabricated another embodiment of our GFET PUF that included 16 GFETs (128 bits) instead of 8 GFETs (64 bits). In this case, the reconfigurability achieved a similar Hamming distance of 44 (0.34 in case of normalized Hamming distance) but lead to a staggering improvement against vulnerability due to repeated reconfiguration. The number of BFTs necessary for the decryption of the CRPs due to this design change is ~$4 \times 10^{34}$ ($^{128}C_{44}$), which is 18 orders of magnitude higher than the previous case. Therefore, just by doubling the number of GFETs in the PUF, embodiments of our system can be made exponentially more robust with reconfiguration. However, this type of design change has to account for the increased cost of area and energy overhead.

Improvements can be made in area efficiency by reducing the size of the individual GFET devices, a process that results in no loss of entropy. However, it is contemplated that the peripheral circuit of the PUF may limit the ultimate area scaling for such embodiments. Similarly, energy efficiency can be improved by scaling the supply voltage utilized in embodiments of the GFET PUF. Even without such design adjustments, it should be appreciated that embodiments of our GFET PUFs can still be considered as very strong PUFs, capable of averting a large number of compromises through seamless reconfiguration, which can also be accomplished remotely without any physical intervention. This provides a significant improvement in function and operation over conventional Si PUF systems.

The reconfiguration approach for some embodiments of our GFET PUFs can exploit dissociative adsorption and the forming process, which is non-deterministic and random in nature, to prevent prerecording of the CRPs. The maximum number of reconfigurations may be limited by this approach since the resistive switching in GFETs becomes deterministic beyond the forming process. To address this issue that may affect the reconfigurability of some embodiments of our GFET PUF, we investigated a deterministic reconfiguration scheme that can exploit molecular absorption as described in 57.

Figure 57:
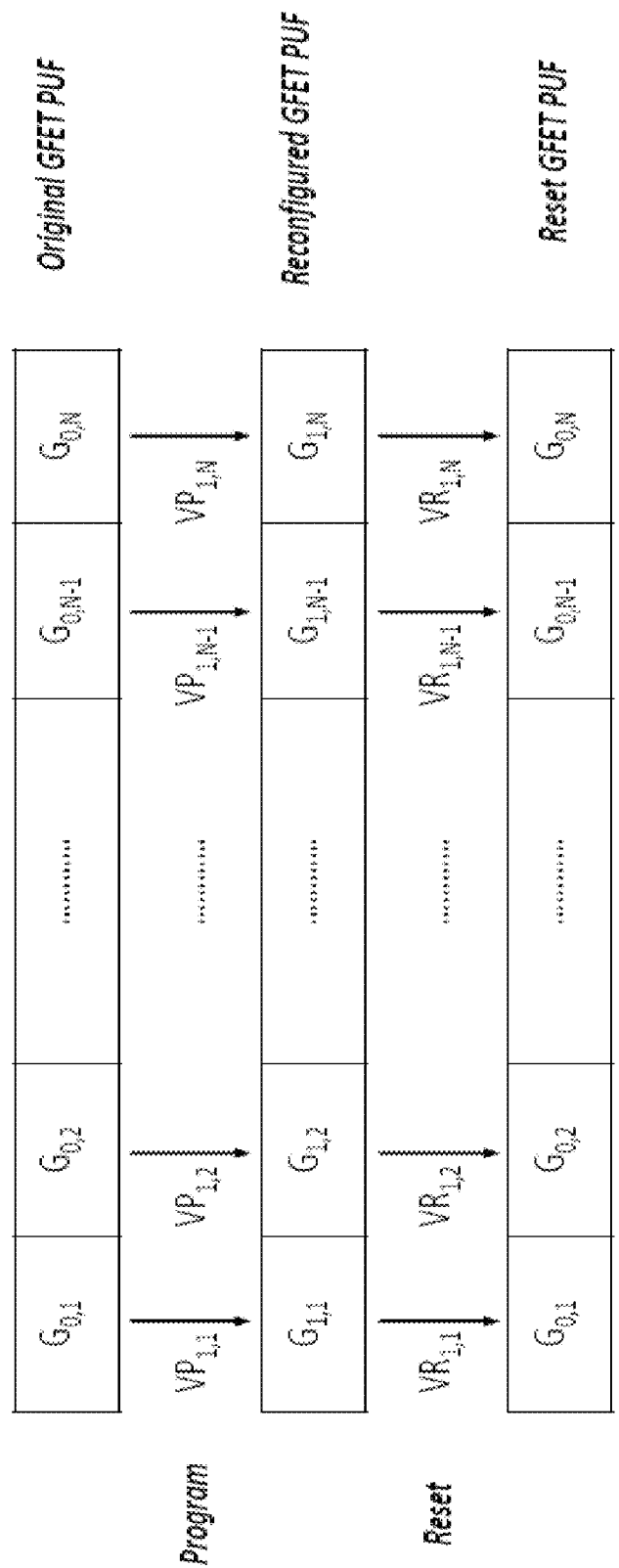
FIG. 57 is a schematic flow diagram illustrating an exemplary reconfiguration process for an exemplary embodiment of our GFET PUF. In this exemplary process, all GFETs in a GFET PUF ($G_{0,1}, G_{0,2}, \ldots, G_{0,N}$) are subjected to the forming process and the original CRP is recorded by a server. Next, programming voltage pulses with pulse magnitude drawn from a uniform random distribution ($VP_{1,1}, VP_{1,2}, \ldots, VP_{1,N}$) within a pre-selected voltage range (e.g. between a range of 3 V and 6 V) are applied to reconfigure each GFET. Reconfigured CRPs are then recorded using these reconfigured GFETs ($G_{1,1}, G_{1,2}, \ldots, G_{1,N}$). Reset voltage pulses with pulse magnitude ($VR_{1,1}, VR_{1,2}, \ldots, VR_{1,N}$) within a pre-selected reset voltage range (e.g. a range of between −3 V and −6 V) are then applied accordingly to reset the GFETs to their original conductance states ($G_{0,1}, G_{0,2}, \ldots, G_{0,N}$). This exemplary process can be repeated to record as many CRPs as desired before delivering a chip having the GFET PUF to an end-user.

We found that the reconfiguration approach shown in FIG. 57 can allow prerecording of CRPs by a server (e.g. a computer device having hardware that includes a processor connected to a non-transitory computer readable medium) as well as offers orders of magnitude increase in the number of reconfigurations ($N_r$) that may be successfully performed on the GFET PUF.

As can be seen in FIG. 57, an embodiment of this reconfiguration process can include a first step in which all GFETs in a GFET PUF ($G_{0,1}, G_{0,2}, \ldots, G_{0,N}$) are subjected to the forming process and the original CRP is recorded by the server. There are N GFETs constructing the PUF (e.g. N can be any suitable number, such as, for example, 8 GFETs, 24 GFETs, 64 GFETs, 256 GFETs, a number of GFETs between 8 and 256, over 256 GFETs, etc.). Next, programming voltage pulses with pulse magnitude drawn from a uniform random distribution ($VP_{1,1}, VP_{1,2}, \ldots, VP_{1,N}$) within a pre-selected programming voltage range (e.g. between 3 V and 6 V, etc.) are applied to reconfigure each of the N GFETs in the GFET PUF. Using the reconfigured GFETs ($G_{1,1}, G_{1,2}, \ldots, G_{1,N}$), the reconfigured CRP is recorded via the server. Reset voltage pulses with pulse magnitude ($VR_{1,1}, VR_{1,2}, \ldots, VR_{1,N}$) within a pre-selected reset voltage range (e.g. between −3 V and −6 V, etc.) are then applied accordingly to reset the GFETs to their original conductance states ($G_{0,1}, G_{0,2}, \ldots, G_{0,N}$).

Figure 58:
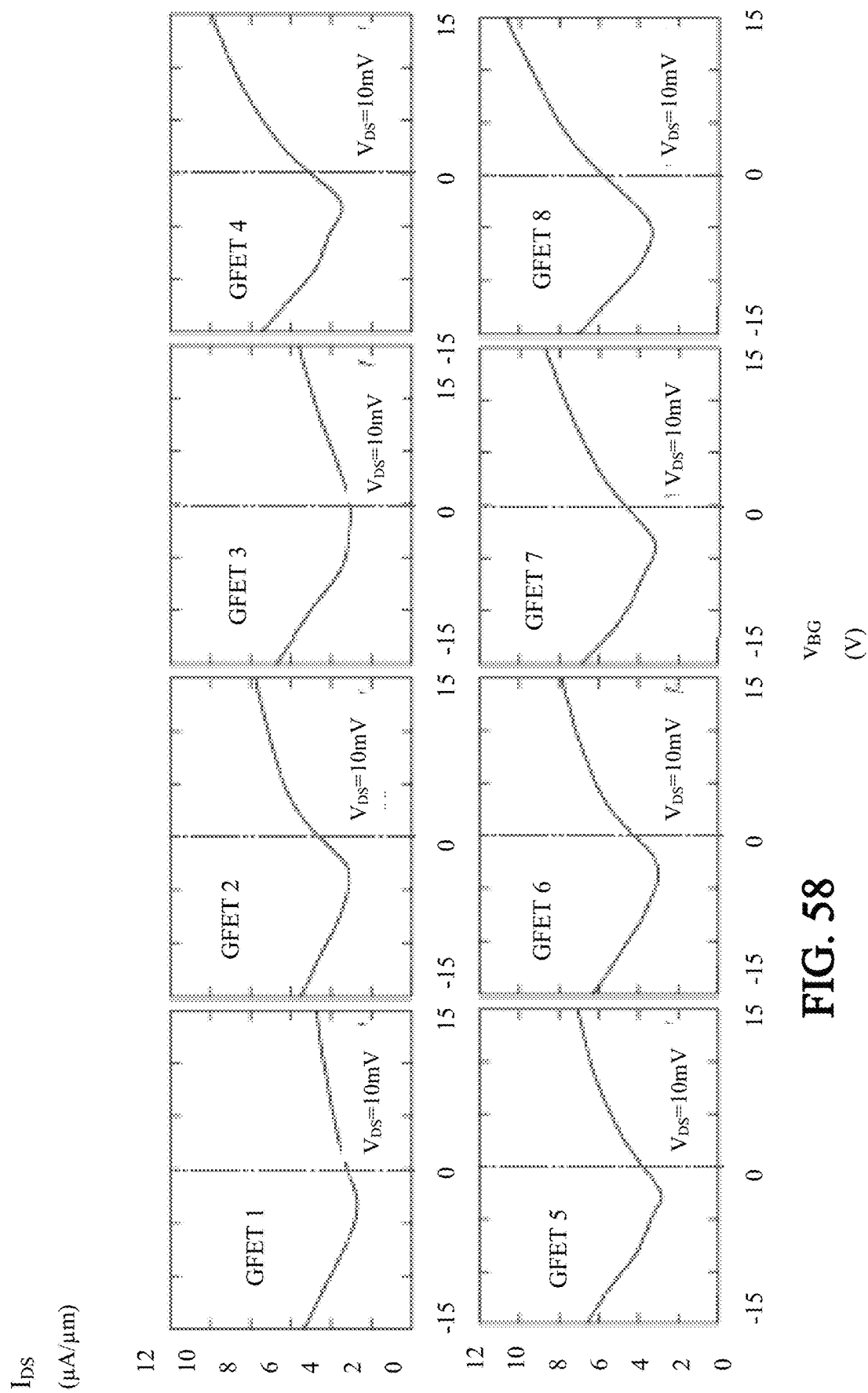
FIG. 58 is series of graphs illustrating the transfer characteristics of 8 exemplary GFETs (GFET 1, GFET 2, GFET 3, GFET 4, GFET 5, GFET 6, GFET 7, and GFET 8), post-forming via the exemplary process of FIG. 57.
Figure 59:
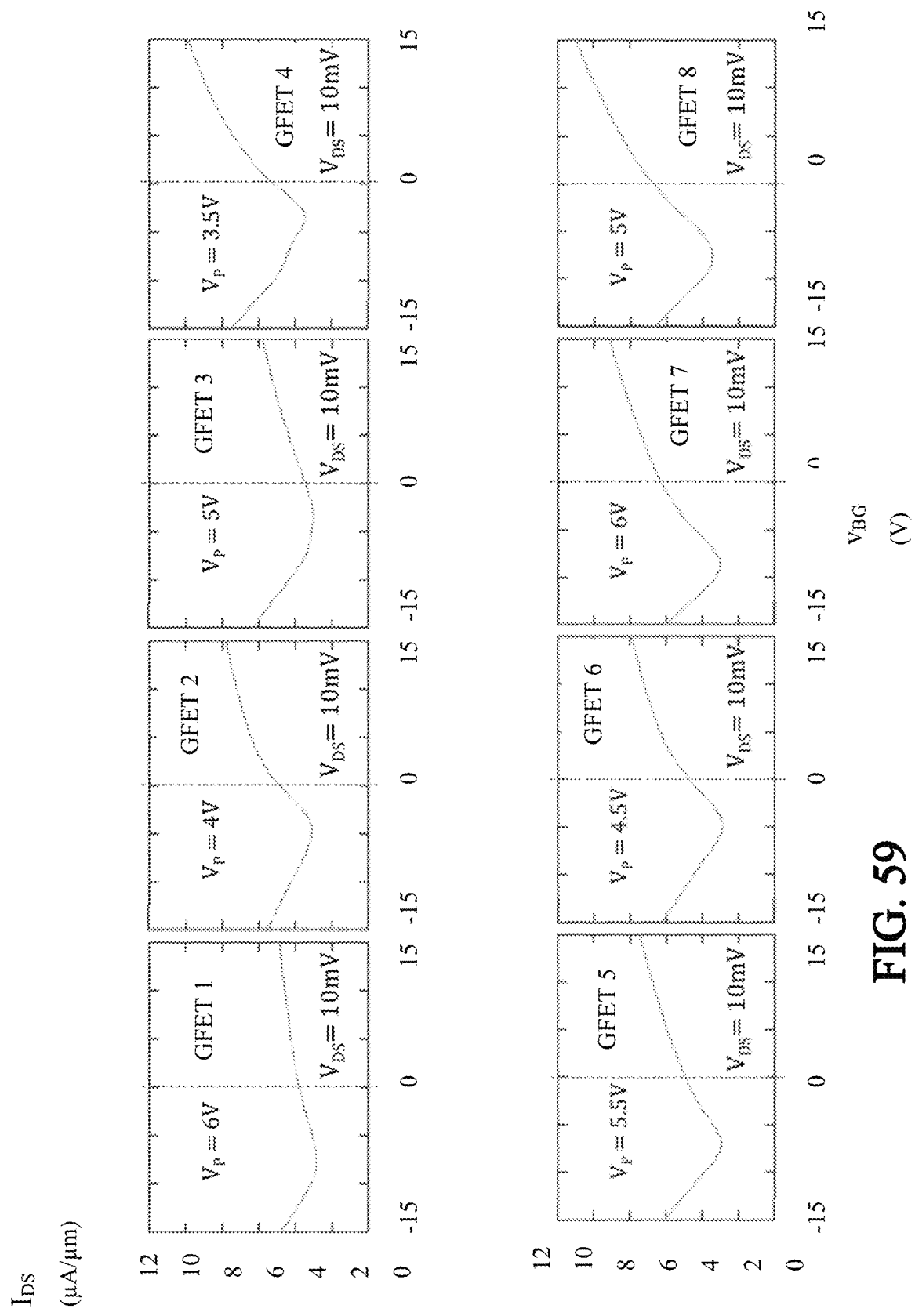
FIG. 59 is a series of graphs illustrating the transfer characteristics of the 8 exemplary GFETs (GFET 1, GFET 2, GFET 3, GFET 4, GFET 5, GFET 6, GFET 7, and GFET 8) post-programming via use of the exemplary process of FIG. 57.
Figure 60:
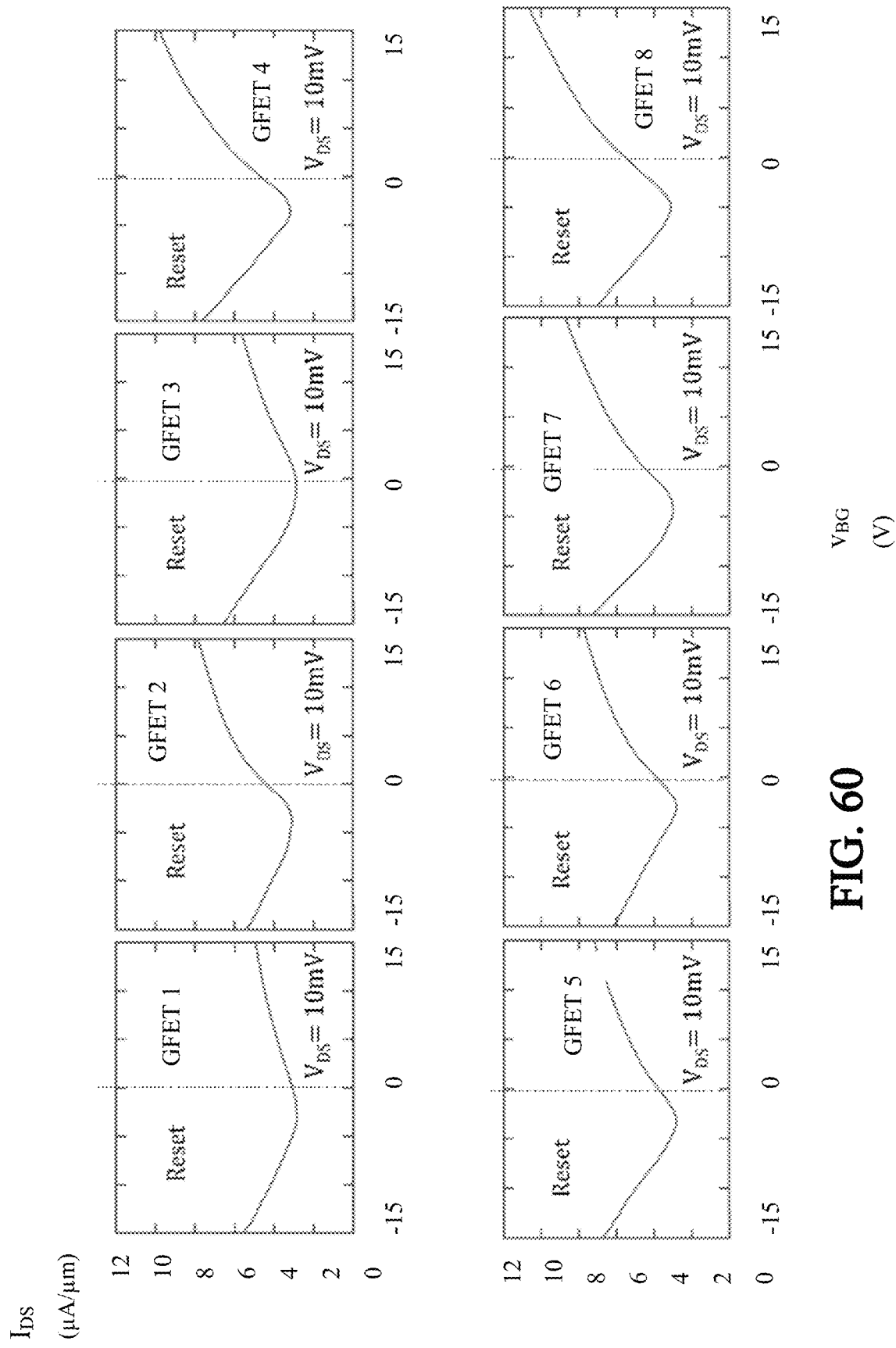
FIG. 60 is a series of graphs illustrating the transfer characteristics of the 8 exemplary GFETs (GFET 1, GFET 2, GFET 3, GFET 4, GFET 5, GFET 6, GFET 7, and GFET 8) post-reset via use of the exemplary process of FIG. 57.

This reconfiguration process can be repeated to record as many CRPs as desired before delivering a chip having the GFET PUF incorporated thereon to an end-user. FIGS. 58-60, respectively, show the transfer characteristics of 8 GFETs, post-forming, post-programming, and post-reset by use of the exemplary reconfiguration method shown in FIG. 57 in which the pre-selected programming voltage range was between 3 V and 6 V and the pre-selected reset voltage range was between −3 V and −6 V. It should be appreciated that other embodiments can utilize other types of programming voltage range (e.g. 2-6 V, 3-9 V, 1-8 V, etc.) and reset voltage ranges (e.g. −2 to −6V, −1 to −9 V, −1 to −8 V, etc.).

Figure 61:
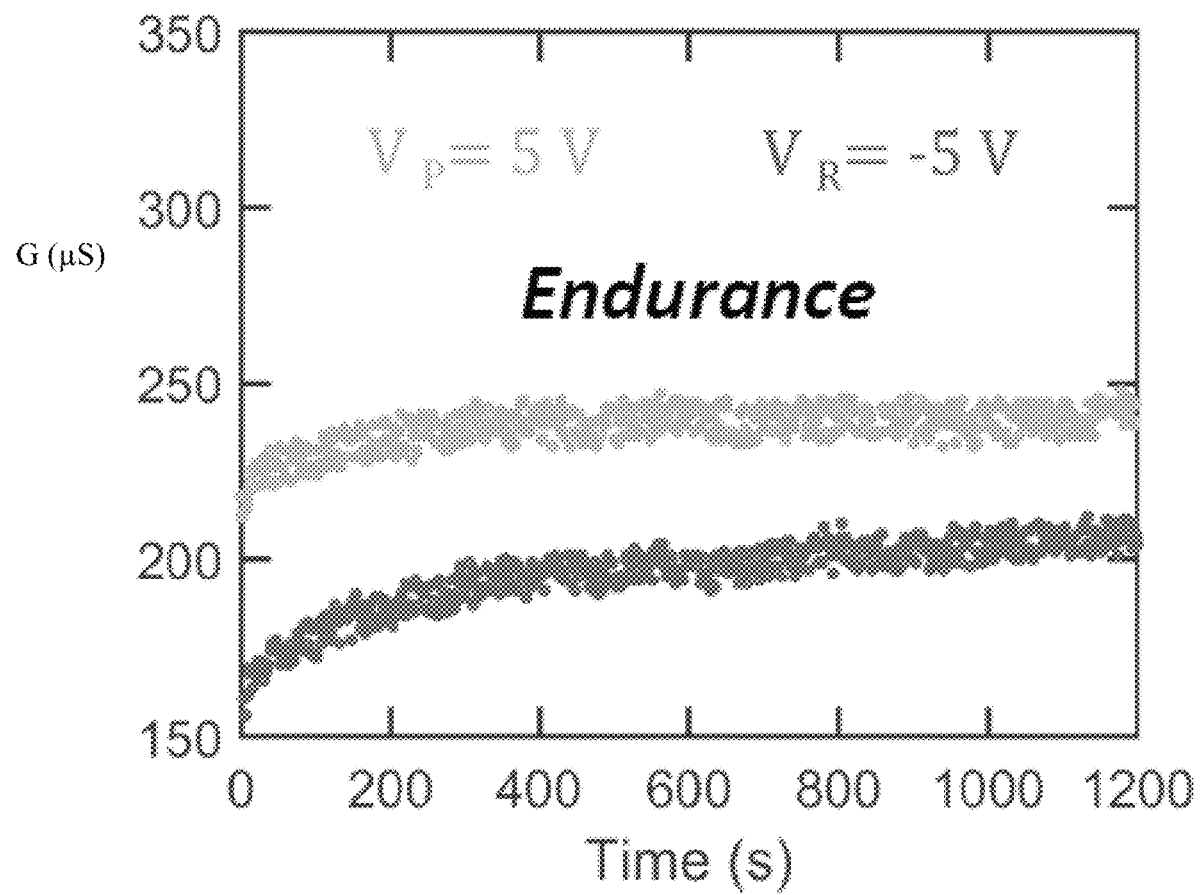
FIG. 61 is a graph illustrating programming ($V_P$) and reset ($V_R$) endurance for 200 cycles.

The voltage pulse magnitudes used for the reconfiguration of different GFETS (e.g. GFET 1, GFET 2, GFET 3, GFET 4, GFET 5, GFET 6, GFET 7, and GFET 8) are shown in the insets of FIGS. 58-60. The normalized Hamming distance between the CRPs obtained from post-forming (un-reconfigured) and post-programming (reconfigured) GFET PUFs was found to be 0.5. The normalized Hamming distance between the CRPs obtained from post-forming and post-reset GFET PUFs was found to be 0. FIG. 61 shows the programming and reset endurance for 200 cycles. The energy spent on reconfiguration of the GFET PUF using this approach is 10 times lower, ~10 milli-Joules (mJ), as smaller programming/reset pulse widths can be used.

We also developed an empirical model, based on the experimental data, to capture the shift in Dirac voltage, $\Delta V_{Dirac}$, as a function of the programming and reset pulse magnitude as described in Equations 7a and 7b (Eq. 7a and Eq. 7b) below:

$$\Delta V_{Dirac} = V_{0P} \exp(\alpha_P V_P) \quad \text{[Eq. 7a]}$$

$$\Delta V_{Dirac} = V_{0R} \exp(\alpha_R V_R) \quad \text{[Eq. 7b]}$$

Figure 62:
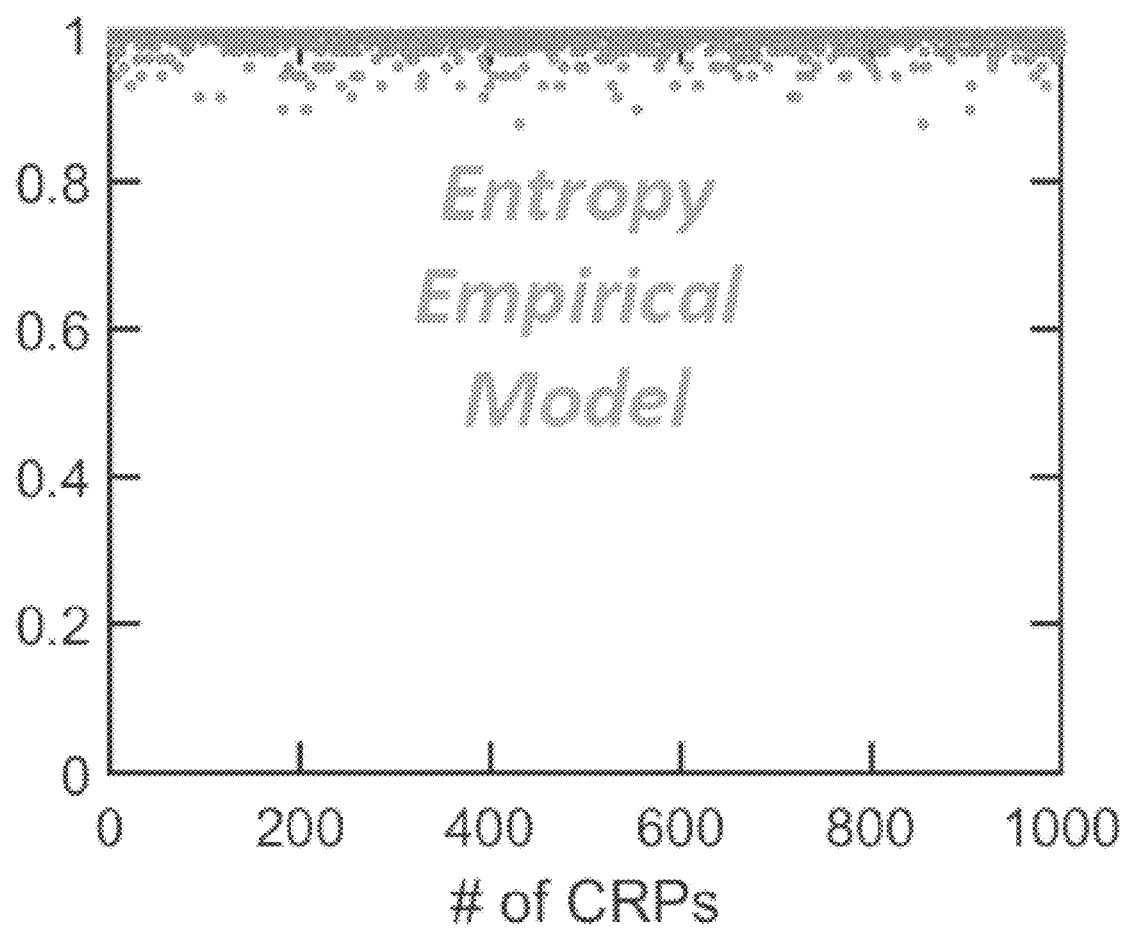
FIG. 62 is a graph illustrating simulation results for the distribution of entropy for 1000 reconfigured CRPs obtained from 1 GFET PUF using an empirical model.
Figure 63:
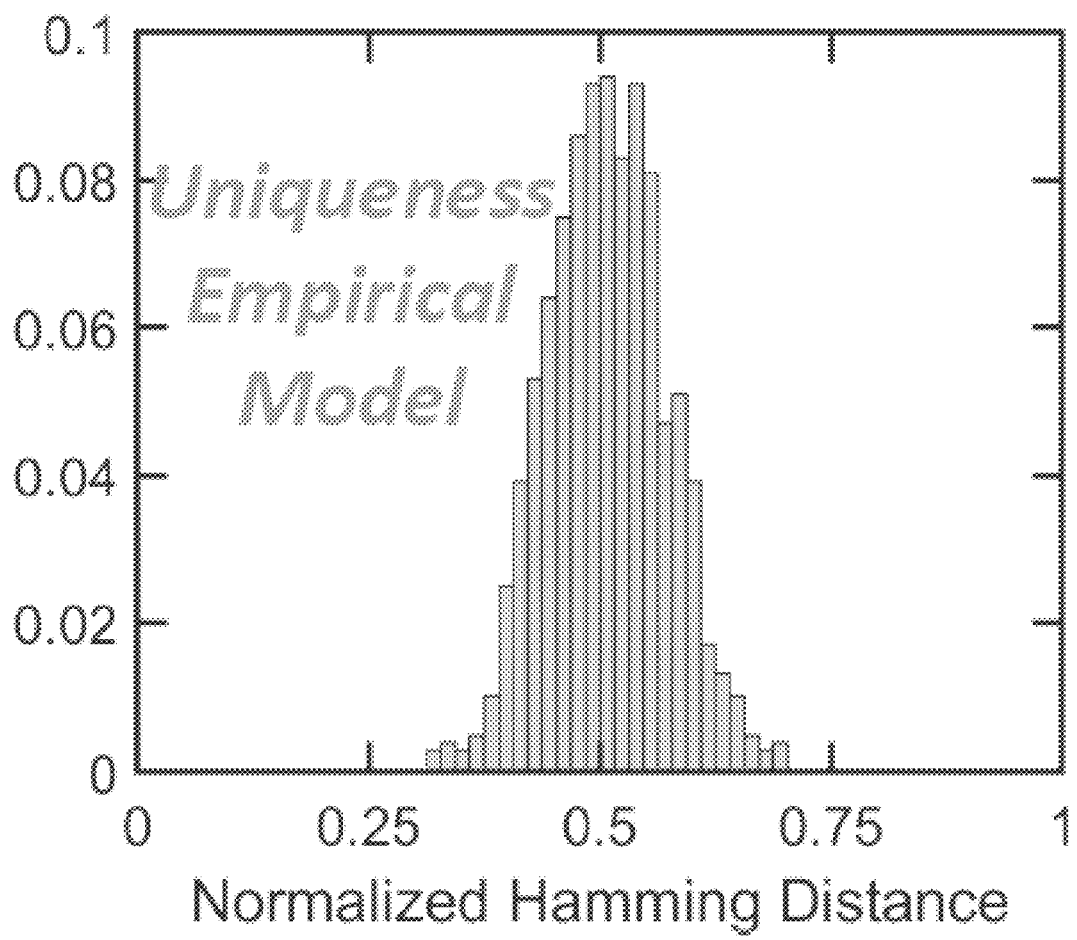
FIG. 63 is a graph illustrating simulation results for normalized Hamming distance (uniqueness) for 1000 reconfigured CRPs obtained from 1 GFET PUF using the empirical model.
Figure 64:
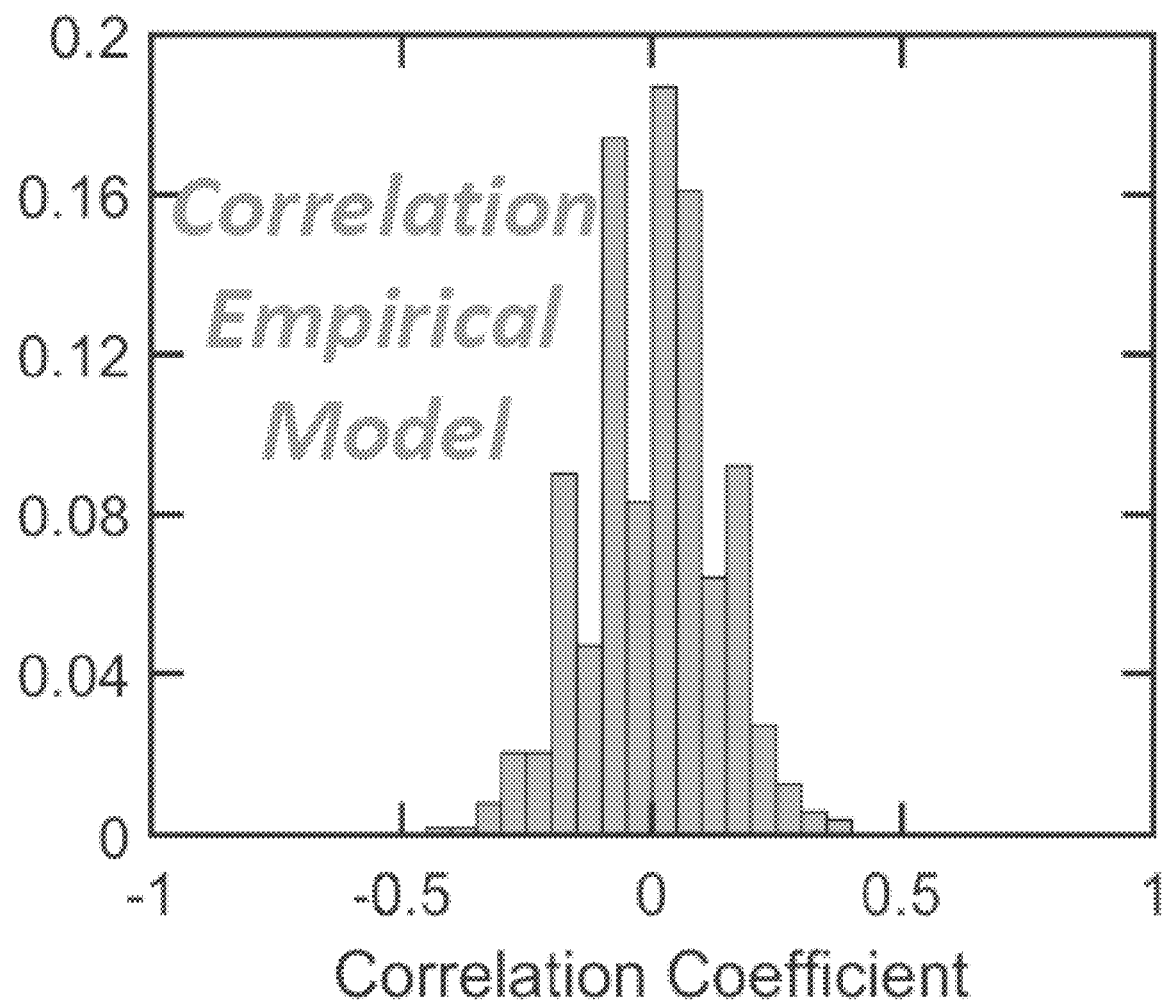
FIG. 64 is a graph illustrating simulation results for the correlation coefficient for 1000 reconfigured CRPs obtained from 1 GFET PUF using the empirical model.

In Eq. 7a and 7b, $V_{0P}$, $V_{0R}$, $\alpha_P$, and $\alpha_R$ are fitting parameters. Due to symmetric change in $V_{Dirac}$, with programming and reset, we found that $V_{0P} \approx V_{0R}$, and $\alpha_P \approx \alpha_R$. Next, we simulated N=64 GFETs using the empirical model described in Eq. 1 to emulate the device to device variation. These 64 GFETs were used to construct 1 GFET PUF and obtain 1 original CRP. N=64 programming voltage pulses with pulse magnitude drawn from a uniform random distribution ($VP_{M,1}, VP_{M,2}, \ldots, VP_{M,N}$) between 2 V and 6 V were applied to reconfigure each GFET in the GFET PUF. The reconfigured GFETs ($G_{M,1}, G_{M,2}, \ldots, G_{M,N}$) were used to derive the reconfigured CRP. Reset voltage pulses with pulse magnitude ($VR_{M,1}, VR_{M,2}, \ldots, VR_{M,N}$) between −2 V and −6 V were then applied accordingly to reset the GFETs to their original configuration. This process was repeated M=1000 times to generate 1000 CRPs. FIGS. 62-64 show the entropy of reconfigured CRPs, the distribution of normalized Hamming distance between the CRPs, and the distribution of correlation coefficient between the CRPs, respectively, that we obtained from this evaluation.

As may be seen from FIGS. 62-64, near unity entropy, a mean normalized Hamming distance of ~0.5, and a mean correlation coefficient of ~0 were obtained. These results show that the reconfigured PUFs are secure. Note that while we have used positive voltage for programming and negative voltage for reset in this particular example, the voltage polarity could be reversed without the loss of generality. As another option, a combination of voltage magnitude and polarity could also be used for reconfiguration as long as the device is reset accordingly. The results of FIGS. 62-64 show that the reconfigurability of embodiment of our GFET PUFs can provide a significant advantage for dynamically reinforcing security. After exposing any chip with secure information to one or more end-users for a period of time, a potential security breach is inherently present. Reconfigurability allows the chip providers to enhance security without recalling the chip from end-users.

We also performed a detailed experimental study to access the lifetime reduction projection for pre- and post-reconfigured GFETs to see how reconfiguration may affect the hardware of the PUF. For conventional Si metal-oxide-semiconductor field effect transistors (MOSFETs), the lifetime degradation projection is made based on bias-temperature instability (BTI) experiments, where the gate dielectric is subjected to high electric field stress resulting in increased interface charge trap density that leads to threshold voltage shift and eventual device failure. The impact of BTI stress on the GFET transfer characteristics was examined as follows: first, the transfer characteristic of the as-fabricated device was measured. After this, $V_{BG}$ pulses of different magnitudes were applied for a certain time. To avoid additional degradation factors (e.g., hot carrier degradation), $V_{DS}$ was set to 0 V during the BTI stress. Following each $V_{BG}$ pulse, the transfer characteristics of the stressed device were measured. A narrower back-gate voltage sweep was used to avoid additional stressing, which in our case was −5 V to 5 V for this particular experiment. We studied both positive bias-temperature instability (PBTI) and negative bias-temperature instability (NBTI). The GFET was then reconfigured for $N_r$ times and the experiments were repeated. Note that the reconfigurations for these experiments were achieved by applying $V_{DS}=5$ V and $V_{DS}=-5$ V pulses, alternatively, each for 10 s, which corresponds to the non-deterministic reconfiguration of GFETs exploiting dissociative adsorption as discussed earlier. Switching to deterministic reconfiguration of GFETs exploiting molecular absorption minimizes the stressing since high magnitude $V_{DS}$ pulses of similar or lesser magnitude are applied for 10 times shorter durations. Therefore, conclusions drawn from non-deterministic reconfiguration of GFETs exploiting dissociative adsorption in our experiment should be worse than the worst-case estimates for lifetime projection for deterministic reconfiguration of GFETs exploiting molecular absorption (e.g. our experiment was designed to provide a worst-case evaluation of how an embodiment of our GFET PUF may be affected by reconfigurations).

Figure 7:
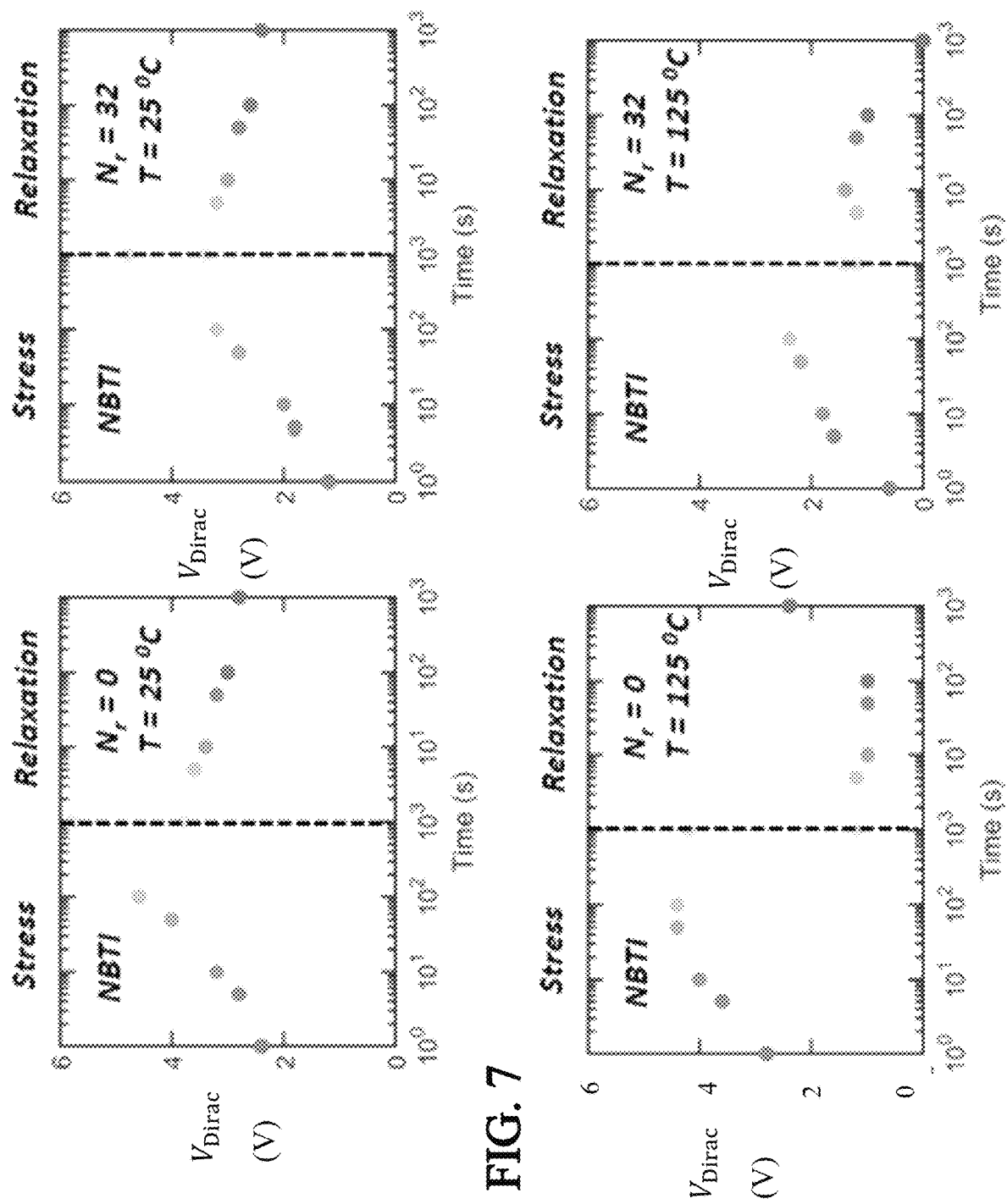
FIG. 7 shows the evolution of $\Delta V_{Dirac}$ during NBTI stressing and subsequent relaxation for pre- and post-reconfigured GFETs at 25° C. and 125° C.
Figure 8:
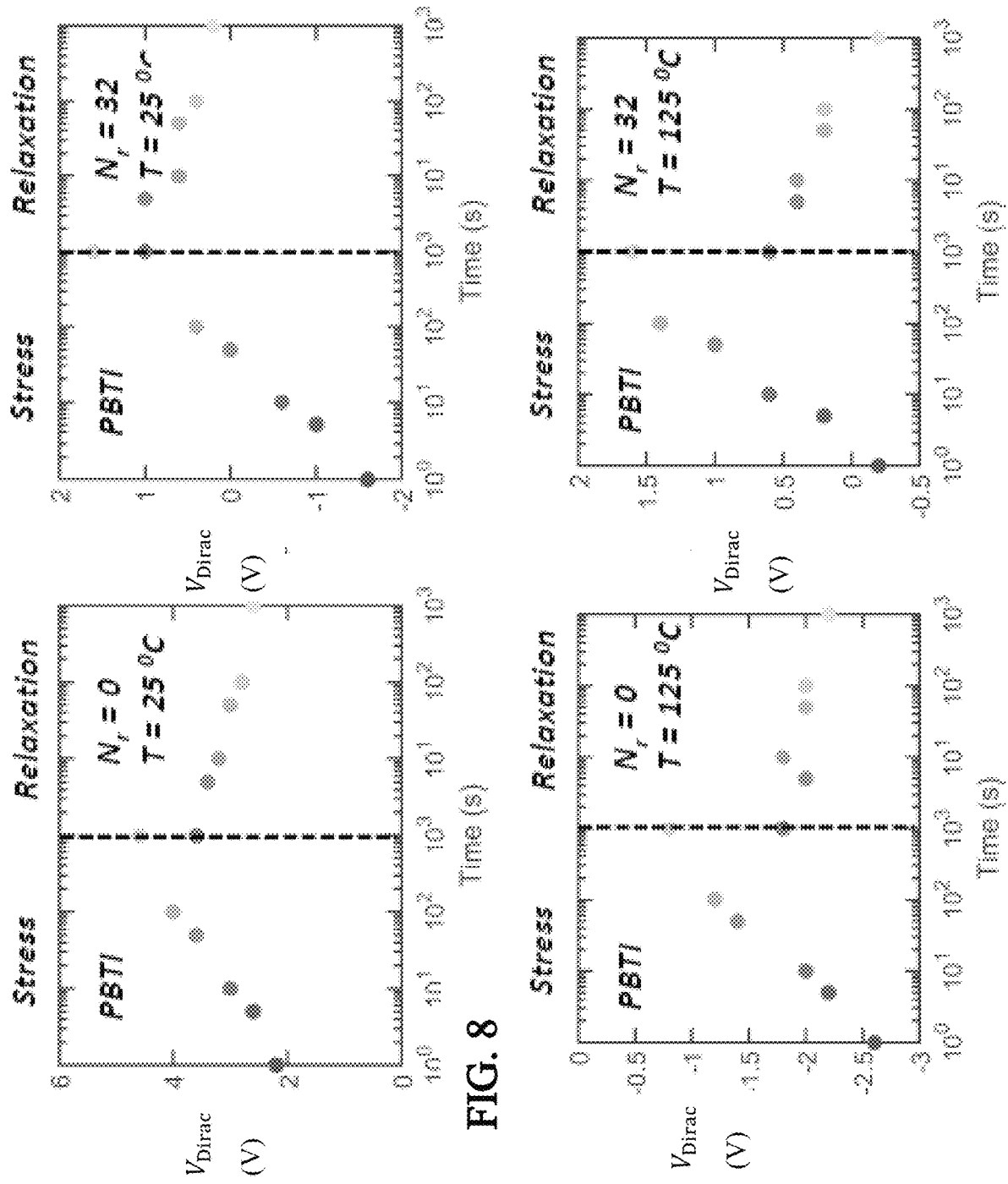
FIG. 8 shows the evolution of $\Delta V_{Dirac}$ during PBTI stressing and subsequent relaxation for pre- and post-reconfigured GFETs at 25° C. and 125° C.
Figure 65:
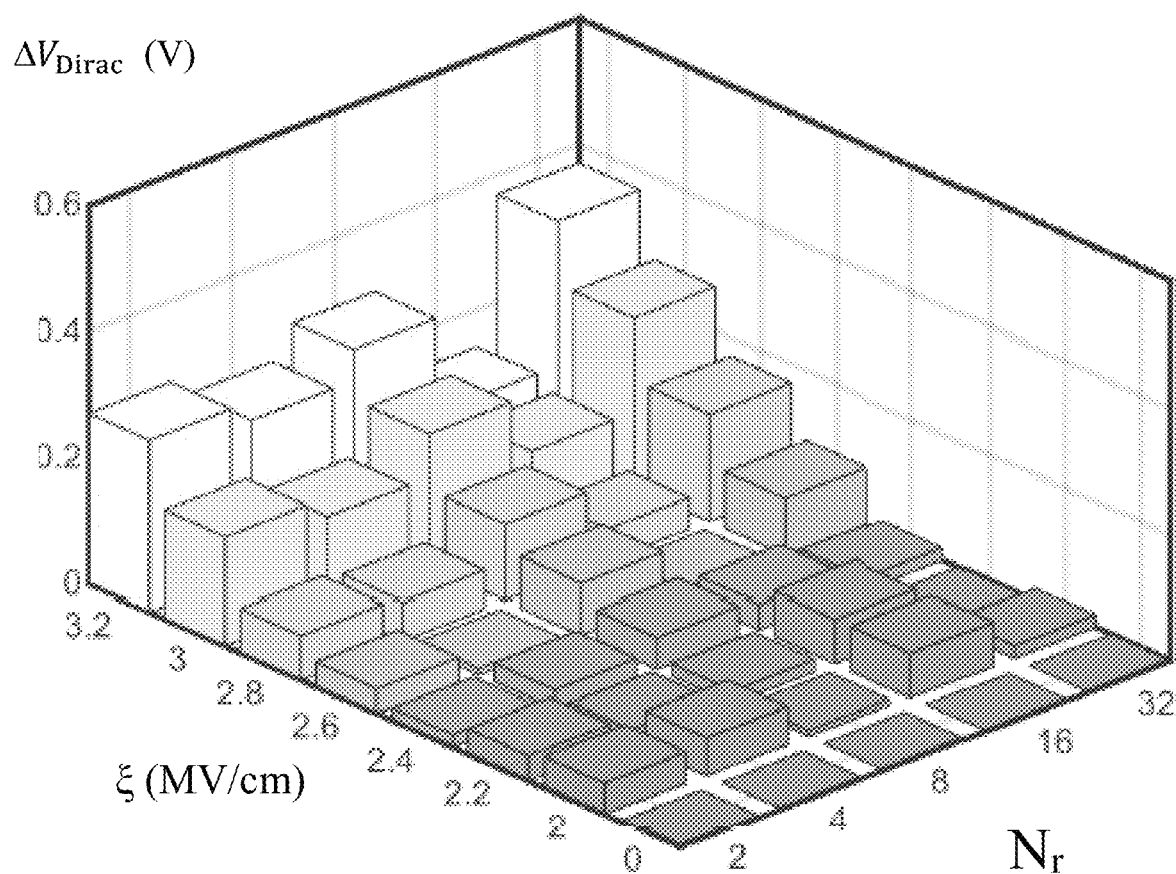
FIG. 65 is a graph illustrating the extracted shift in Dirac point ($\Delta V_{Dirac}$) as a function of the applied electric field ($\xi$), i.e. $V_{BG}/t_{OX}$, for different number of reconfigurations ($N_r$=2, 4, 8, 16, and 32) after positive bias-temperature instability (PBTI) stressing.
Figure 66:
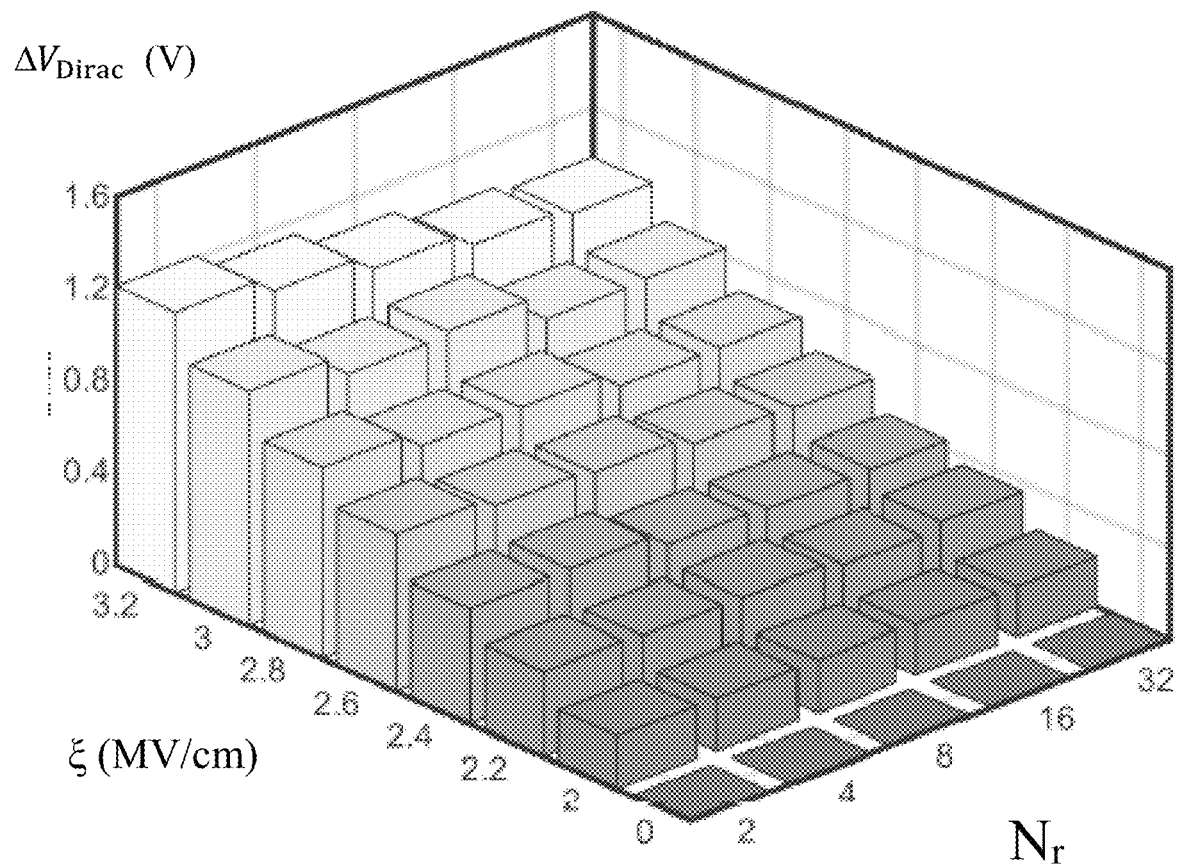
FIG. 66 is a graph illustrating the extracted shift in Dirac point ($\Delta V_{Dirac}$) as a function of the applied electric field ($\xi$), i.e. $V_{BG}/t_{OX}$, for different number of reconfigurations ($N_r$=2, 4, 8, 16, and 32) after negative bias-temperature instability (NBTI) stressing.

FIG. 65 and FIG. 66 show the extracted shift in Dirac point ($\Delta V_{Dirac}$) as a function of the electric field ($\xi$), i.e. $V_{BG}/t_{OX}$, for different number of reconfigurations ($N_r$) after PBTI and NBTI stressing, respectively, were performed. The stressing time was 1 s. $\Delta V_{Dirac}$ after PBTI and NBTI stressing showed little-to-no impact due to reconfiguration, which shows that the reconfiguration impacts the reliability of the device minimally. To investigate further, we also performed the PBTI and NBTI stressing experiments on a pre-reconfigured GFET and another post-reconfigured GFET after $N_r=32$ reconfigurations with $\xi=2$ MV/cm for different stressing times ($t_s=1, 5, 10, 50, 100,$ and 1000 s). After stressing, the GFETs were allowed to relax for $t_r=1, 5, 10, 50, 100,$ and 1000 s, respectively. The measurements were repeated at two different temperatures, 25° C. and 125° C. FIG. 7 shows the evolution of $\Delta V_{Dirac}$ during NBTI stressing and subsequent relaxation for pre- and post-reconfigured GFETs at 25° C. and 125° C. Longer NBTI stress caused a stronger shift of $V_{Dirac}$ towards more negative voltages. During the recovery, $V_{Dirac}$ returned back to its initial position, which happens faster at a higher temperature. Similar results are seen in FIG. 8, that show the evolution of $\Delta V_{Dirac}$ during PBTI stressing and subsequent relaxation for pre- and post-reconfigured GFETs at 25° C. and 125° C. Both the pre-reconfigured GFET and the post-reconfigured GFET after $N_r=32$ reconfigurations showed similar PBTI and NBTI stressing effects, which further affirm that the reconfiguration has a minimal effect on the reliability of the PUF device.

Figure 49:
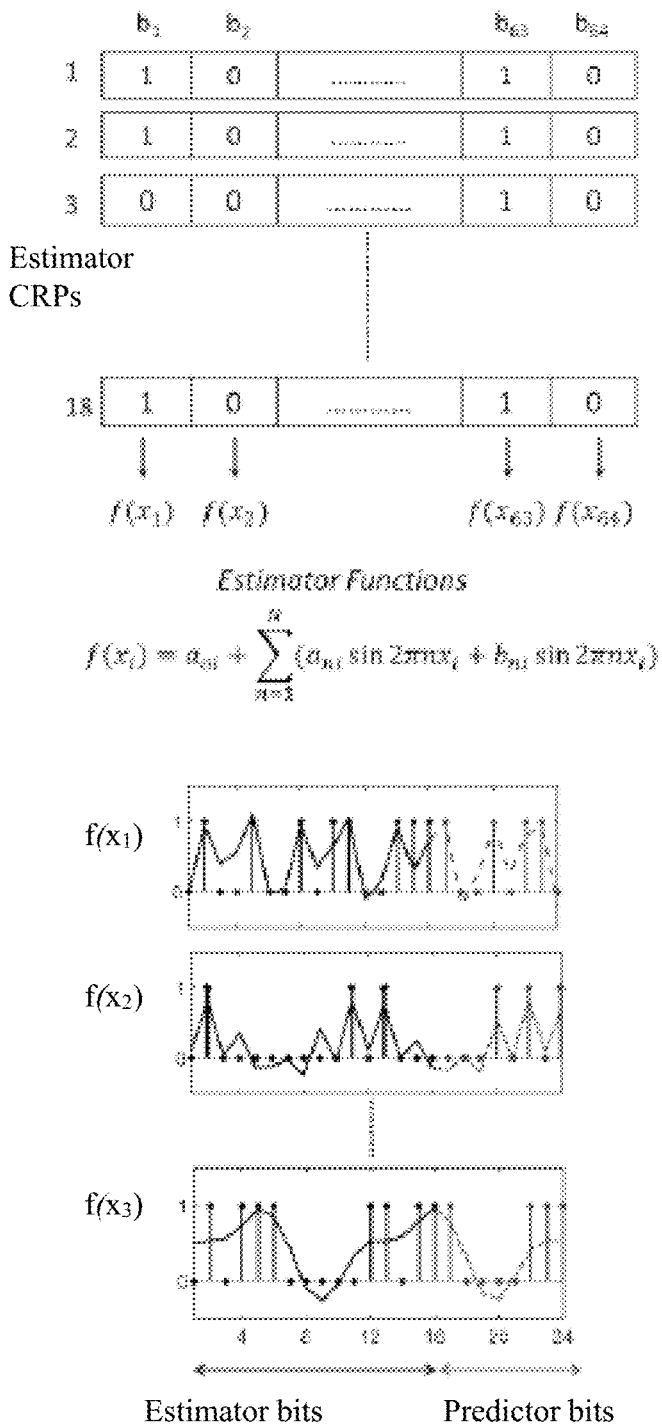
FIG. 49 is a schematic view illustrating an exemplary regression model based on Fourier series used for predicting CRPs for GFET PUFs. The estimation functions, $f(x_i)$, for the independent variables, $x_i$, which are used for predicting the respective dependent variables, e.g. each of the 64 binary bits ($b_i$), for the CRPs are constructed using 18 estimator CRPs that were randomly chosen from the experimentally measured 24 CRPs obtained from the GFET PUFs.
Figure 50:
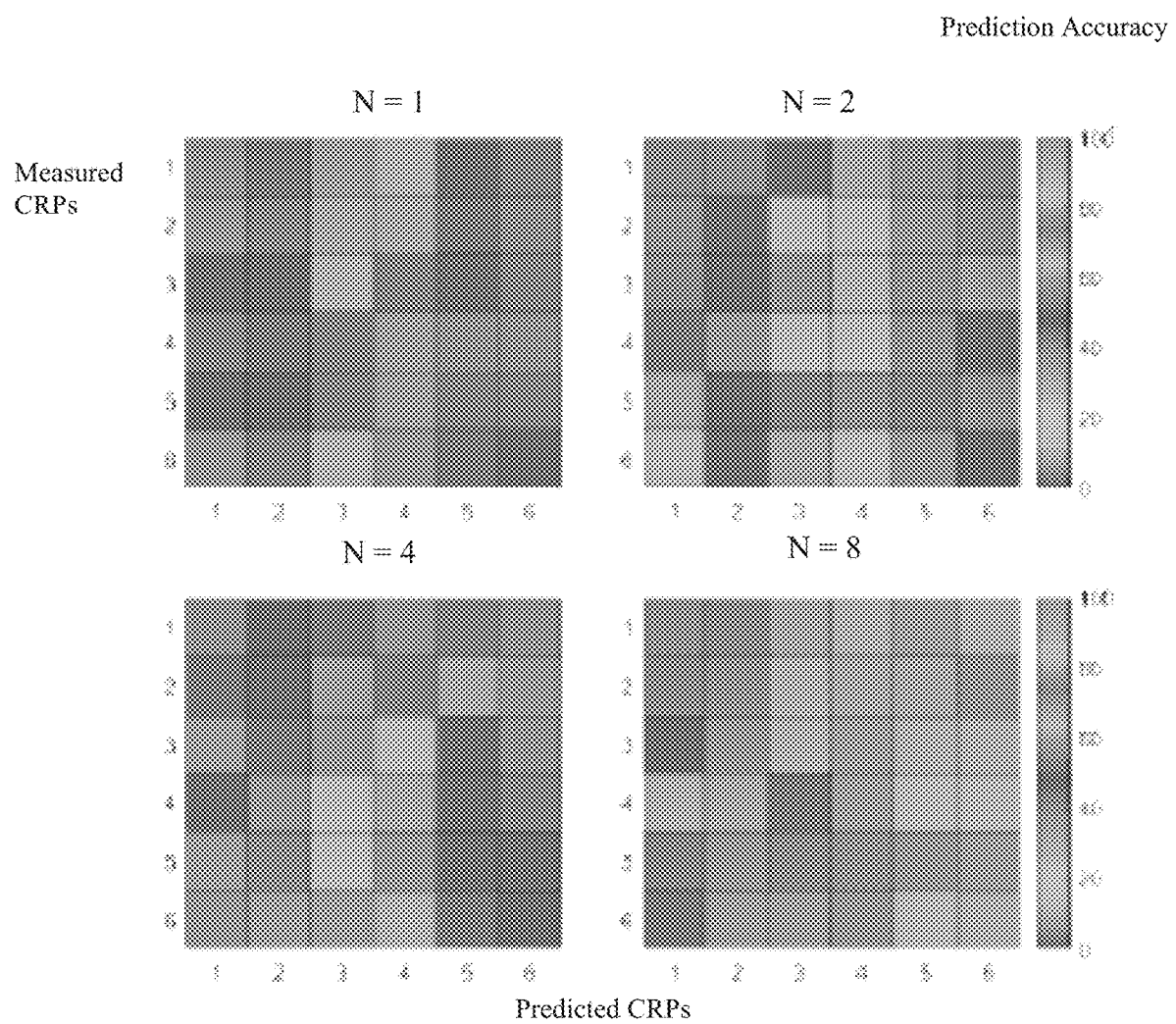
FIG. 50 is a series of grey scale color maps for the prediction accuracy between the 6 experimentally measured CRPs and 6 predicted CRPs obtained from the Fourier regression model of FIG. 49 of order N=1, 2, 4, and 8. The prediction accuracy was found to be in the range of 40-75%.
Figure 51:
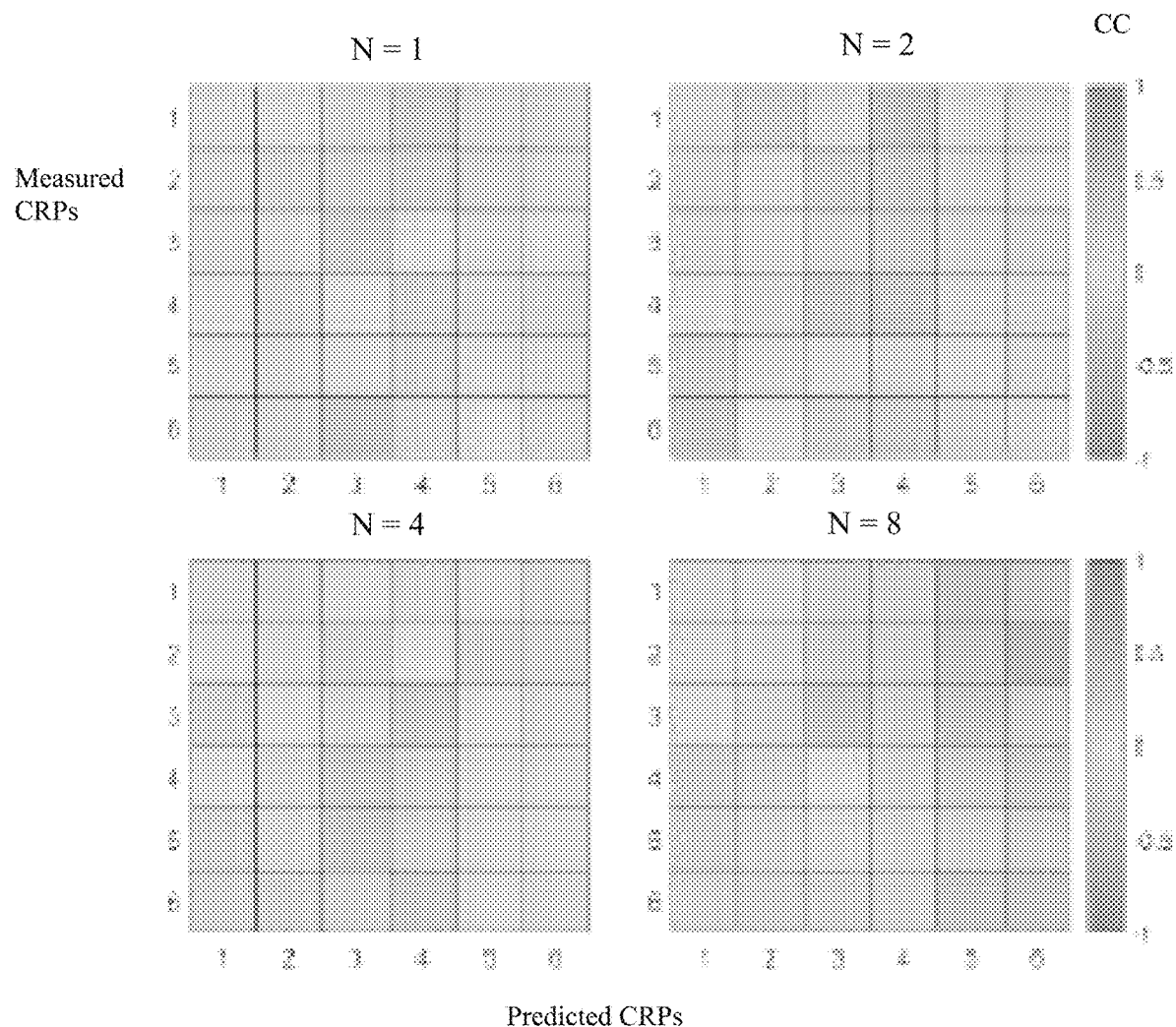
FIG. 51 is a series of grey scale color maps for the correlation coefficient (CC) between the 6 experimentally measured CRPs and 6 predicted CRPs obtained from the Fourier regression model of FIG. 49 of order N=1, 2, 4, and 8. The correlation coefficient was found to be very close to zero.
Figure 52:
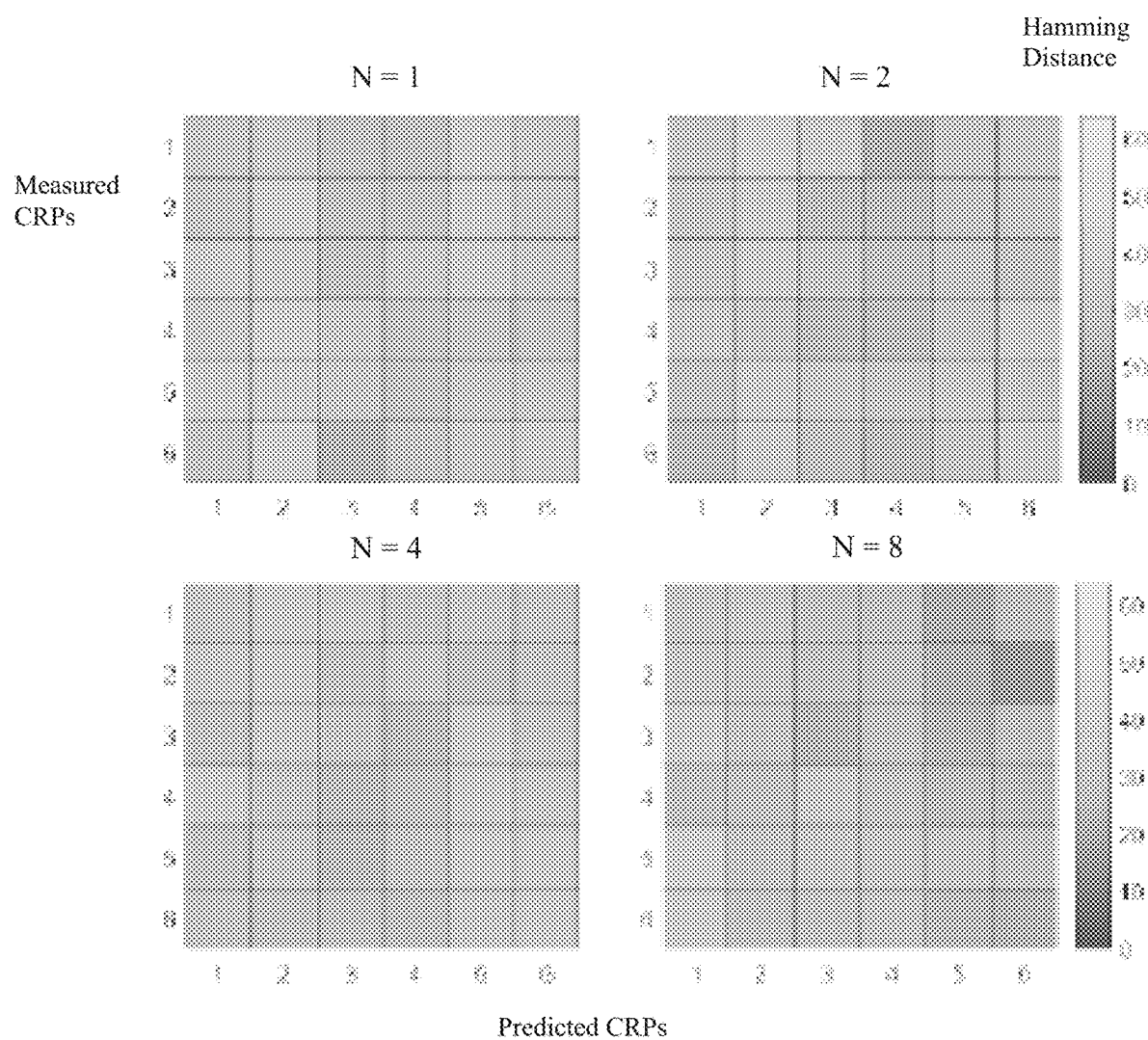
FIG. 52 is a series of grey scale color maps for the Hamming distance between the 6 experimentally measured CRPs and 6 predicted CRPs obtained from the Fourier regression model of FIG. 49 of order N=1, 2, 4, and 8. The Hamming distance was found to be close to 32 even for higher order regression models indicating that the CRPs are resilient to machine learning (ML) attacks, which can be a very powerful feature for embodiments of our GFET PUFs.

We also tested embodiments of our GFET PUFs against machine learning (ML) attacks by implementing a predictive regression model constructed using Fourier series of various orders. Regression models have been shown to be the most successful ML attacks for various strong PUFs, including the arbiter PUF. As a supervised method, it used the CRP information much more efficiently than reinforcement learning or evolutionary methods. Moreover, regression models have an advantage in that they can directly implement the model of a PUF, whereas other methods, like the Support Vector Machine (SVM) and Neural Networks (NNs), build their own intrinsic models. However, in order to make the ML attack applicable, one needs to assume that the adversary is capable of accessing the CRPs. For example, in the present case, this is done by physically probing the GFET PUFs. FIG. 49 shows the estimation functions, $f(x_i)$, for the independent variables, $x_i$, which were used for predicting the respective dependent variables, i.e. each of the 64 binary bits ($b_i$), for the CRPs of an embodiment of our GFET PUF. The estimation functions were constructed using a Fourier regression model from 18 estimator CRPs that were randomly chosen from the experimentally measured 24 CRPs obtained from the GFET PUFs. The estimation parameters were determined in such a way that the likelihood of observing the training set is maximum, or, in other words, the negative log-likelihood is minimum. FIGS. 50-52, respectively, show the color maps for the prediction accuracy, correlation coefficient, and Hamming distance between the remaining 6 experimentally measured CRPs and 6 predicted CRPs obtained from the regression analysis based on Fourier series of order N=1, 2, 4, and 8. We found that the prediction accuracy was in the range of 40-75%, the CC was very close to zero and the Hamming distance was close to 32 even for higher order regression models, indicating that the CRPs can be resilient to ML attacks for embodiments of our GFET PUF.

Figure 53:
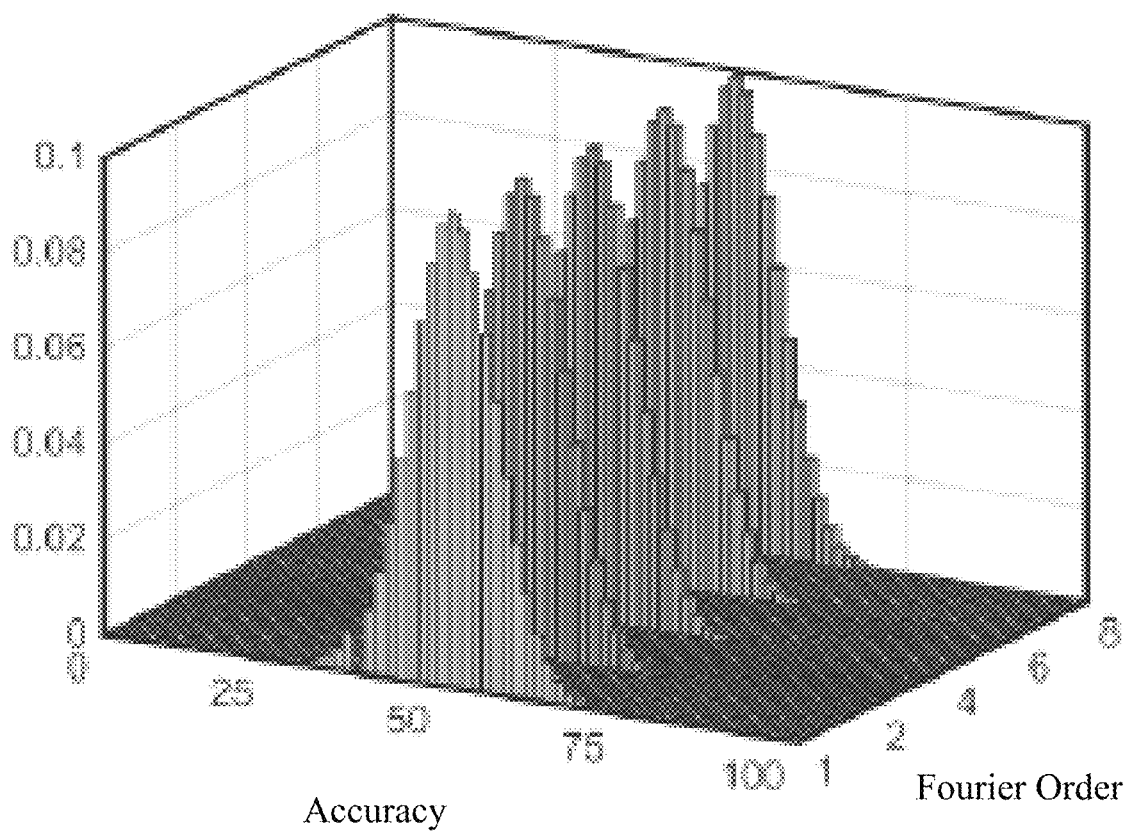
FIG. 53 is a histogram of prediction accuracy, illustrating results from the regression model of FIG. 49 being expanded for a larger data set comprised of 1 million 64-bit CRPs, obtained by simulating 64 million GFETs using the empirical model described in Equation 1 (Eq. 1). The estimation functions were constructed using a randomly selected training set of 0.8 million CRPs to generate 2000 predicted CRPs. Mean prediction accuracy was ~52.5% for the GFET PUF, which is significantly better than the ~95-99.9% accuracy demonstrated by the strongest Si PUF, i.e. the arbiter PUF.

We further expanded the regression model for a larger data set comprised of 1 million 64-bit CRPs, obtained by simulating 64 million GFETs using the empirical model described in Eqs. 2-3. The estimation functions were constructed using a randomly selected training set of 0.8 million CRPs to generate 2000 predicted CRPs. FIG. 53 shows the histogram of the accuracy between the predicted and simulated CRPs for various orders of Fourier series. The mean prediction accuracy was μ52.5% and the maximum prediction accuracy was 85% (with a probability of $2\times10^{-7}$) for the highest order of the Fourier series for the GFET PUF, which is significantly better than the μ95-99.9% accuracy demonstrated by a conventional Si arbiter PUF using logistic regression analysis. Below are Tables 1 and 2 that describe other evaluations we performed to compare performance of an embodiment of our GFET PUF with a conventional Si PUF:

TABLE 1

Benchmarking ML attack

| PUF Type | Model | Training CRP | Prediction Rate | Training Time (s) |
| --- | --- | --- | --- | --- |
| Si PUF | Logistic Regression | 640 | 95% | 0.01 |
|  |  | 2,555 | 99% | 0.13 |
|  |  | 18,050 | 99.9% | 0.6 |

TABLE 1-continued

Benchmarking ML attack

| PUF Type | Model | Training CRP | Prediction Rate | Training Time (s) |
| --- | --- | --- | --- | --- |
| GFET PUF | Fourier series (8) | 640 | 49.96% | 4.12 |
| | Regression | 2,555 | 50.04% | 4.72 |
| | | 18,050 | 50.02% | 14.65 |

Figure 54:
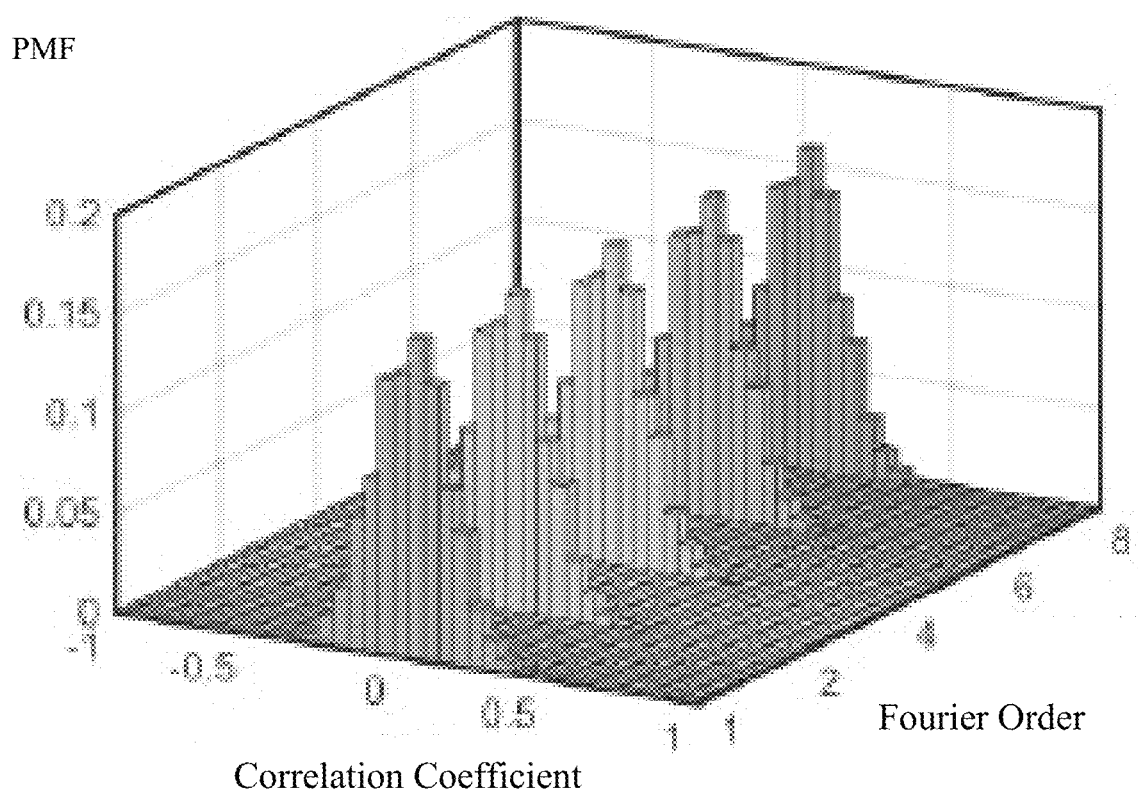
FIG. 54 is a histogram of the correlation coefficient (CC) between the predicted and simulated CRPs for various orders of Fourier series. The mean correlation coefficient of ~0 further strengthens our view that embodiments of our GFET PUFs can resist ML attacks.
Figure 55:
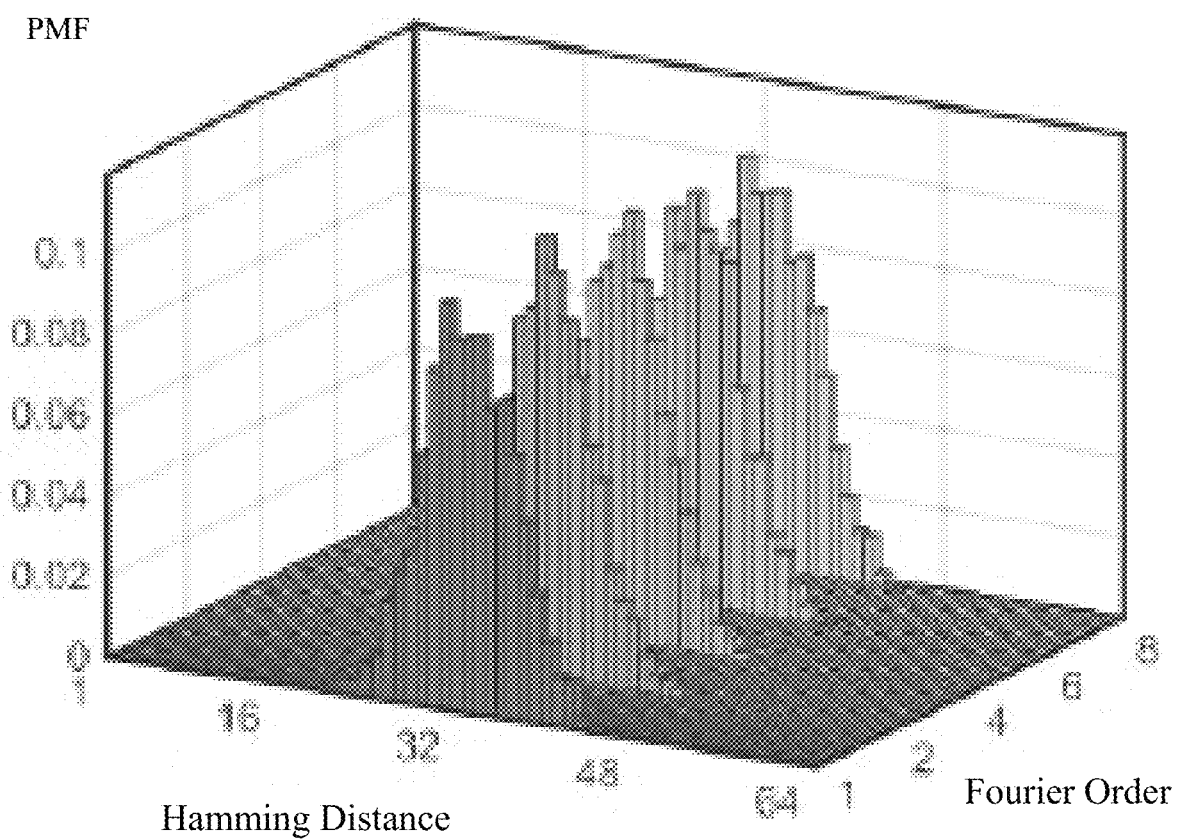
FIG. 55 is a histogram of the Hamming distance between the predicted and simulated CRPs for various orders of Fourier series. The mean Hamming distance of ~32 further strengthens our view that embodiments of our GFET PUFs can resist ML attacks.

FIG. 54 and FIG. 55 show the histograms of the CC and the Hamming distance between the predicted and simulated CRPs for various orders of Fourier series. The mean Hamming distance of ~32 and the mean CC of ~0 further show that embodiments of our GFET PUFs can resist ML attacks.

Figure 67:
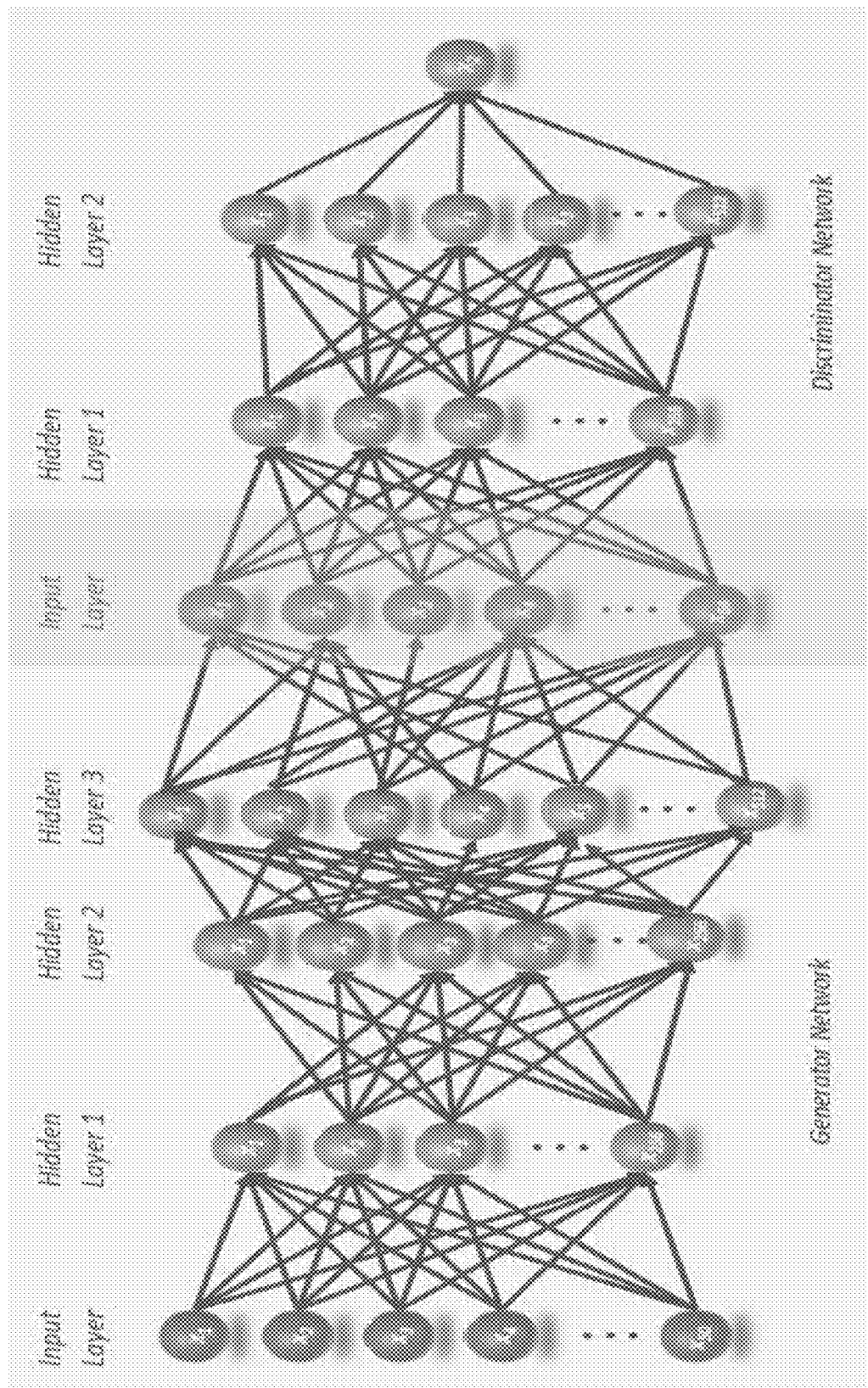
FIG. 67 is a schematic view of a GAN that includes multiple deep neural networks (DNNs), a first being a Generator DNN and a second being a Discriminator DNN.

We also evaluate the resilience of our embodiment (GFET PUFs) by launching another attack on GFET PUFs based on a generative adversarial network (GAN). A GAN can include two deep neural networks (DNNs); one DNN can be a Generator DNN and the other one can be a Discriminator DNN, as shown schematically in FIG. 67. The training for the two networks can be done simultaneously. The Generative network learns the features of the training dataset and the Discriminator network estimates the probability that a sample came from the training dataset rather than from the Generator. The two networks essentially compete with each other; the Generator tries to generate an output that maximizes the probability of the Discriminator making an error, while the Discriminator tries to ensure that the generated output matches with the training data. The Generator network takes input as random noise and the entire training is done by backpropagation. Once the training phase is done, the Generator network can generate (predict) any number of samples similar to the training data.

Figure 9:
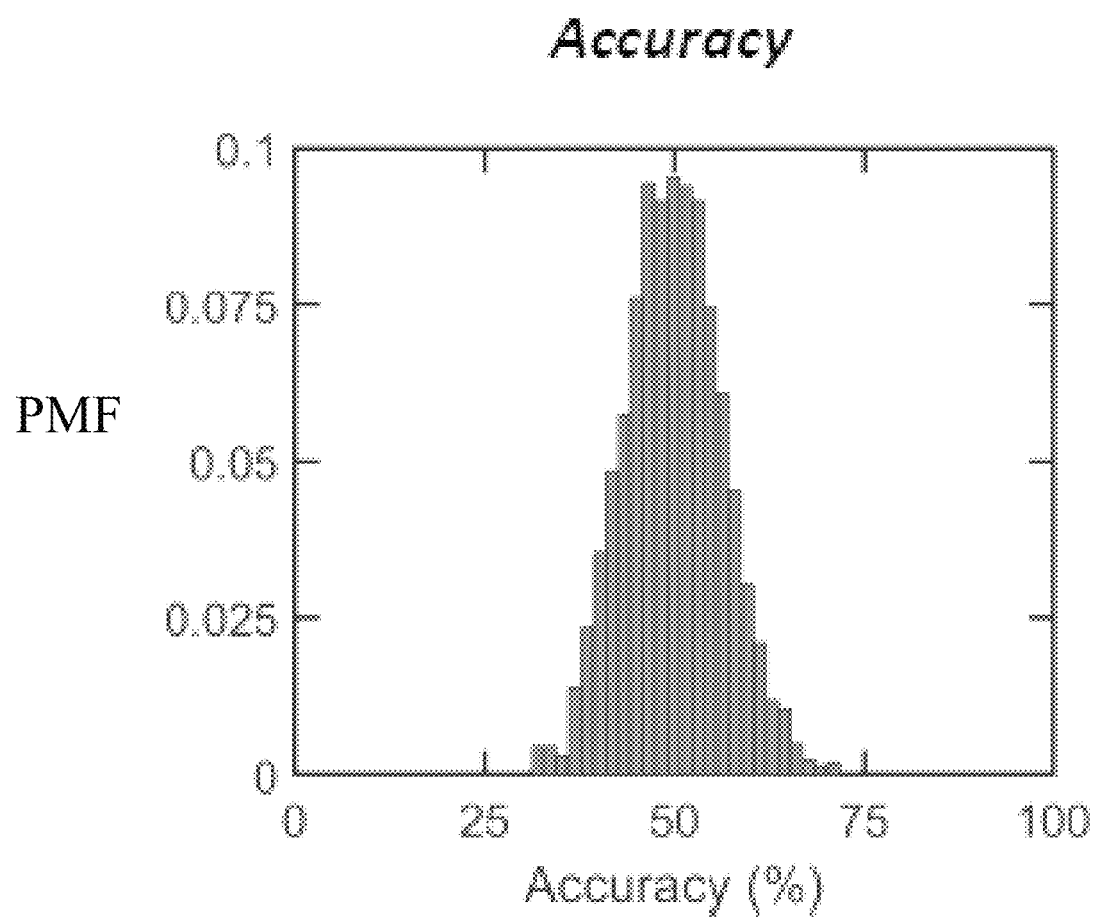
FIG. 9 is a graph illustrating the mean prediction accuracy between the CRP obtained from generative adversarial network (GAN) and empirical model simulated CRPs.
Figure 10:
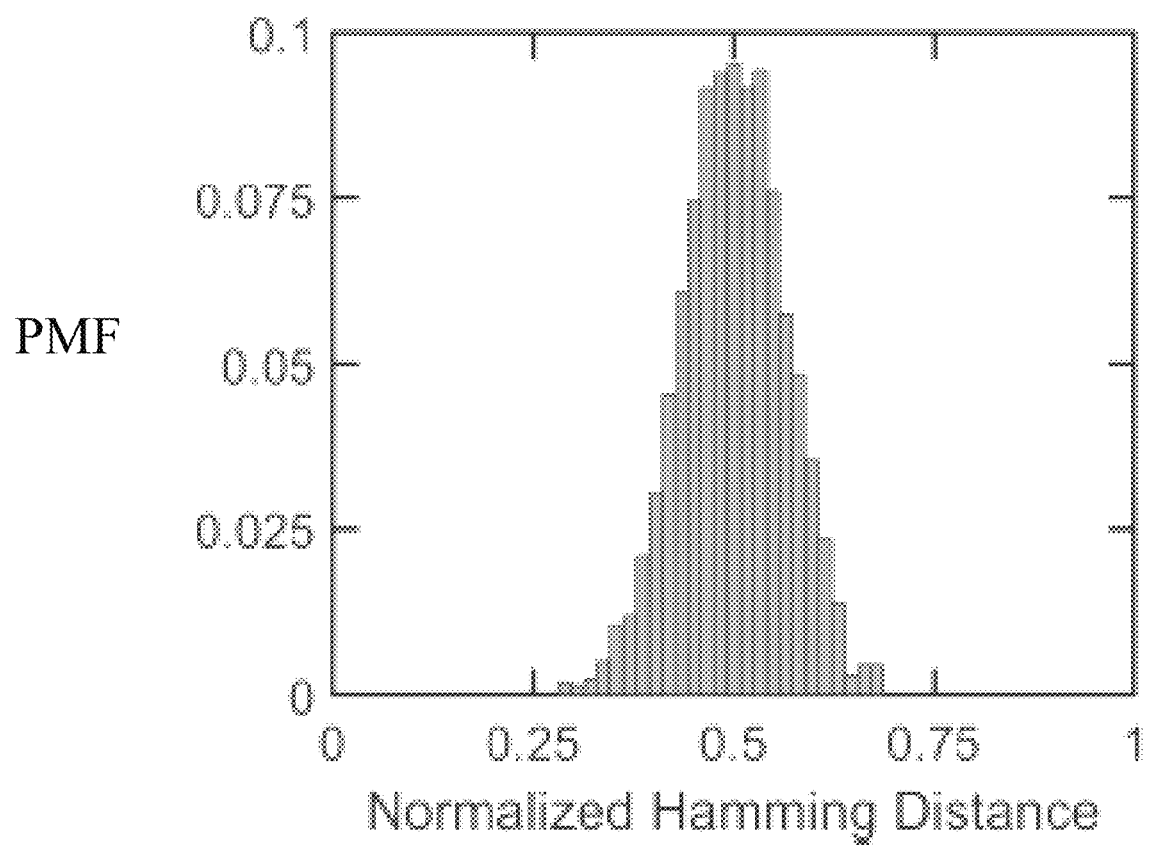
FIG. 10 is a graph illustrating the mean normalized Hamming distance between the CRP obtained from generative adversarial network (GAN) and empirical model simulated CRPs.
Figure 11:
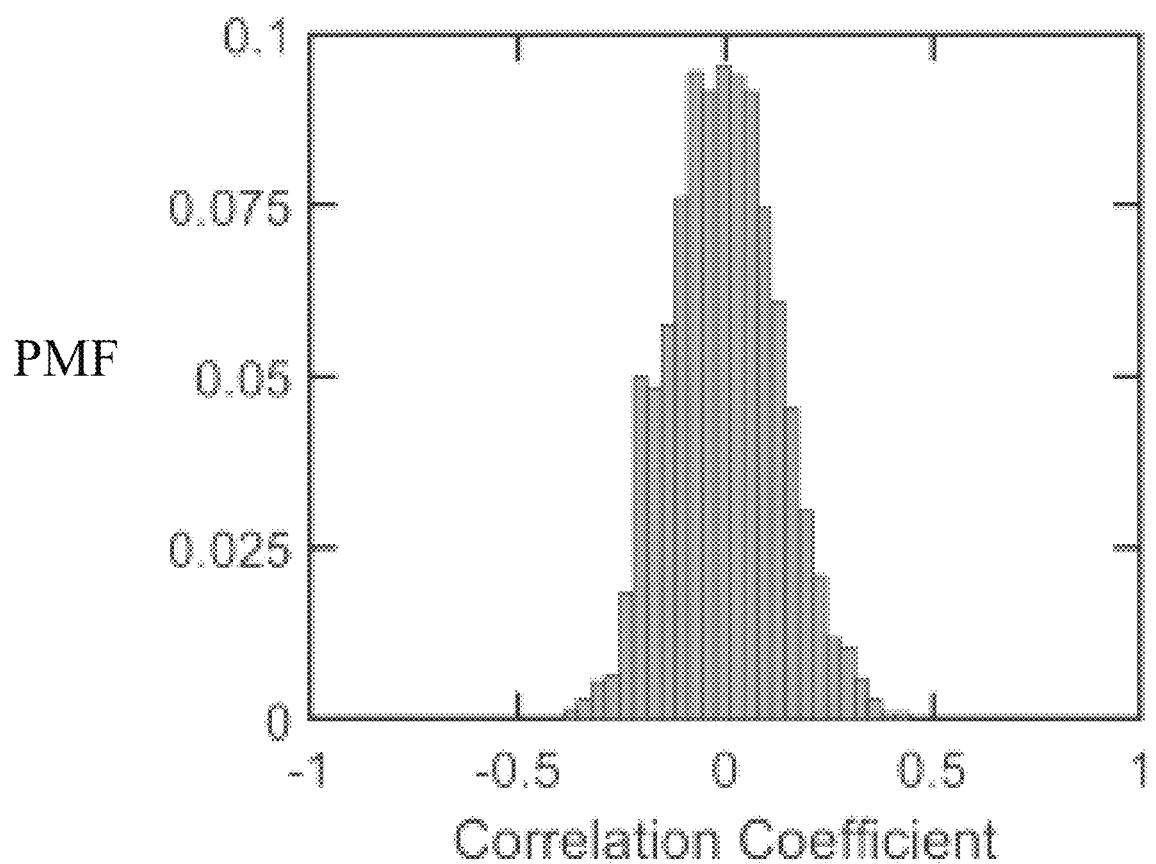
FIG. 11 is a graph illustrating the mean correlation coefficient between the CRP obtained from generative adversarial network (GAN) and empirical model simulated CRPs.

In our experimentation utilizing a GAN for further testing embodiments of our GFET PUFs, we have generated 10,000 CRPs (each 64-bit) using the empirical model for the GFET. We used 8,000 CRPs for training the GAN and the remaining 2,000 CRPs were used for testing. As shown schematically in FIG. 67, the Generator DNN included an input layer of 50 neurons, three hidden layers of 256, 512, and 1024 neurons, respectively, and an output layer of 64 neurons. The output neurons from the Generator DNN serve as the input layer for the Discriminator DNN. The Discriminator DNN included two hidden layers of 256 and 512 neurons, respectively, and an output layer of one neuron. The sole activation function used for both networks was tanh. In addition, the 0's in the bit sequence were changed by −1 to maintain uniformity without the loss of generality. We trained the GAN network for 3000 epochs, following which we generated 2000 CRPs and tested the correlation, accuracy, and normalized Hamming distance with the testing datasets, as shown in FIGS. 9-11. The mean prediction accuracy of ~52.5%, mean Hamming distance of ~0.5, and mean CC of ~0 confirm the resilience embodiments of our GFET PUFs can have to GAN-based attacks. This is yet another unique security feature embodiments of our PUFs can provide.

Figure 43:
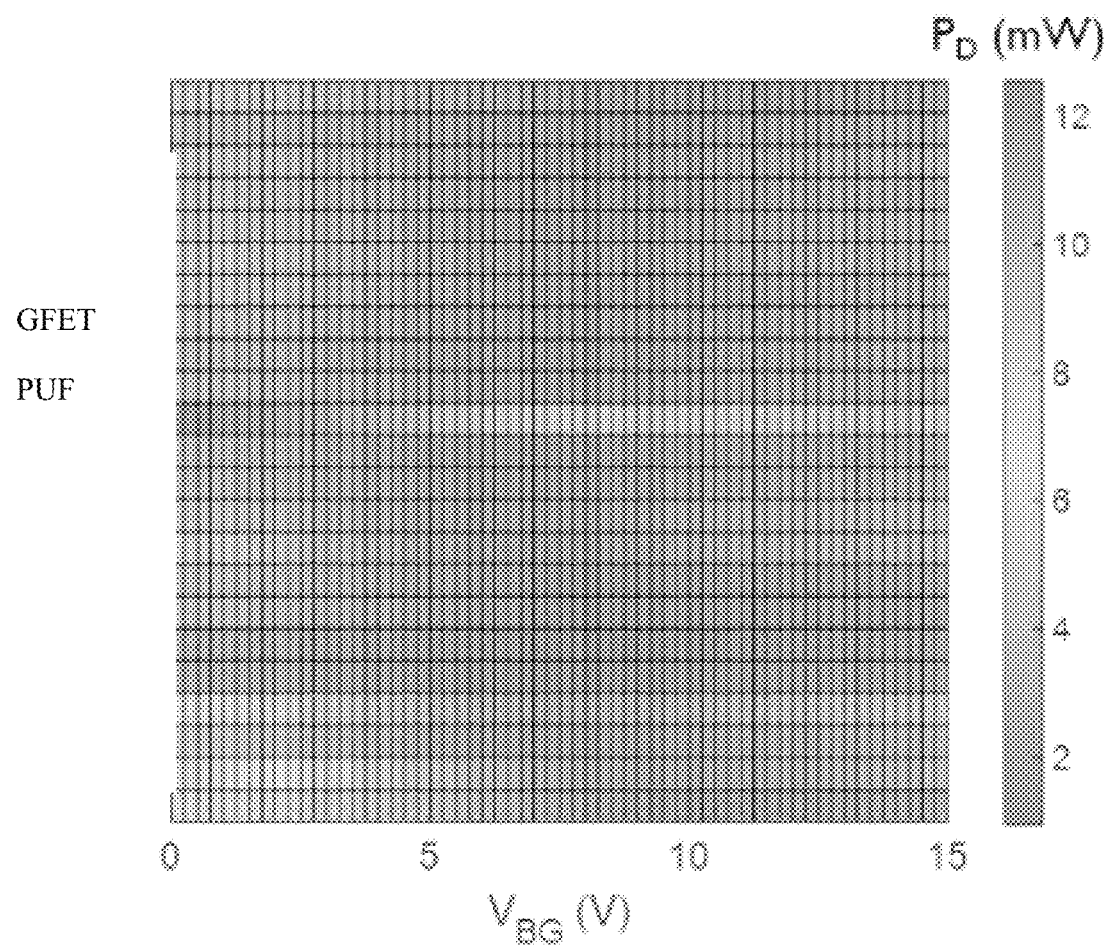
FIG. 43 is a graph illustrating a grey scale color map of power consumption by 24 GFET PUFs at different $V_{BG}$. Each row represents 1 GFET PUF. As may be seen from FIG. 43, power dissipation is minimum with an average value of 2.3 mW when the GFET PUFs are operated near the Dirac point.

Power, timing, and reliability matrices can also be important in the complete evaluation of PUFs based on emerging nanomaterials and devices. FIG. 43 shows a color map of power consumption by an embodiment of 24 GFET PUFs when operated at different applied back gate voltages, calculated using the following Equation 8 (Eq. 8):

$$P_{D,j} = \sum_{i=1}^{N} I_{i,j} V_{DD} \quad \text{[Eq. 8]}$$

Figure 44:
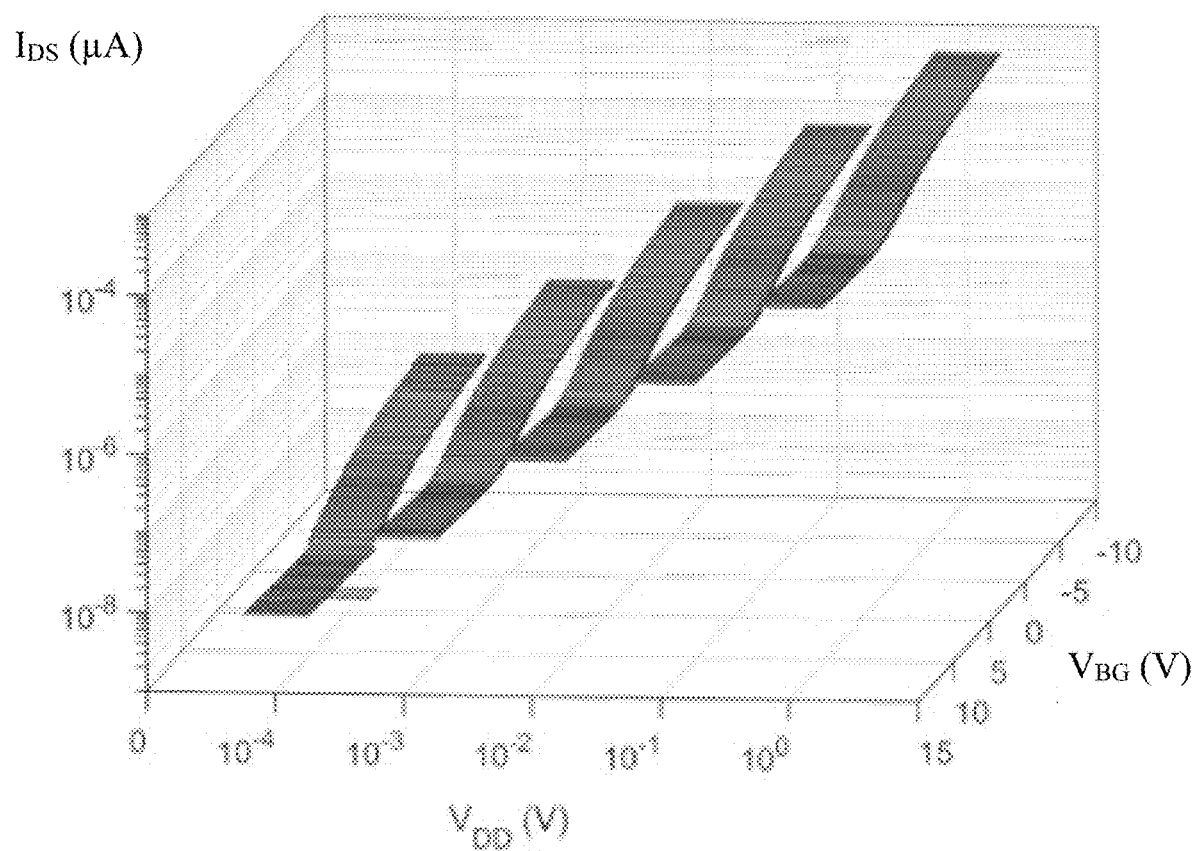
FIG. 44 is a graph illustrating the transfer characteristics of GFET as the supply voltage ($V_{DD}$) is scaled over 4 orders of magnitude from 1 V down to 100 μV.
Figure 45:
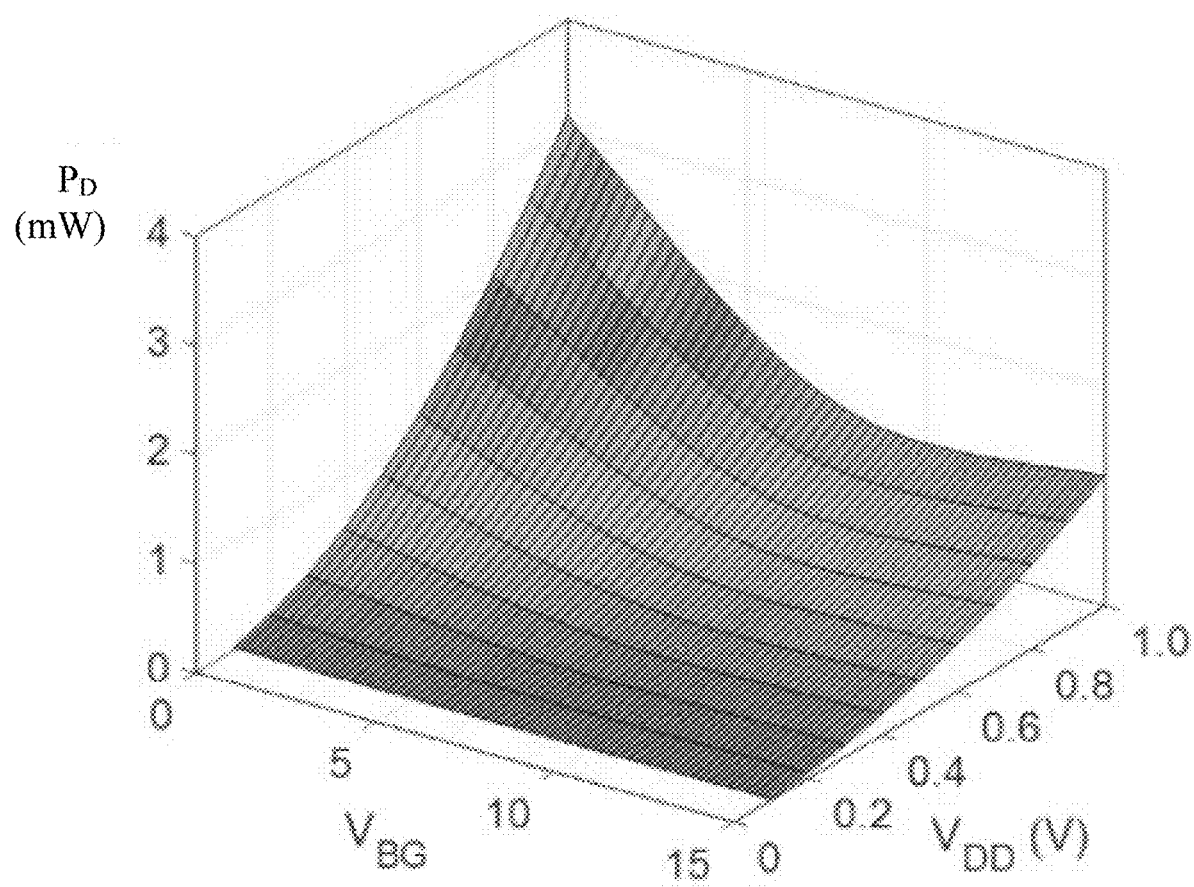
FIG. 45 is a graph illustrating the power dissipation in a GFET PUF as a function of $V_{DD}$ at different $V_{BG}$.

Here, $P_{D,j}$ is the power dissipation in the $j^{th}$ PUF, N is the number of GFETs in a given PUF, $V_{DD}$ is the supply voltage, and $I_{i,j}$ is the response current in the $i^{th}$ GFET of the $j^{th}$ PUF. As expected, the power dissipation is minimum, with an average value of 2.3 mW when the GFET PUFs are operated near the Dirac point. The power dissipation can be further reduced by reducing the supply voltage. FIG. 44 shows the transfer characteristic of a single GFET as $V_{DD}$ is scaled over 4 orders of magnitude from 1 V down to 100 μN. Unlike conventional FETs, where the current conduction is limited by tunneling through Schottky barriers at the metal/semiconductor contact interface at low drain voltages, the semi-metallic nature of graphene enable near-ideal Ohmic contacts that allow aggressive scaling of the supply voltage (it should be appreciated that arbitrary scaling of supply voltage is typically not possible due to the presence of thermal noise at any finite temperature). FIG. 45 shows the power dissipation in a GFET PUF as a function of the supply voltage. Irrespective of whether the GFETs are operated near the Dirac point or electron/hole branch, the power dissipation scales linearly with the supply voltage. Embodiments of our GFET PUF systems can exploit the stochastic variation in carrier mobility and carrier concentration, culminating in conductivity fluctuation for high entropy randomness. Reliability of GFET PUFs necessitates that the conductivity of individual GFETs within a PUF to remain invariant to any external stimulus such as voltage and temperature. Therefore, the reliability for GFET can be defined using the following Equation 9 (Eq. 9):

$$\text{Reliability} = \left|1 - \frac{\Delta G}{G}\right| \times 100\% \quad \text{[Eq. 9]}$$

Figure 46:
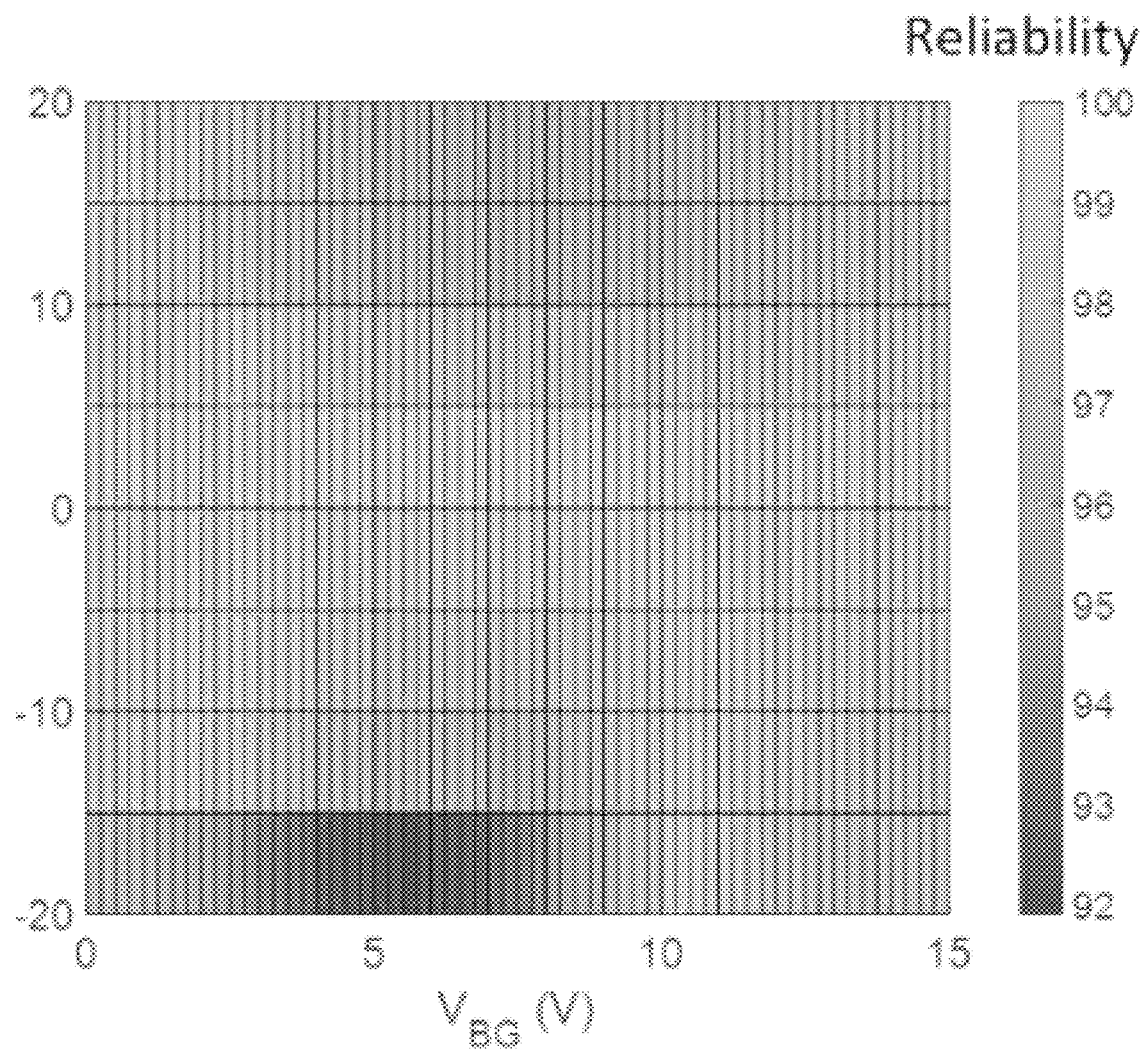
FIG. 46 is a graph illustrating a grey scale color map showing the reliability of 8 GFETs as a function of the supply voltage ($V_{DD}$) variations.
Figure 47:
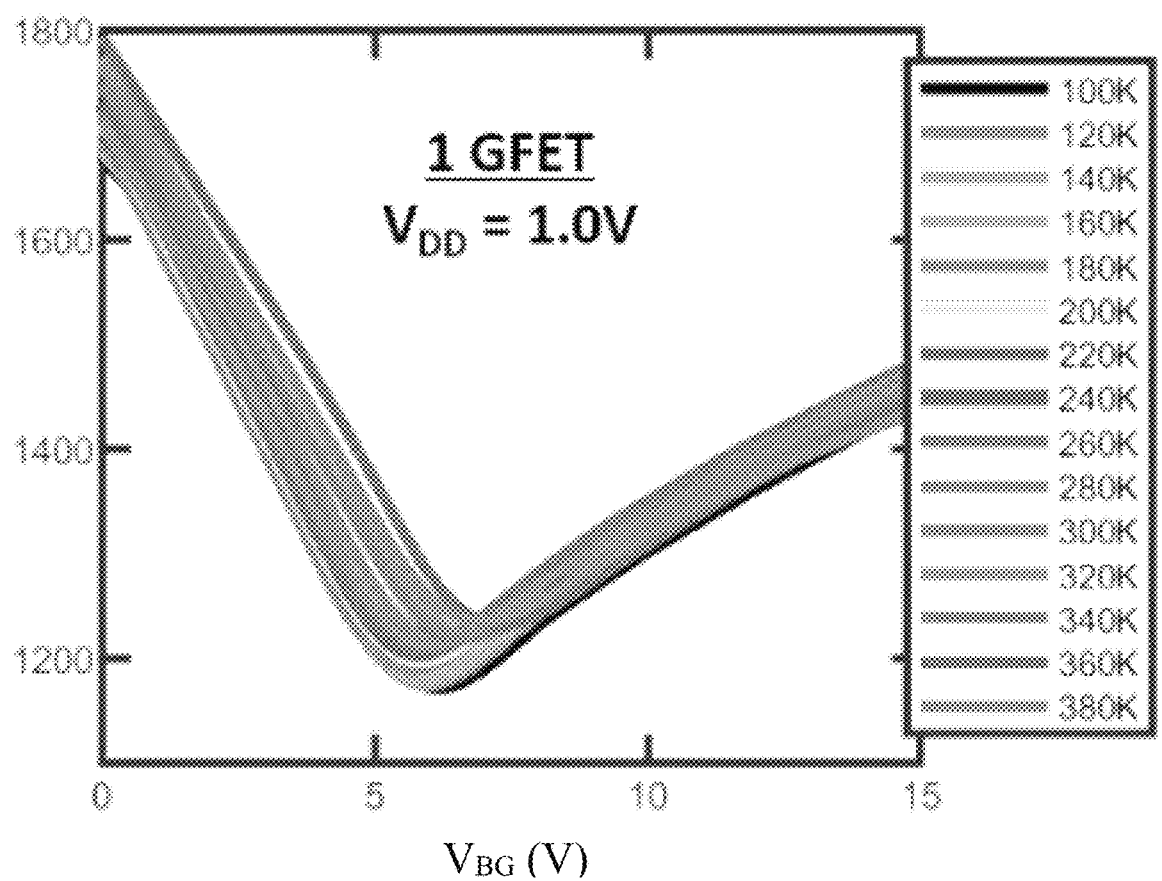
FIG. 47 is a graph illustrating the transfer characteristics of a GFET for different operating temperatures ranging from 100K (−175° C.) to 380K (105° C.).
Figure 48:
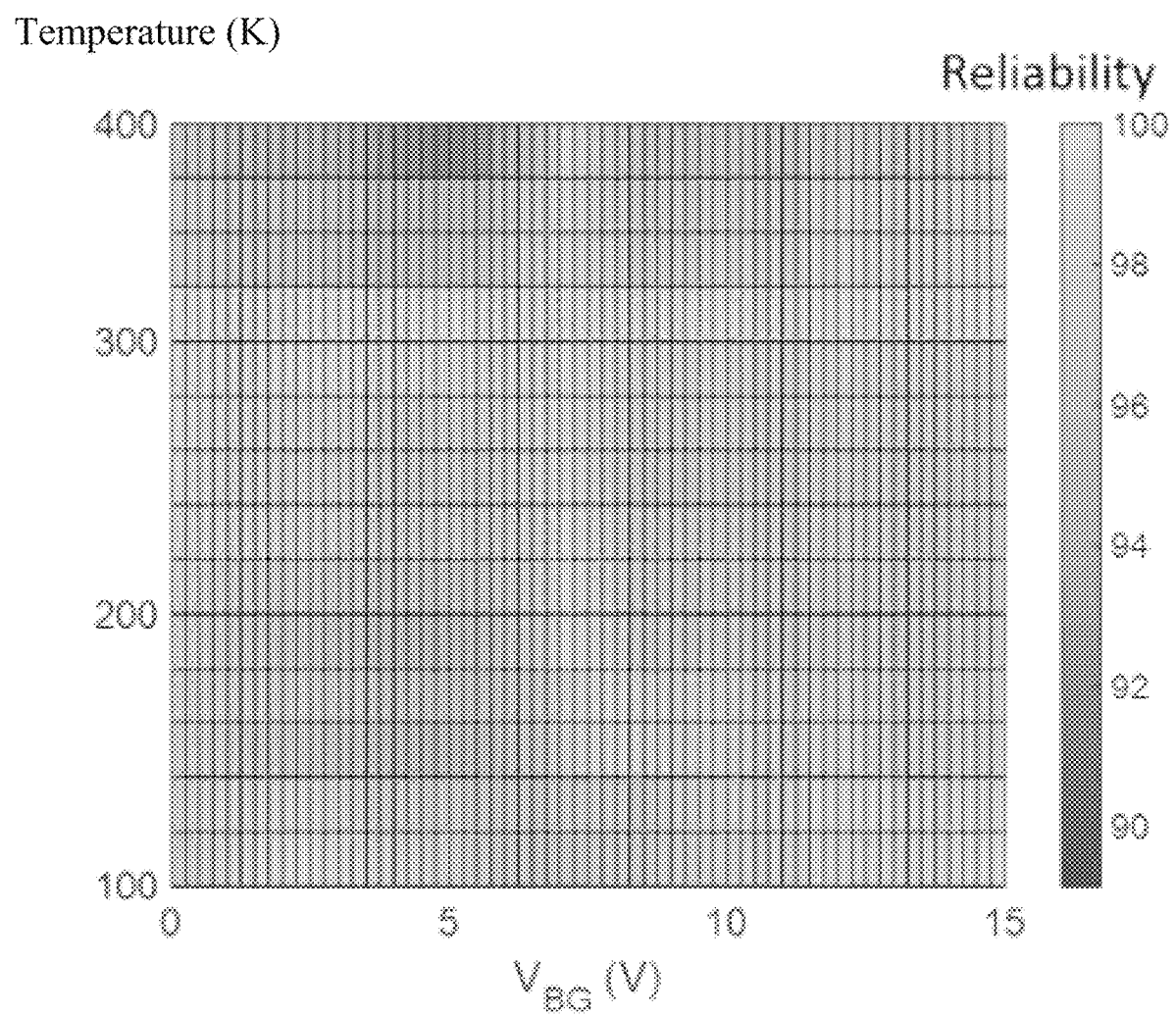
FIG. 48 is a graph illustrating a grey scale color map showing the reliability of a GFET as a function of temperature.

Here, G is the conductivity of the GFET and ΔG is the change in the conductivity in response to stimuli. FIG. 46 shows the color map of reliability for the embodiment of our GFET as a function of the variation in supply voltage ($V_{DD}$). Clearly, the GFET demonstrates adequate reliability even for 20% variation in $V_{DD}$. FIG. 47 shows the transfer characteristics of a GFET for different operating temperatures ranging from 100K (−175° C.) to 380K (105° C.) and FIG. 48 shows the corresponding color map of reliability against temperature variation. These results further show that embodiments of our GFET PUF are reliable over a wide temperature range.

The advantages of embodiments of our GFET PUFs becomes even more clear when compared with other emerging nanomaterial-based PUFs. For example, PUFs fabricated by use of 2D arrays of self-assembled CNT devices can lack reconfigurability since these types of devices exploit the random placement and alignment of CNTs on predefined trenches of specific widths. Unlike embodiments of our GFET PUFs, it is not possible to change the CRPs for CNT PUFs if an attack takes place post-fabrication.

High-resolution imaging tools such as electron microscopes can be used to identify the placement of individual CNTs and hence the bit information. However, such imaging attacks on GFET PUFs would prove futile since the individual GFET devices can be identical. Even if an attacker could identify the grain boundary and defects in an individual GFET, translating such information into field effect mobility, Dirac voltage, etc., should be impossible. Moreover, the ambipolar nature of transport and the option to tune the gate voltage further strengthen the ability of embodiments of our GFET PUF to be able to protect against reverse engineering attacks.

Another example of advantages embodiments of our GFET PUFs can provide compared to other conventional devices is related to fabrication. For instance, the fabrication process flow for CNT PUFs can involve more lithography steps than an embodiment of our GFET PUF. Embodiments of our GFET PUF system can be made at a lower cost. Furthermore, embodiments of our GFET PUFs can provide significant reconfigurability features. RRAM or memristor based PUFs have also been intensely investigated in recent years. Instead of relying solely on manufacturing process variations, memristive PUFs harness stochastic switching mechanisms in sub-stoichiometric dielectric oxides, such as $TaO_x$, $HfO_x$, etc. A typical conventional memristor device consists of a metal/oxide/metal stack and typically offers two resistance states, a high resistance state (HRS), inherent due to the insulating nature of the oxide, and a low resistance state (LRS), which is formed by applying a sufficiently large electric field. The resistance fluctuation in either the HRS or LRS can be harnessed as the entropy source for the implementation of memristive PUFs. However, since the conduction mechanism in the HRS is dominated by quantum mechanical tunneling, a small variation in the tunneling gap distance results in a significant variation in HRS resistance, whereas the conduction mechanism in LRS is mostly Ohmic and translates into less resistance variation. Since PUFs require sufficient entropy, the HRS is exploited in most experimental demonstrations. RRAM and memristive PUFs are an attractive security solution. However, proper implementation of such PUFs requires a power-hungry programming phase. First, a pulse forming process is performed on each device to ensure uniform LRS distribution across the array. Next, each device is reset to restore the HRS. The variation that occurs in the HRS after this reset operation is subsequently used as the random entropy source for the memristive PUF. The operating voltages for forming, reset, set, and readout are in the range of 1-5 V even for only few nm thick oxides. As such, memristive PUFs are largely power-hungry and defy energy scaling.

In contrast to these types of memristive PUFs, embodiments of our GFET PUFs can offer aggressive voltage and energy scaling. There is also no experimental demonstration of on-chip reconfiguration of memristive PUFs. Other challenges associated with harnessing true randomness from memristors include the need for complicated probability tracking, careful tuning of the applied voltage/current, post-processing of data, sophisticated algorithms, and circuits, which do not appear to limit embodiments of our GFET PUFs. Moreover, graphene-based electronic and optoelectronic technologies can tremendously benefit from graphene-based on-chip device authentication utilizing an embodiment of our GFET PUFs.

We are not aware of any demonstration of resilience to ML attack for phase change material (PCM) based PUFs. Other challenges associated with harnessing true randomness from PCM PUFs include the need for complicated probability tracking, careful tuning of the applied voltage/current, post-processing of data, sophisticated algorithms, and circuits, which do not appear to limit GFET PUFs. Organic PUFs can offer low cost and flexible security solutions but require circuits such as ring oscillators, current mirrors, etc., which increase the PUF footprint and energy consumption. Organic PUFs can also lack reconfigurability and typically do not demonstrate resilience to ML attacks.

As discussed herein, we have demonstrated how the inherent disorders associated with the carrier transport in grain boundary dominated GFETs can be exploited for the generation of physically unclonable functions with near-ideal entropy and uniqueness. Embodiments of our GFET PUFs can be made at low cost and are designed to utilize low power, be area efficient, and can be reconfigured effortlessly and remotely in the event of compromised security. Embodiments of our GFET PUFs can provide robust and reliable on-chip security for a number of different applications, including, but not limited to, providing on-chip security for chips or an array of chips included in nanoelectronics, optoelectronic devices, plasmonic devices, biomedical devices, and sensing devices.

It should be appreciated that variations to the embodiments of our GFETs, GFET PUFs, and other types of 2D material FET PUFs discussed herein can be made to meet a particular set of design criteria. For instance, the circuitry for embodiments can utilize one or more ADCs or not utilize any ADCs. As another example, the type of gate oxide utilized for a gate oxide layer can be any of a number of different options. As yet another example, the channel width and length can be varied to meet any particular design criterion. The thickness of different layers for a particular GFET can also be adjusted to meet a particular set of design criteria for a particular type of application. Other embodiments may vary the number of GFETs included in a GFET PUF, which can be any suitable number for meeting a particular design criteria. For instance, there may be 8 GFETs, 16 GFETS, 24 GFETS, 92 GFETS, 128 GFETS, 256 GFETS, etc., on a chip to provide an on-chip security feature. Many different embodiments can utilize between 8-256 GFETS, for example. Other embodiments may utilize less than 8 GFETS or more than 256 GFETs.

Furthermore, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the GFET PUFs, devices utilizing at least one GFET PUF, such as sensor devices, nanoelectronics, optoelectronic devices, plasmonic devices, biomedical devices, and sensing devices, and methods of making and using the same have been shown and described above, it is to be distinctly understood that the invention is not limited thereto but may be otherwise variously embodied and practiced within the scope of the following claims.

What is claimed is:
1. A physically unclonable function (PUF), comprising:
 at least one field effect transistor (FET), each FET including:
  a first layer connected to a source and a drain, wherein the first layer comprises graphene, and
  a gate oxide layer positioned between the first layer and a back-gate electrode; and circuitry connected to the FETs; wherein the circuitry is positioned so that an analog output current ($I_{OUT}$) from each individual FET is convertible to an analog output voltage ($V_{OUT}$).

2. The PUF of claim 1, wherein the circuitry includes at least one operational amplifier (Op-Amp) to convert the $I_{OUT}$ from each individual FET to the $V_{OUT}$.

3. The PUF of claim 2, wherein the circuitry also includes at least one analog-to-digital converter (ADC) to convert the $V_{OUT}$ to a binary output.

4. The PUF of claim 2, wherein the circuitry includes a voltage comparator to convert the $V_{OUT}$ from each FET into a binary output.

5. The PUF of claim 2, wherein the PUF is incorporated into a sensor device, a detector device, a nanoelectronic device, an optoelectronic device, a plasmonic device, or a biomedical device.

6. The PUF of claim 1, wherein the at least one FET PUF includes 8 FETs, 64 FETs, 128 FETs, or 256 FETs, and wherein the first layer is also comprised of molybdenum disulfide ($MoS_2$), tungsten disulfide ($WS_2$), tungsten diselenide ($WSe_2$), or black phosphorus (BP).

7. The PUF of claim 1, wherein the circuitry is configured to detect the analog output current responses from the FETs to digitize the analog output current responses to binary numbers appendable to generate challenge response pairs (CRPs).

8. The PUF of claim 7, wherein the analog output current response for each of the FETs is measured at a gate voltage and digitized to an 8-bit binary number to be appended to the CRPs.

9. The PUF of claim 8, wherein the plurality of FETs includes 8 FETs and the analog output current responses for the FETs are digitized to form the CRPs, the CRPs being 64-bit.

10. A method of fabricating a physically unclonable function (PUF), the method comprising:
   forming a plurality of field effect transistors (FETs), each FET including:
      a first layer connected to a source and a drain, the first layer comprising graphene, molybdenum disulfide ($MoS_2$), tungsten disulfide ($WS_2$), tungsten diselenide ($WSe_2$), or black phosphorus (BP), and
      a gate oxide layer positioned between the first layer and a back-gate electrode;
   positioning an array of the FETs on a chip; and
   connecting circuitry to the FETs, wherein the circuitry is configured so that an analog output current ($I_{OUT}$) from each individual FET is convertible to an analog output voltage ($V_{OUT}$).

11. The method of claim 10, wherein the circuitry includes at least one operational amplifier (Op-Amp) to convert the $I_{OUT}$ from each individual FET to the $V_{OUT}$.

12. The method of claim 11, wherein the circuitry also includes at least one analog-to-digital converter (ADC) to convert the $V_{OUT}$ to a binary output.

13. The method of claim 11, wherein the circuitry includes a voltage comparator to convert the $V_{OUT}$ from each FET into a binary output.

14. The method of claim 10, wherein the forming of the FETs also includes:
   defining channels in the first layer; and
   writing a source contact for the source and a drain contact for the drain.

15. The method of claim 10, comprising reconfiguring the FETs.

16. The method of claim 10, comprising:
   preventing machine learning attacks from affecting the chip via the FETs.

17. A method of fabricating a physically unclonable function (PUF), the method comprising:
   forming a plurality of field effect transistors (FETs), each FET including:
      a first layer connected to a source and a drain, the first layer comprising graphene, molybdenum disulfide ($MoS_2$), tungsten disulfide ($WS_2$), tungsten diselenide ($WSe_2$), or black phosphorus (BP), and
      a gate oxide layer positioned between the first layer and a back-gate electrode;
   positioning an array of the FETs on a chip;
   connecting circuitry to the FETs;
   performing a first reconfiguration of the FETs by application of a first preselected voltage to the FETs for a first preselected period of time; and
   performing a second reconfiguration of the FETs after the first reconfiguration of the FETs is performed by application of a second preselected voltage to the FETs for a second preselected period of time.

* * * * *